US010260001B2

(12) United States Patent
Junge et al.

(10) Patent No.: US 10,260,001 B2
(45) Date of Patent: Apr. 16, 2019

(54) LIQUID CRYSTAL MATERIAL

(71) Applicant: Merck Patent GmbH, Darmstadt (DE)

(72) Inventors: Michael Junge, Pfungstadt (DE); Mila Fischer, Muehltal (DE); Ursula Patwal, Reinheim (DE); Peer Kirsch, Seeheim-Jugenheim (DE); Susann Beck, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 5 days.

(21) Appl. No.: 15/303,245

(22) PCT Filed: Mar. 20, 2015

(86) PCT No.: PCT/EP2015/000617
§ 371 (c)(1),
(2) Date: Oct. 11, 2016

(87) PCT Pub. No.: WO2015/154848
PCT Pub. Date: Oct. 15, 2015

(65) Prior Publication Data
US 2017/0029702 A1 Feb. 2, 2017

(30) Foreign Application Priority Data
Apr. 11, 2014 (EP) .................................. 14001335

(51) Int. Cl.
| | |
|---|---|
| *G02F 1/1333* | (2006.01) |
| *C09K 19/34* | (2006.01) |
| *C09K 19/60* | (2006.01) |
| *G02F 1/137* | (2006.01) |
| *C09K 19/30* | (2006.01) |
| *E06B 9/24* | (2006.01) |

(52) U.S. Cl.
CPC ...... *C09K 19/3402* (2013.01); *C09K 19/3003* (2013.01); *C09K 19/3068* (2013.01); *C09K 19/60* (2013.01); *C09K 19/601* (2013.01); *C09K 19/603* (2013.01); *E06B 9/24* (2013.01); *G02F 1/13737* (2013.01); *C09K 2019/301* (2013.01); *C09K 2019/3016* (2013.01); *C09K 2019/3019* (2013.01); *C09K 2019/3021* (2013.01); *C09K 2019/3077* (2013.01); *C09K 2019/3078* (2013.01); *C09K 2019/3422* (2013.01); *C09K 2219/13* (2013.01); *E06B 2009/2464* (2013.01); *G02F 2001/13706* (2013.01)

(58) Field of Classification Search
CPC .. C09K 19/3402; C09K 19/60; C09K 19/301; C09K 19/603; C09K 19/3003; C09K 19/3068; C09K 2019/13; C09K 2019/301; C09K 2019/3016; C09K 2019/3019; C09K 2019/3021; C09K 2019/3077; C09K 2019/3078; C09K 2019/3422; G02F 1/1333; G02F 1/13737; G02F 2001/13706; E06B 9/24; E06B 2009/2464
USPC ........................................ 252/299.1
See application file for complete search history.

(56) References Cited

U.S. PATENT DOCUMENTS

| | | | |
|---|---|---|---|
| 5,762,824 A | 6/1998 | Kawashukuda et al. | |
| 5,969,154 A * | 10/1999 | Hao ..................... | C07D 487/04 252/299.61 |
| 7,223,484 B2 * | 5/2007 | Stossel ................ | C07D 285/14 257/40 |
| 7,442,419 B2 * | 10/2008 | Hirschmann .......... | C09K 19/20 252/299.61 |
| 8,927,856 B2 | 1/2015 | Debije et al. | |
| 2007/0218216 A1 | 9/2007 | Kato et al. | |
| 2011/0094585 A1 | 4/2011 | Debije et al. | |
| 2014/0333985 A1 | 11/2014 | Junge et al. | |
| 2016/0033807 A1 | 2/2016 | Junge et al. | |
| 2016/0085108 A1 | 3/2016 | Junge et al. | |
| 2016/0108317 A1 * | 4/2016 | Kirsch ................... | C09B 57/00 136/252 |

FOREIGN PATENT DOCUMENTS

| | | |
|---|---|---|
| JP | 2003-104976 A | 4/2003 |
| WO | 2009/141295 A1 | 11/2009 |
| WO | 2013/097919 A1 | 7/2013 |
| WO | 2014/135240 A2 | 9/2014 |
| WO | 2014/180525 A1 | 11/2014 |

OTHER PUBLICATIONS

International Search Report dated May 28, 2015 issued in corresponding PCT/EP2015/000617 application (3 pages).
English Abstract of JP 2003-104976 A published Apr. 9, 2003.

* cited by examiner

*Primary Examiner* — Geraldina Visconti
(74) *Attorney, Agent, or Firm* — Millen White Zelano and Branigan, PC; Csaba Henter

(57) ABSTRACT

The present application relates to a liquid-crystalline material which comprises at least one dye compound and at least one compound of a formula (IA) or (IB). The liquid-crystalline material is suitable for use in optical switching devices, in particular in devices for the homogeneous regulation of the passage of light through an area.

20 Claims, No Drawings

LIQUID CRYSTAL MATERIAL

The present application relates to a liquid-crystalline material comprising at least one dye F and at least one compound of a formula (IA) or (IB) which is characterised in greater detail below. The present application also relates to an optical switching device, in particular a device for the homogeneous regulation of the passage of light through an area, comprising the liquid-crystalline material described above.

For the purposes of the present application, the term light is taken to mean, in particular, electromagnetic radiation in the UV-A, VIS and NIR region, i.e. in accordance with the conventional definitions light of a wavelength from 320 nm to 2000 nm. Again in particular, it is taken to mean light having a wavelength which is only absorbed to a small extent or not at all by the materials usually used in windows (for example glass).

The light whose passage is being regulated by the device according to the invention is preferably taken to mean daylight. Daylight is light which emanates from the sun. Daylight preferably emanates directly from the sun. However, it may also emanate indirectly from the sun via mirroring, refraction, or via absorption and subsequent emission by any desired materials.

A liquid-crystalline material is taken to mean a material which has liquid-crystalline properties under certain conditions. The term liquid-crystalline properties is familiar to the person skilled in the art and is understood as usual in the area of physical chemistry. In the narrower sense, it is taken to mean that the material is liquid and has direction-dependent properties. The liquid-crystalline properties are typically dependent on the temperature. In the narrower sense, a liquid-crystalline material is therefore taken to mean a material which has liquid-crystalline properties in a temperature range which includes room temperature.

An optical switching device is a device which is able to regulate the passage of light. In particular, it has two or more different switching states, at least one of which allows relatively low passage of energy, and at least one switching device of this type can be employed, for example, in display devices or in switchable windows.

Switchable windows are employed for the regulation of the entry of light into a room and are reviewed, for example, in B. Jelle et al., Solar Energy Materials & Solar Cells 2012, pp. 1-28.

A device for the homogeneous regulation of the passage of light through an area is a special variant of an optical switching device in which the passage of light within a relatively large area is homogeneous, i.e. uniformly strong. The said relatively large area preferably has an extent of at least 0.01 m², particularly preferably at least 0.1 m², very particularly preferably at least 0.5 m², and most preferably at least 1 m². Homogeneous, i.e. uniform, is to be understood here in contrast to patterned or divided into domains (pixelled), as is the case in optical switching devices used in display devices. Slight deviations from homogeneity, in particular if caused by defects, are neglected in this definition. Devices for the homogeneous regulation of the passage of light are preferably used in switchable windows.

The prior art describes liquid-crystalline materials comprising at least one dye compound which are employed in devices for the homogeneous regulation of the passage of light through an area. Examples thereof are WO 2009/141295, WO 2014/090367 and the as yet unpublished application EP 14000141.3.

Furthermore, the prior art describes liquid-crystalline materials comprising at least one dye compound which are employed in optical switching devices for display devices (U.S. Pat. No. 5,762,824).

However, there continues to be a need for liquid-crystalline materials for the said uses. In particular, there is a need for liquid-crystalline materials for use in devices for the homogeneous regulation of the passage of light. Desired technical properties here are good solubility of the dye compounds in the liquid-crystalline material, good solution stability of the dye compounds in the liquid-crystalline material, in particular long-lasting good and complete solubility in the liquid-crystalline material, and high light stability of the liquid-crystalline material. There is furthermore a need for the liquid-crystalline material to experience as little change as possible in the electrical resistance over extended times of its use in the above-mentioned switching device. To this end, it is desirable to employ materials having the highest possible resistivities and thus correspondingly high so-called voltage holding ratios.

Surprisingly, it has been found that liquid-crystalline materials, as described below, have at least one, preferably a plurality, of the above-mentioned desirable properties.

The present invention thus relates to a liquid-crystalline material having a clearing point of higher than 95° C. and having a positive dielectric anisotropy $\Delta\varepsilon$, comprising one or more dye compounds F, and one or more compounds of a formula (IA) or (IB)

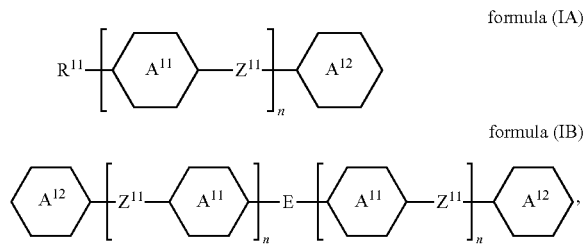

where the following applies to the groups and indices occurring:

$A^{11}$ is selected on each occurrence, identically or differently, from

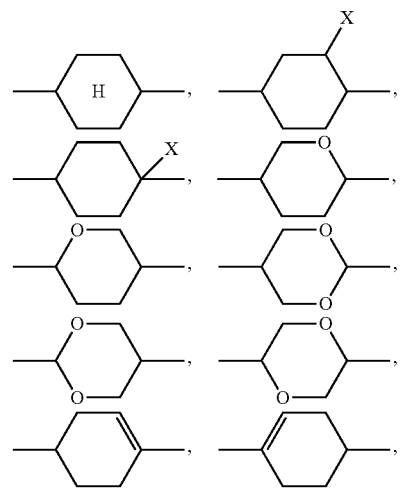

-continued

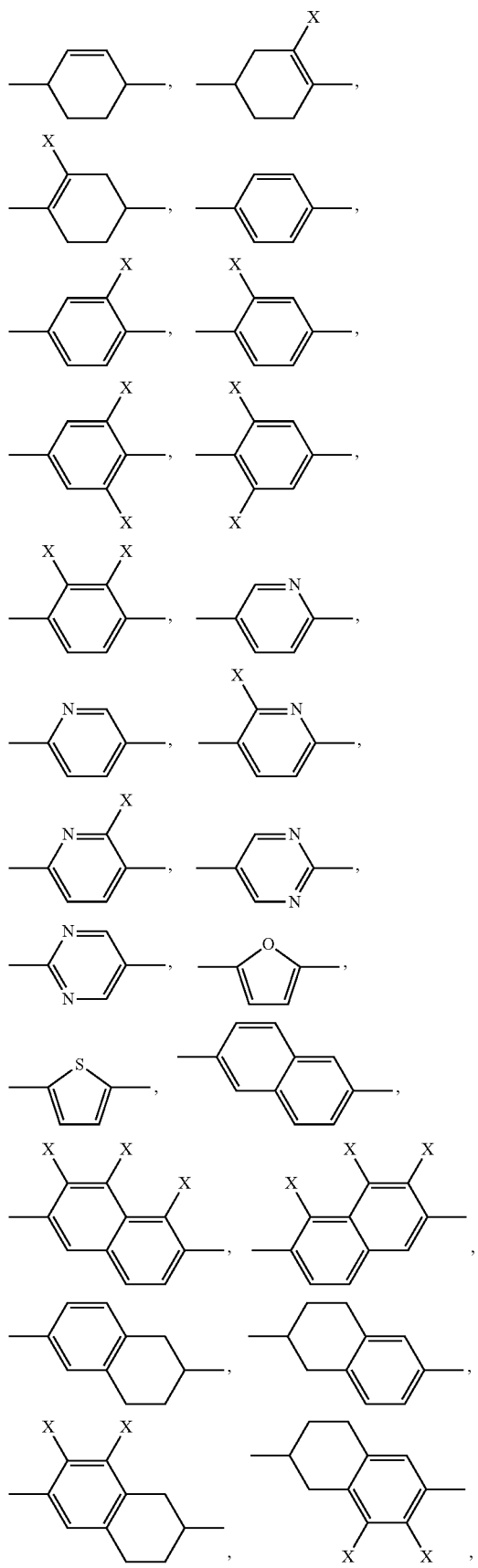

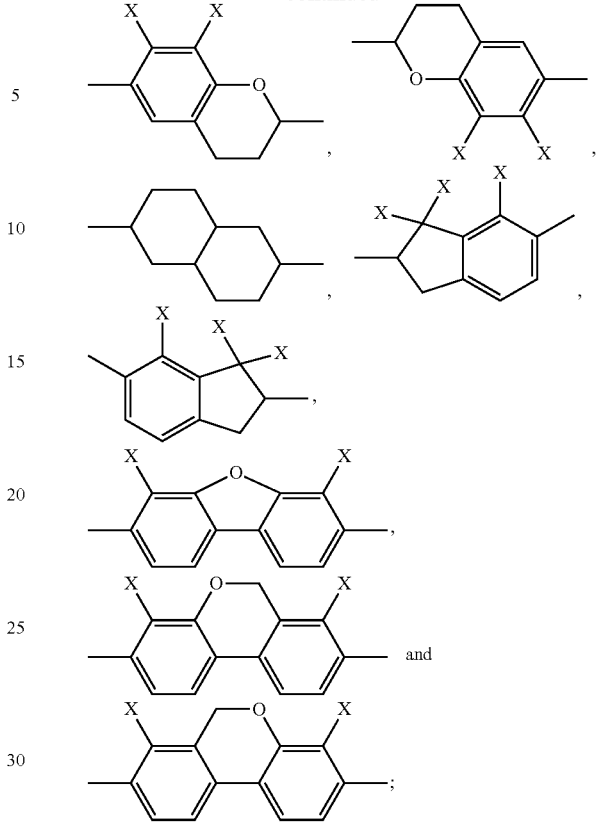

X is selected on each occurrence, identically or differently, from F, Cl, CN, alkyl groups having 1 to 10 C atoms, alkoxy groups having 1 to 10 C atoms and thioalkoxy groups having 1 to 10 C atoms, where one or more hydrogen atoms in the alkyl, alkoxy and thioalkoxy groups may be replaced by F or Cl, and where one or more $CH_2$ groups in the alkyl, alkoxy and thioalkoxy groups may be replaced by O or S;

$A^{12}$ is on each occurrence, identically or differently, a group of a formula (A12A) or (A12B)

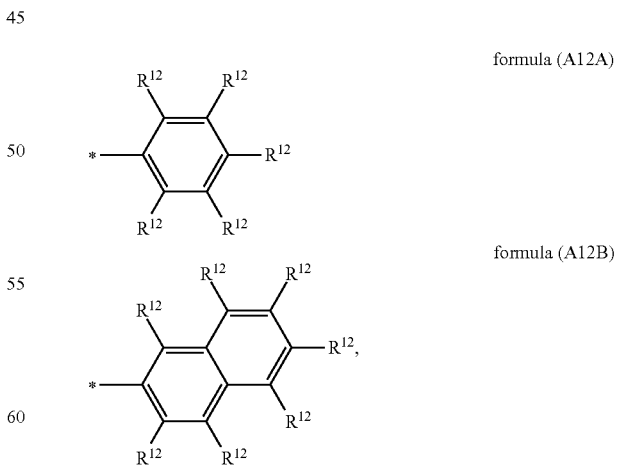

formula (A12A)

formula (A12B)

where the bond denoted by * denotes the bond to the group $Z^{11}$;

$Z^{11}$ is selected on each occurrence, identically or differently, from —CO—O—, —O—CO—, —$CF_2$—$CF_2$—, —CF$_2$—O—, —O—CF$_2$—, —CH$_2$—CH$_2$—, —CH=CH—, —CF=CF—, —CF=CH—, —CH=CF—, —C≡C—, —OCH$_2$—, —CH$_2$O— and single bonds;

E is selected from alkylene groups having 3 to 12 C atoms, where one or more H atoms in the alkylene groups may be replaced by F, Cl, —Si(R$^1$)$_2$OSi(R$^1$)$_2$OSi(R$^1$)$_3$, Si(R$^1$)$_3$ or CN, and where one or more CH$_2$ groups in the alkylene groups may be replaced by CR$^1$=CR$^1$, C≡C, Si(R$^1$)$_2$, Si(R$^1$)$_2$O, O, S, —O—CO— or —CO—O—;

R$^{11}$ is selected from H, F, Cl, CN, NCS, R$^1$—O—CO—, R$^1$—CO—O—, alkyl groups having 1 to 10 C atoms, alkoxy groups having 1 to 10 C atoms, thioalkoxy groups having 1 to 10 C atoms, alkenyl groups having 2 to 10 C atoms, alkenyloxy groups having 2 to 10 C atoms and thioalkenyloxy groups having 2 to 10 C atoms, where one or more H atoms in the alkyl, alkoxy, thioalkoxy, alkenyl and alkenyloxy groups may be replaced by F, Cl, —Si(R$^1$)$_2$OSi(R$^1$)$_2$OSi(R$^1$)$_3$, Si(R$^1$)$_3$ or CN, and where one or more CH$_2$ groups in the alkyl, alkoxy, thioalkoxy, alkenyl and alkenyloxy groups may be replaced by Si(R$^1$)$_2$, Si(R$^1$)$_2$O, O, S, —O—CO—, —CO—O— or a unit A$^{11}$;

R$^1$ is selected on each occurrence, identically or differently, from alkyl groups having 1 to 10 C atoms, in which one or more hydrogen atoms may be replaced by F, Cl, —Si(R$^1$)$_2$OSi(R$^1$)$_2$OSi(R$^1$)$_3$, Si(R$^1$)$_3$ or CN, and in which one or more CH$_2$ groups may be replaced by Si(R$^1$)$_2$, Si(R$^1$)$_2$O, O or S;

R$^{12}$ is selected on each occurrence, identically or differently, from H, F, Cl, CN, NCS, CF$_3$, CF$_2$CF$_3$, CHF$_2$, CHF$_2$, CH=CF$_2$, CH=CFH, CH=CH(CN), OCF$_3$, OC(CF$_3$)$_3$, OCF$_2$CF$_3$, OCHF$_2$, OCH$_2$F, O—CH=CF$_2$, O—CH=CFH, O—CF$_2$—CF=CF$_2$, OSF$_5$, SF$_5$, SCF$_3$, SCF$_2$CF$_3$, SCHF$_2$, SCH$_2$F, S—CH=CF$_2$, S—CH=CFH, R$^1$—O—CO—, R$^1$—CO—O—, alkyl groups having 1 to 10 C atoms, alkoxy groups having 1 to 10 C atoms, thioalkoxy groups having 1 to 10 C atoms, alkenyl groups having 2 to 10 C atoms, alkenyloxy groups having 2 to 10 C atoms and thioalkenyloxy groups having 2 to 10 C atoms, where one or more H atoms in the alkyl, alkoxy, thioalkoxy, alkenyl and alkenyloxy groups may be replaced by F, Cl or CN, and where one or more CH$_2$ groups in the alkyl, alkoxy, thioalkoxy, alkenyl and alkenyloxy groups may be replaced by O, S, —O—CO— or —CO—O—;

where at least one radical R$^{12}$ in the group A$^{12}$ is selected from F, Cl, CN, NCS, CF$_3$, CF$_2$CF$_3$, CHF$_2$, CH$_2$F, CH=CF$_2$, CH=CFH, CH=CH(CN), OCF$_3$, OC(CF$_3$)$_3$, OCF$_2$CF$_3$, OCHF$_2$, OCH$_2$F, O—CH=CF$_2$, O—CH=CFH, O—CF$_2$—CF=CF$_2$, OSF$_5$, SF$_5$, SCF$_3$, SCF$_2$CF$_3$, SCHF$_2$, SCH$_2$F, S—CH=CF$_2$ and S—CH=CFH; and n is on each occurrence, identically or differently, 1, 2, 3 or 4.

The dielectric anisotropy Δε is determined as indicated in the working examples.

Rings

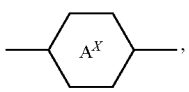

for example

are abbreviated to "A$^x$", for example "A$^{11}$", in the present application in order to improve the legibility in running text.

For the purposes of the present application, alkyl groups, alkoxy groups, thioalkoxy groups, alkenyl groups, alkenyloxy groups and thioalkenyloxy groups, in which in each case one or more H atoms may be replaced by F, Cl or CN, and in which in each case one or more CH$_2$ groups may be replaced by O, S, —O—CO— or —CO—O—, are preferably taken to mean the following groups: methyl, ethyl, n-propyl, i-propyl, n-butyl, i-butyl, s-butyl, t-butyl, 2-methylbutyl, n-pentyl, s-pentyl, cyclopentyl, neopentyl, n-hexyl, cyclohexyl, neohexyl, n-heptyl, cycloheptyl, n-octyl, cyclooctyl, 2-ethylhexyl, trifluoromethyl, pentafluoroethyl, 2,2,2-trifluoroethyl, ethenyl, propenyl, butenyl, pentenyl, cyclopentenyl, hexenyl, cyclohexenyl, heptenyl, cycloheptenyl, octenyl, cyclooctenyl, methoxy, trifluoromethoxy, ethoxy, n-propoxy, i-propoxy, n-butoxy, i-butoxy, s-butoxy, t-butoxy, n-pentoxy, s-pentoxy, 2-methylbutoxy, n-hexoxy, cyclohexyloxy, n-heptoxy, cycloheptyloxy, n-octyloxy, cyclooctyloxy, 2-ethylhexyloxy, pentafluoroethoxy, 2,2,2-trifluoroethoxy, methylthio, ethylthio, n-propylthio, i-propylthio, n-butylthio, i-butylthio, s-butylthio, t-butylthio, n-pentylthio, s-pentylthio, n-hexylthio, cyclohexylthio, n-heptylthio, cycloheptylthio, n-octylthio, cyclooctylthio, 2-ethylhexylthio, trifluoromethylthio, pentafluoroethylthio, 2,2,2-trifluoroethylthio, ethenylthio, propenylthio, butenylthio, pentenylthio, cyclopentenylthio, hexenylthio, cyclohexenylthio, heptenylthio, cycloheptenylthio, octenylthio, cyclooctenylthio, ethynylthio, propynylthio, butynylthio, pentynylthio, hexynylthio, heptynylthio and octynylthio.

In general, X is preferably selected on each occurrence, identically or differently, from F, Cl, CN, alkyl groups having 1 to 10 C atoms, in which one or more hydrogen atoms have been replaced by F, and alkoxy groups having 1 to 10 C atoms, in which one or more hydrogen atoms have been replaced by F. In general, X is particularly preferably equal to F.

E is preferably an unsubstituted alkylene group having 3 to 8 C atoms.

The index n is preferably on each occurrence, identically or differently, 2 or 3.

R$^{11}$ is preferably selected from H, F, CN, R$^1$—O—CO—, R$^1$—CO—O—, alkyl groups having 1 to 10 C atoms, alkoxy groups having 1 to 10 C atoms, thioalkoxy groups having 1 to 10 C atoms, alkenyl groups having 2 to 10 C atoms, alkenyloxy groups having 2 to 10 C atoms and thioalkenyloxy groups having 2 to 10 C atoms, where one or more H atoms in the alkyl, alkoxy, thioalkoxy, alkenyl and alkenyloxy groups may be replaced by F or CN, and where one or more CH$_2$ groups in the alkyl, alkoxy, thioalkoxy, alkenyl and alkenyloxy groups may be replaced by O, S, —O—CO—, —CO—O— or a unit A$^{11}$, which is restricted to

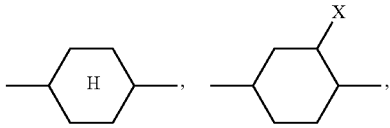

where X is defined as above.

In the case where one or more $CH_2$ groups in the alkyl, alkoxy, thioalkoxy, alkenyl and alkenyloxy groups in $R^{11}$ have been replaced by a unit $A^{11}$, at least 2, preferably 2, 3 or 4 $CH_2$ groups are preferably present between the replacing unit $A^{11}$ and the unit $A^{11}$ to which $R^{11}$ is bonded. In this way, it is ensured that the rings $A^{11}$ are in each case separated from one another by sufficiently long spacer groups.

Examples of preferred groups $R^{11}$ in which units $A^{11}$ are present are depicted below:

In these formulae, the dashed line stands for the bond from $R^{11}$ to the radical of the formula (IA).

Of the formulae (A12A) and (A12B), formula (A12A) is preferred.

Preferably, at least one radical $R^{12}$ in the compound of the formula (IA) or (IB) is selected from F, $CF_3$, $CF_2CF_3$, $CHF_2$, $CH_2F$, $OCF_3$, $OCF_2CF_3$, $OCHF_2$, $OCH_2F$, $SF_5$ and $OSF_5$.

Of the compounds of the formulae (IA) and (IB), preference is given to compounds of the formula (IA).

The compound of the formula (IA) preferably conforms to a formula (IA-1), (IA-2), (IA-3) or (IA-4)

formula (IA-1)

formula (IA-2)

formula (IA-3)

formula (IA-4)

where the following applies to the groups occurring:

$R^{111}$, $R^{121}$, $R^{131}$, $R^{141}$ are defined like $R^{11}$;

$Z^{121}$, $Z^{141}$ are selected from —CO—O—, —O—CO—, —$CF_2$—$CF_2$—, —$CF_2$—O—, —O—$CF_2$—, —$CH_2$—$CH_2$—, —$OCH_2$— and —$CH_2O$—;

$A^{111}$, $A^{121}$, $A^{131}$, $A^{141}$ are identical or different on each occurrence and are defined like $A^{11}$;

$A^{112}$, $A^{122}$, $A^{132}$, $A^{142}$ are selected from $R^{112}$ is selected on each occurrence, identically or differently, from F, $CF_3$, $CF_2CF_3$, $CHF_2$, $CH_2F$, $OCF_3$, $OCF_2CF_3$, $OCHF_2$, $OCH_2F$, $SF_5$ and $OSF_5$.

$R^{111}$, $R^{121}$, $R^{131}$, $R^{141}$ are preferably selected from alkyl groups having 1 to 10 C atoms and alkenyl groups having 2 to 10 C atoms.

$A^{111}$, $A^{121}$, $A^{131}$, $R^{141}$ are preferably selected on each occurrence, identically or differently, from

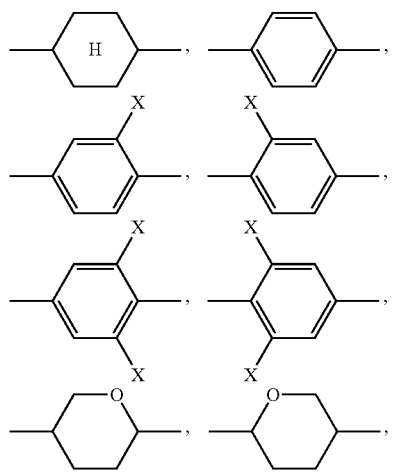

$A^{111}$, $A^{121}$, $A^{131}$, $A^{141}$ are particularly preferably selected on each occurrence, identically or differently, from

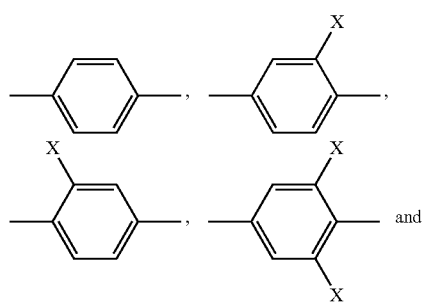

and

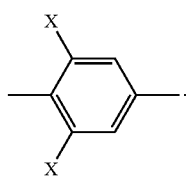

$A^{112}$, $A^{122}$, $A^{132}$, $A^{142}$ are preferably selected from

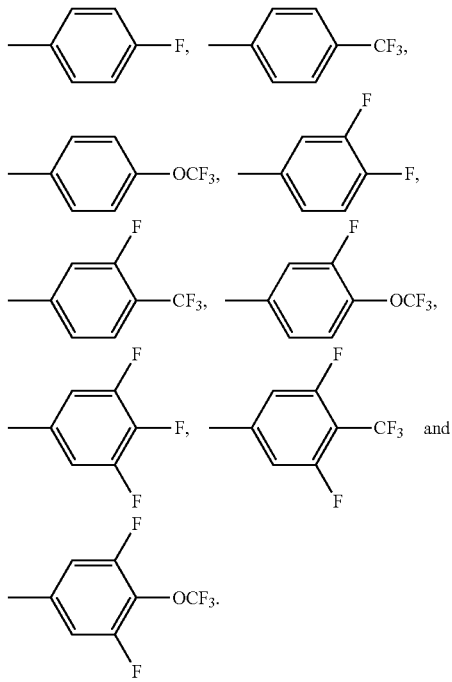

Examples of compounds of the formulae (IA) and (IB) are shown below:

CCU-3-F

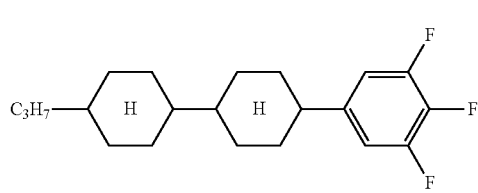

CPG-3-F

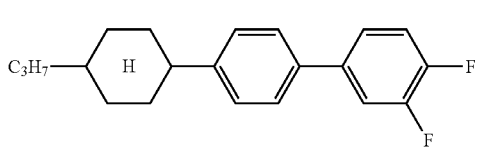

CPU-3-F

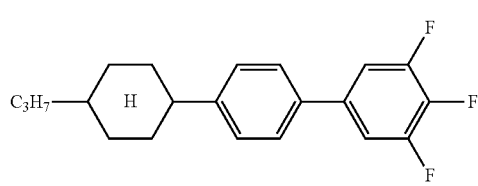

CPU-5-F

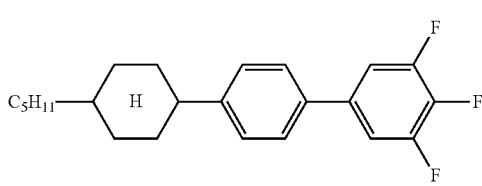

CGU-2-F

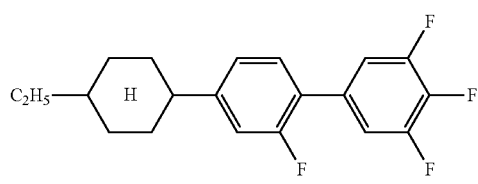

CGU-3-F

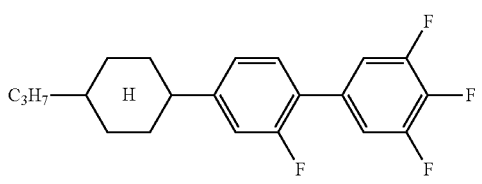

-continued
PGU-2-F
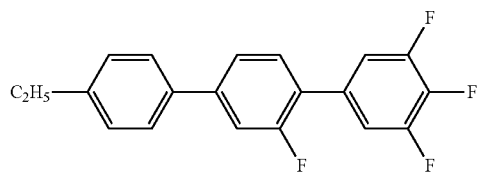
PGU-3-F
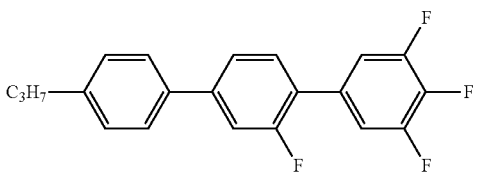
PGU-5-F
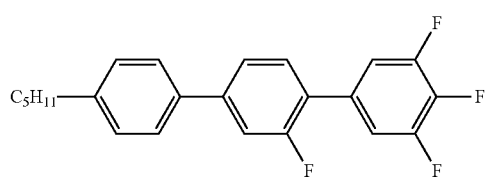
PGIGI-3-F
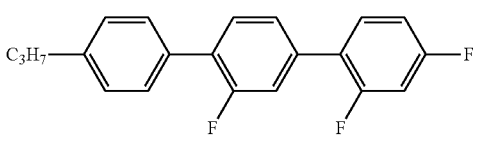
CCP-3-OT
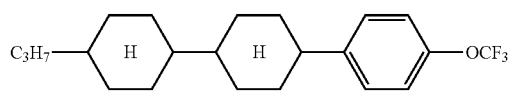
CCP-5-OT
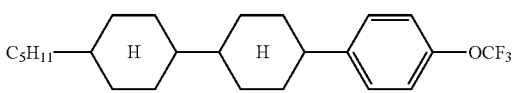
CCG-3-OT
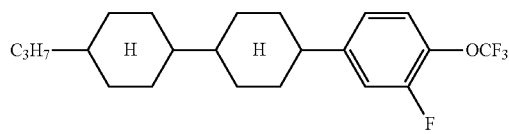
CCQU-3-F
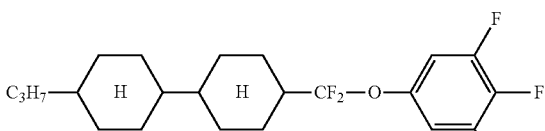
CCQU-5-F
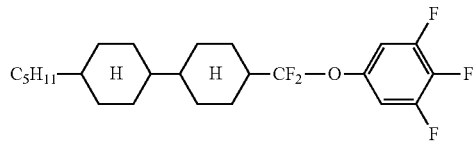
CCZU-2-F
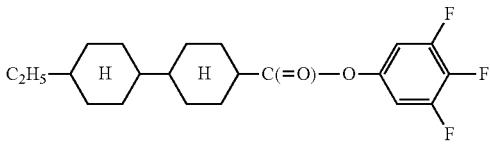
CCZU-3-F
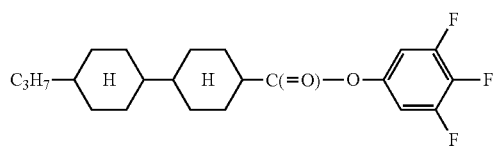
CCZU-5-F
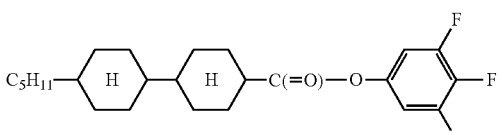
CCEU-3-F
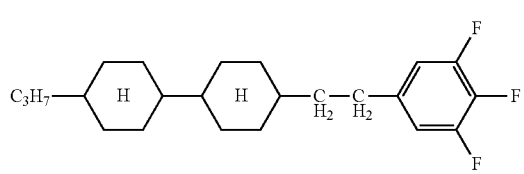
CCEU-5-F
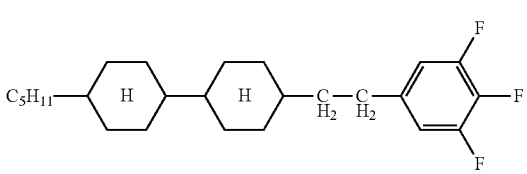
PUQU-3-F
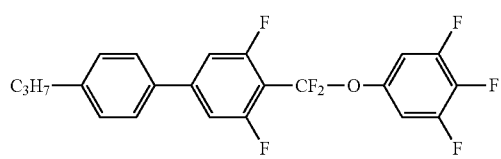
CCGU-3-F
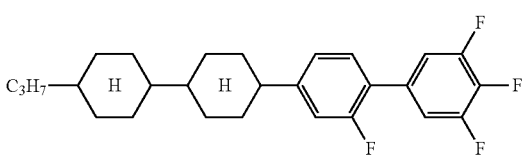
CPGU-3-OT
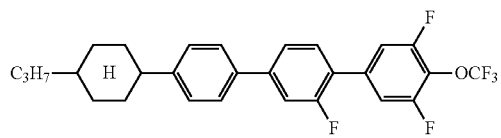
PGUQU-3-F
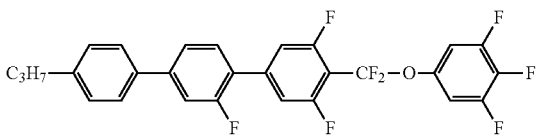

-continued

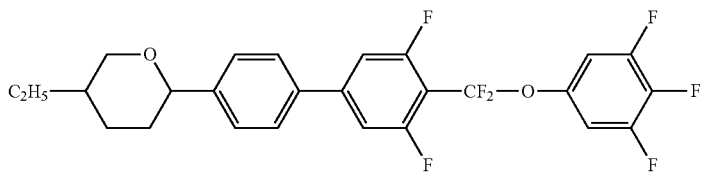
APUQU-2-F

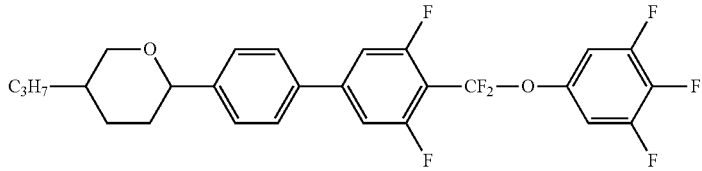
APUQU-3-F

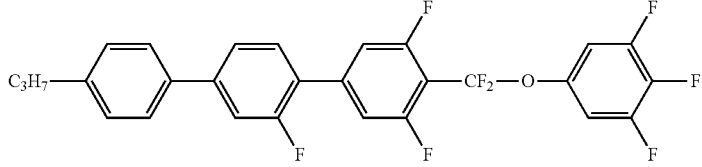
PGUQU-3-F

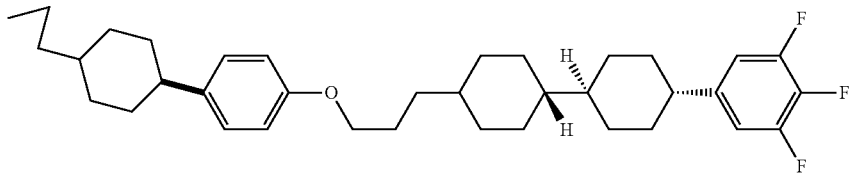
and enantiomer

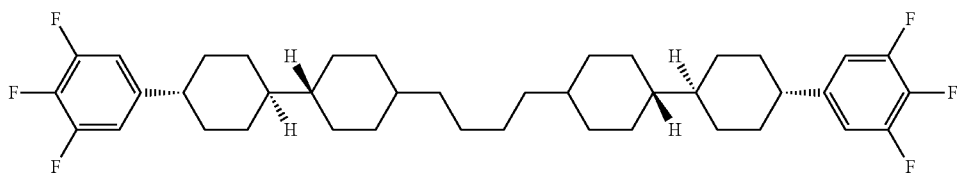
and enantiomer

The one or more compounds of the formula (IA) or (IB) are preferably present in the liquid-crystalline material in a total proportion of 60% by weight to 95% by weight, particularly preferably in a total proportion of 70% by weight to 90% by weight.

According to a preferred embodiment, the liquid-crystalline material comprises one or more tricyclic compounds in which all three rings are aromatic. These tricyclic compounds in which all three rings are aromatic are preferably present in the liquid-crystalline material in a total proportion of at least 1% by weight, particularly preferably in a total proportion of at least 2% by weight, and very particularly preferably in a total proportion of at least 3% by weight. Such compounds are preferably present in the liquid-crystalline material at most in a total proportion of 50% by weight, particularly preferably at most in a total proportion of 40% by weight.

If the liquid-crystalline material comprises no tricyclic compounds in which all three rings are aromatic, it preferably comprises less than 20% by weight of compounds which conform to the following formula (N):

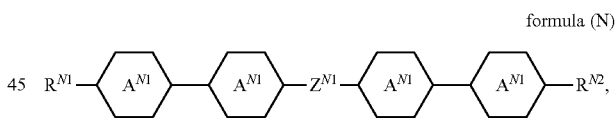
formula (N)

where the following applies to the groups occurring:

$R^{N1}$, $R^{N2}$ are selected on each occurrence, identically or differently, from alkyl groups having 1 to 10 C atoms;

$A^{N1}$ is selected on each occurrence, identically or differently, from

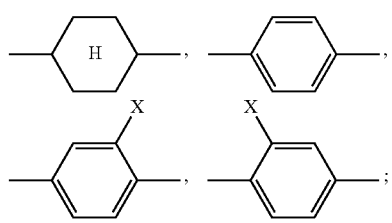

$Z^{N1}$ is selected from —CO—O—, —O—CO— and a single bond.

Preferred embodiments of the compounds of the formula (N) are the compounds shown below:

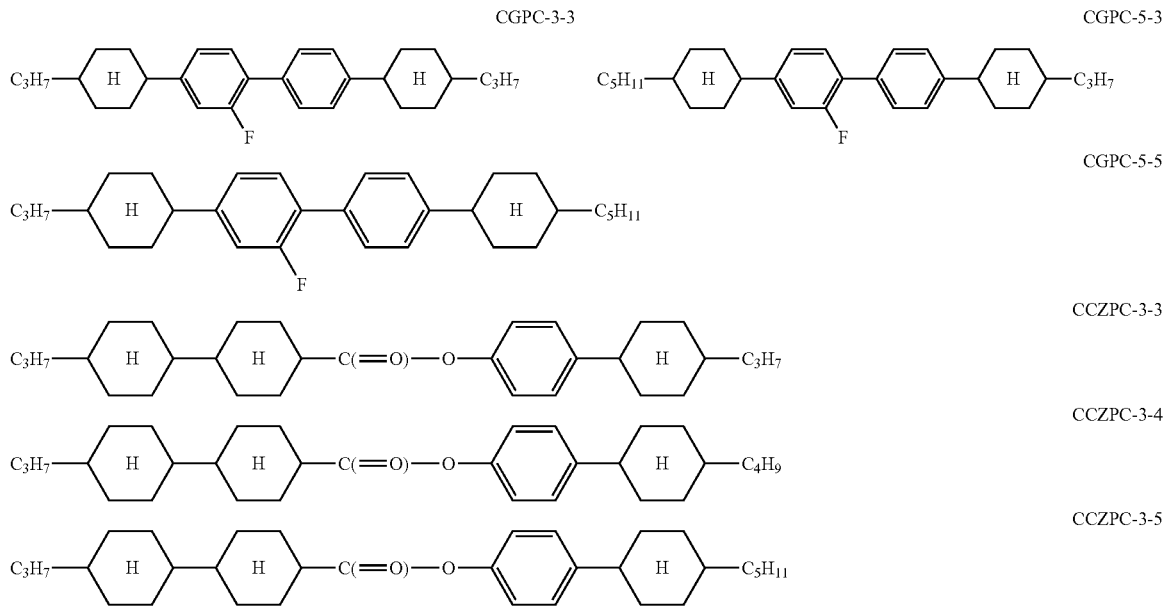

If the liquid-crystalline material comprises no tricyclic compounds in which all three rings are aromatic, it particularly preferably comprises less than 18% by weight of compounds of the formula (N), very particularly preferably less than 10% by weight, more preferably less than 5% by weight and most preferably no compounds of the formula (N) at all.

Tricyclic compounds are taken to mean compounds which have precisely three rings, where the term rings encompasses aromatic, heteroaromatic, aliphatic and heteroaliphatic rings. In particular, the term rings encompasses all groups indicated above in the definition of $A^{11}$.

The term aromatic ring here is taken to mean all rings which have an aromatic or heteroaromatic, in particular an aromatic system. The term aromatic ring is to be understood here in contrast to aliphatic rings, such as, for example,

and heteroaliphatic rings, such as, for example,

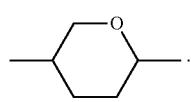

The liquid-crystalline material preferably comprises one or more compounds of a formula (II)

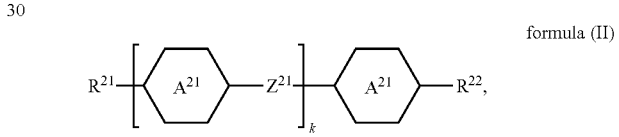

formula (II)

where the following applies to the groups and indices occurring:

$A^{21}$ is selected on each occurrence, identically or differently, from

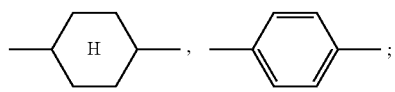

$Z^{21}$ is selected on each occurrence, identically or differently, from —CO—O—, —O—CO—, —CF$_2$—CF$_2$—, —CF$_2$—O—, —O—CF$_2$—, —CH$_2$—CH$_2$—, —CH=CH— and single bonds;

$R^{21}$, $R^{22}$ are selected on each occurrence, identically or differently, from alkyl groups having 1 to 10 C atoms and alkenyl groups having 1 to 10 C atoms;

k is equal to 1, 2, 3 or 4.

k is preferably equal to 1, 2 or 3.

$Z^{21}$ is preferably a single bond.

Examples of compounds of the formula (II) are:

CC-3-4

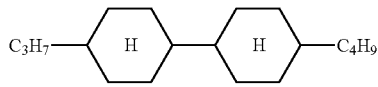

-continued

CC-3-5
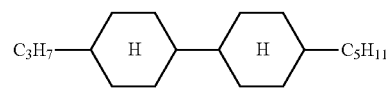

CC-3-V1
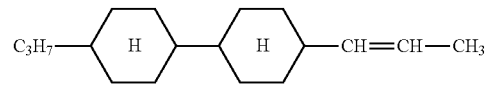

CCP-3-3
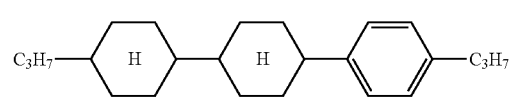

CCP-3-1
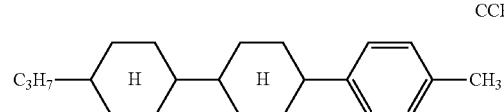

CPP-3-2

CCP-V-1
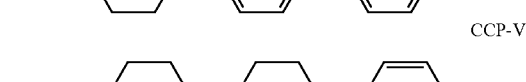

CPPC-3-3
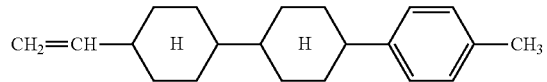

CZC-3-4
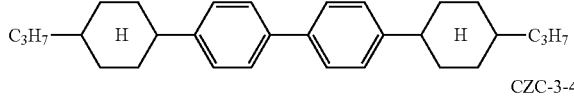

CZP-3-4
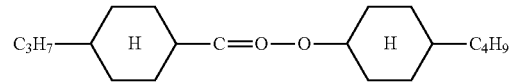

CEC-3-4
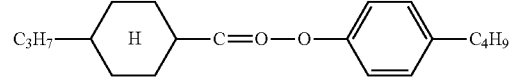

CEP-3-4
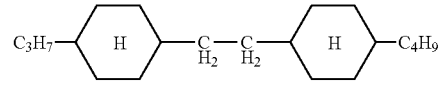

CWC-3-4
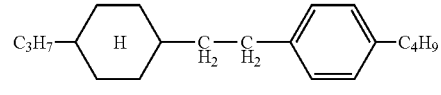

CVC-3-4
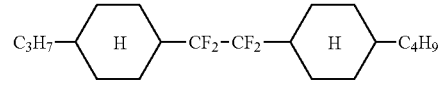

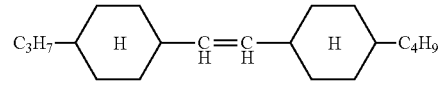

The one or more compounds of the formula (II) are preferably present in the liquid-crystalline material in a total proportion of 3% by weight to 35% by weight, particularly preferably in a total proportion of 8% by weight to 25% by weight.

The liquid-crystalline material preferably comprises the following compound in a proportion of at most 10% by weight, particularly preferably at most 5% by weight, very particularly preferably at most 1% by weight, and most preferably not at all:

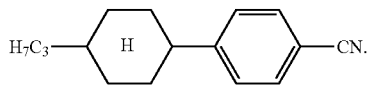

The liquid-crystalline material preferably comprises the following compound in a proportion of at most 10% by weight, particularly preferably at most 5% by weight, very particularly preferably at most 1% by weight, and most preferably not at all:

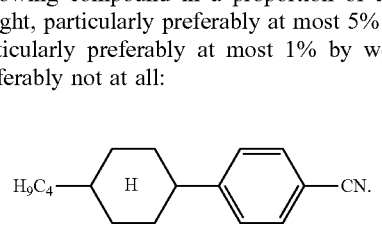

The liquid-crystalline material preferably comprises the following compound in a proportion of at most 10% by weight, particularly preferably at most 5% by weight, very particularly preferably at most 1% by weight, and most preferably not at all:

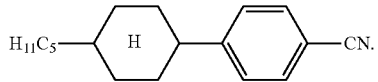

A compound of a formula (C1)

formula (C1)
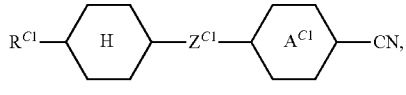

where the following applies to the groups occurring:
$A^{C1}$ is selected from

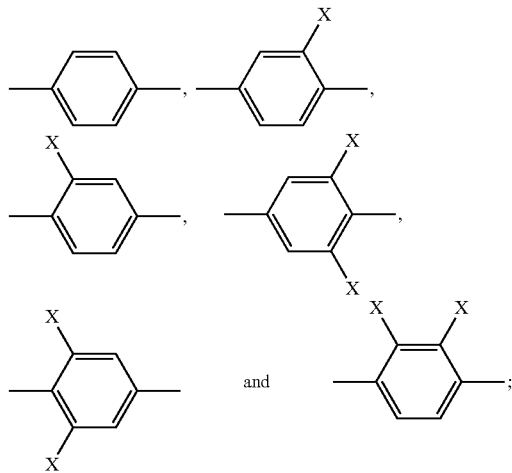

$Z^{C1}$ is selected from —CO—O—, —O—CO—, —CF$_2$—CF$_2$—, —CF$_2$—O—, —O—CF$_2$—, —CH$_2$—CH$_2$—, —CH=CH—, —CF=CF—, —CF=CH—, —CH=CF—, —C≡C—, —OCH$_2$—, —CH$_2$O— and a single bond;

R$^{C1}$ is selected from H, F, Cl, CN, NCS, R$^1$—O—CO—, R$^1$—CO—O—, alkyl groups having 1 to 10 C atoms, alkoxy groups having 1 to 10 C atoms, thioalkoxy groups having 1 to 10 C atoms, alkenyl groups having 2 to 10 C atoms, alkenyloxy groups having 2 to 10 C atoms and thioalkenyloxy groups having 2 to 10 C atoms, where one or more H atoms in the alkyl, alkoxy, thioalkoxy, alkenyl and alkenyloxy groups may be replaced by F, Cl or CN, and where one or more CH$_2$ groups in the alkyl, alkoxy, thioalkoxy, alkenyl and alkenyloxy groups may be replaced by O, S, —O—CO— or —CO—O—;

R$^1$ is defined as above;

X is defined as above;

is preferably present in the liquid-crystalline material at most in a proportion of 10% by weight. A compound of this type is particularly preferably present in the liquid-crystalline material at most in a proportion of 5% by weight, very particularly preferably at most in a proportion of 1% by weight, and most preferably not present at all.

The liquid-crystalline material preferably comprises the following compound in a proportion of at most 10% by weight, particularly preferably at most 5% by weight, very particularly preferably at most 1% by weight, and most preferably not at all:

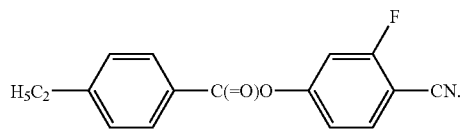

The liquid-crystalline material preferably comprises the following compound in a proportion of at most 10% by weight, particularly preferably at most 5% by weight, very particularly preferably at most 1% by weight, and most preferably not at all:

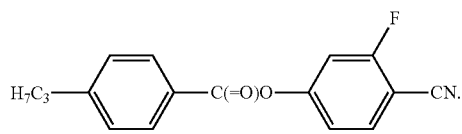

The liquid-crystalline material preferably comprises the following compound in a proportion of at most 10% by weight, particularly preferably at most 5% by weight, very particularly preferably at most 1% by weight, and most preferably not at all:

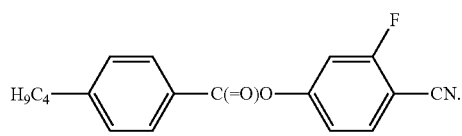

The liquid-crystalline material preferably comprises the following compound in a proportion of at most 10% by weight, particularly preferably at most 5% by weight, very particularly preferably at most 1% by weight, and most preferably not at all:

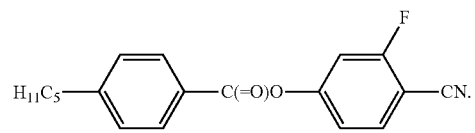

The liquid-crystalline material preferably comprises compounds containing one or more cyano groups in a proportion of at most 10% by weight, particularly preferably at most 5% by weight, very particularly preferably at most 1% by weight, and most preferably not at all.

The liquid-crystalline material preferably comprises at least 8 different compounds, particularly preferably at least 10 different compounds. As stated above, at least one of these different compounds is a compound of the formula (IA) or (IB), and at least one of these different compounds is a dye F. Of these different compounds, preference is given to at least one compound of a formula (II), as described above. It is furthermore preferred for one or more of the different compounds to be compounds which conform neither to formula (IA) or (IB), nor to formula (II), nor are a dye F. These one or more compounds preferably have an elongate form, i.e. they have a significantly greater dimension in one of the three spatial directions than in the other two spatial directions. A multiplicity of such organic compounds are known to the person skilled in the art. Examples thereof are organic compounds which have a para-linking of two or more, preferably two, three or four, optionally substituted six-membered rings, in particular cyclohexane rings, cyclohexene rings, benzene rings, pyridine rings, pyrimidine rings and tetrahydropyran rings.

The liquid-crystalline material comprises one or more dye compounds F. The dye compounds F are preferably organic compounds, particularly preferably organic compounds containing at least one condensed aryl or heteroaryl group.

The liquid-crystalline material preferably comprises at least two, particularly preferably at least three and very particularly preferably three or four different dye compounds F. The at least two dye compounds F preferably each cover different regions of the light spectrum.

If two or more dye compounds F are present in the liquid-crystalline material, the absorption spectra of the compounds preferably complement one another in such a way that essentially the entire visible spectrum of light is absorbed. This gives rise to the impression of a black colour for the human eye. This is preferably achieved through the use of three or more dye compounds F, at least one of which absorbs blue light, at least one of which absorbs green to yellow light and at least one of which absorbs red light. Light colour here is defined in accordance with B. Bahadur, Liquid Crystals—Applications and Uses, Vol. 3, 1992, World Scientific Publishing, Section 11.2.1.

The total proportion of the dye compounds F in the liquid-crystalline material according to the invention is preferably 0.01 to 20% by weight, particularly preferably 0.1 to 15% by weight and very particularly preferably 0.2 to 12% by weight. The proportion of each individual one of the one or more dye compounds F is preferably 0.01 to 15% by weight, particularly preferably 0.05 to 12% by weight and very particularly preferably 0.1 to 10% by weight.

The dye compound F present in the liquid-crystalline material is preferably dissolved therein. The dye compound F is preferably influenced in its alignment by the alignment of the molecules of the liquid-crystalline material.

The dye compound F is preferably a dichroic dye compound, particularly preferably a positively dichroic dye compound. Positively dichroic is taken to mean that the dye compound has a positive degree of anisotropy R, determined as indicated in the working examples. The degree of anisotropy R is particularly preferably greater than 0.4, very particularly preferably greater than 0.5 and most preferably greater than 0.6.

In an alternative embodiment, it may also be preferred for the dye compound F to be a negatively dichroic dye compound. Negatively dichroic is taken to mean that the dye compound has a negative degree of anisotropy R, determined as indicated in the working examples.

In the case in which two or more different dye compounds are present in the liquid-crystalline material, it is preferred that they are either all positively dichroic or all negatively dichroic.

The absorption of the dye compound F preferably reaches a maximum when the polarisation direction of the light is parallel to the direction of the longest elongation of the molecule of the dye compound F and reaches a minimum when the polarisation direction of the light is perpendicular to the direction of the longest elongation of the molecule of the dye compound F.

Furthermore preferably, the dye compound F in accordance with the present application absorbs predominantly light in the UV-VIS-NIR region, i.e. in a wavelength range from 320 to 1500 nm. The dye compound F particularly preferably absorbs predominantly light in the VIS region, i.e. in a wavelength range from 380 to 780 nm. The dye compound F particularly preferably has one or more absorption maxima in the UV-VIS-NIR region as defined above, preferably in the VIS region, i.e. from a wavelength of 380 nm to 780 nm.

The dye compound is furthermore preferably a fluorescent dye compound. Fluorescence here is taken to mean that a compound is placed in an electronically excited state by absorption of light having a certain wavelength, where the compound subsequently undergoes a transition into the ground state with emission of light. The emitted light preferably has a longer wavelength than the absorbed light. The transition from the excited state to the ground state is furthermore preferably spin-allowed, i.e. takes place without a change in the spin. The lifetime of the excited state of the fluorescent compound is furthermore preferably shorter than $10^{-5}$ s, particularly preferably shorter than $10^{-6}$ s, very particularly preferably between $10^{-9}$ and $10^{-7}$ s.

The dye compound F is furthermore preferably selected from the dye classes indicated in B. Bahadur, Liquid Crystals—Applications and Uses, Vol. 3, 1992, World Scientific Publishing, Section 11.2.1 and particularly preferably from the compounds explicitly mentioned in the table.

The dye compounds F are preferably selected from azo compounds, anthraquinones, methine compounds, azomethine compounds, merocyanine compounds, naphthoquinones, tetrazines, benzothiadiazoles, pyrromethenes and diketopyrrolopyrroles. Of these, particular preference is given to azo compounds, anthraquinones, benzothiadiazoles, in particular as disclosed in WO 2014/187529, and diketopyrrolopyrroles, in particular as disclosed in the as yet unpublished application EP 13005918.1.

The said dye compounds have been described many times in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803, DE 3201120 and DE 3307238, naphthoquinone dyes are described in DE 3126108 and DE 3202761, and azo dyes are described in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Lig. Cryst. 39, 39-52 (1977) and H. Seki, C. Shishido, S. Yasui and T. Uchida: Jpn. J. Appl. Phys. 21, 191-192 (1982).

The dye compounds F preferably conform to a formula (F)

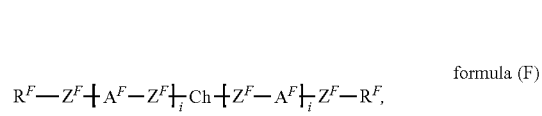

where the following applies to the groups occurring:

Ch is any desired chromophoric group;

$A^F$ is selected on each occurrence, identically or differently, from

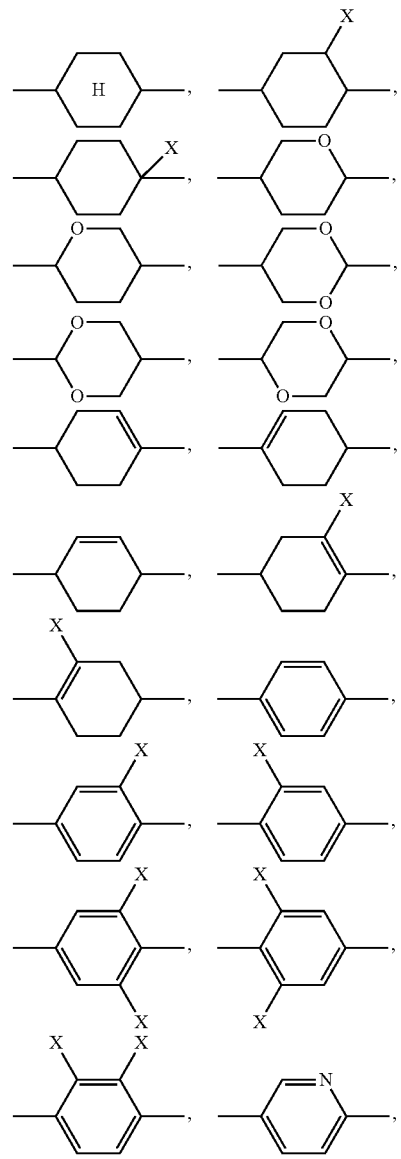

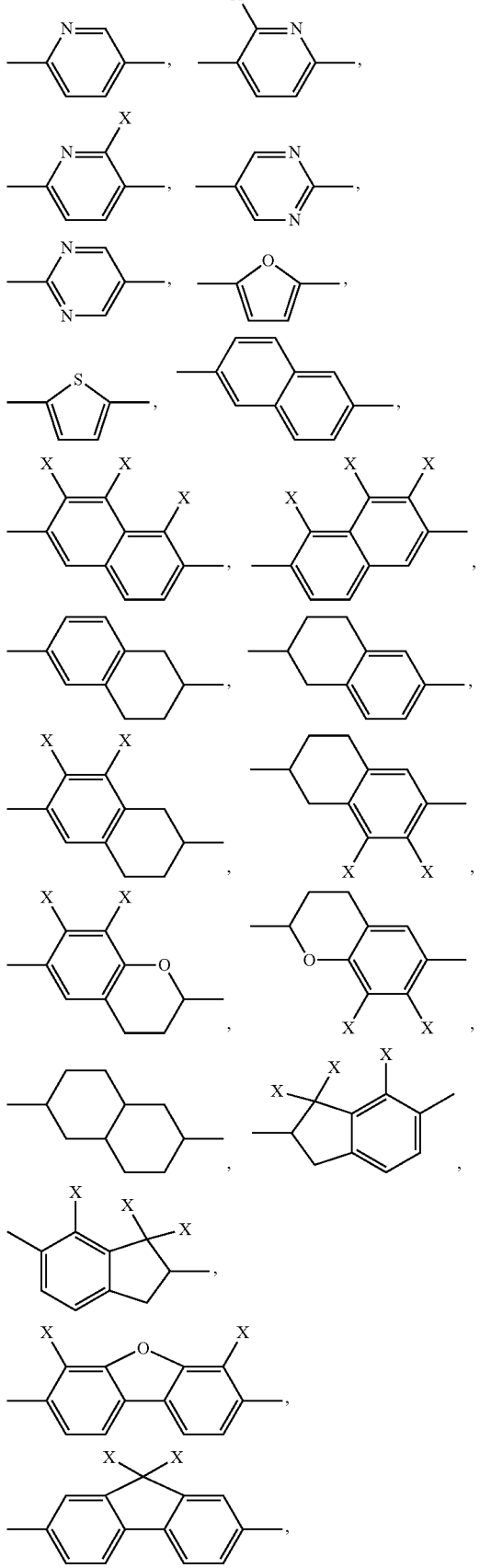

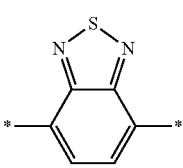
and

X is selected on each occurrence, identically or differently, from F, Cl, CN, alkyl groups having 1 to 10 C atoms, alkoxy groups having 1 to 10 C atoms and thioalkoxy groups having 1 to 10 C atoms, where one or more hydrogen atoms in the alkyl, alkoxy and thioalkoxy groups may be replaced by F or Cl, and where one or more $CH_2$ groups in the alkyl, alkoxy and thioalkoxy groups may be replaced by O or S;

$R^F$ is identical or different on each occurrence and is selected from H, F, Cl, CN, NCS, $R^1$—O—CO—, $R^1$—CO—O—, alkyl groups having 1 to 10 C atoms, alkoxy groups having 1 to 10 C atoms, thioalkoxy groups having 1 to 10 C atoms, alkenyl groups having 2 to 10 C atoms, alkenyloxy groups having 2 to 10 C atoms and thioalkenyloxy groups having 2 to 10 C atoms, where one or more H atoms in the alkyl, alkoxy, thioalkoxy, alkenyl and alkenyloxy groups may be replaced by F, Cl or CN, and where one or more $CH_2$ groups in the alkyl, alkoxy, thioalkoxy, alkenyl and alkenyloxy groups may be replaced by O, S, —O—CO— or —CO—O—;

$R^1$ is selected on each occurrence, identically or differently, from alkyl groups having 1 to 10 C atoms, in which one or more hydrogen atoms may be replaced by F or Cl, and in which one or more $CH_2$ groups may be replaced by O or S;

$Z^F$ is selected on each occurrence, identically or differently, from —CO—O—, —O—CO—, —$CF_2$—$CF_2$—, —$CF_2$—O—, —O—$CF_2$—, —$CH_2$—$CH_2$—, —CH=CH—, —CF=CF—, —CF=CH—, —CH=CF—, —C≡C—, —$OCH_2$—, —$CH_2$O— and a single bond;

i is on each occurrence, identically or differently, 1, 2 or 3.

The group Ch is preferably selected from groups containing at least one condensed aryl or heteroaryl group.

A condensed aryl or heteroaryl group is taken to mean a unit comprising at least two aromatic or heteroaromatic rings, in which at least two of the rings share at least one bond with one another. Examples of condensed aryl groups are naphthalene and anthracene, examples of condensed heteroaryl groups are indole, benzothiadiazole and diketopyrrolopyrrole.

Preferred embodiments of the group Ch conform to the following formulae (Ch-1) and (Ch-2):

formula (Ch-1)

formula (Ch-2)

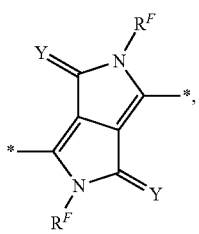

where the groups are bonded to the remainder of the compound of the formula (F) in each case via the bonds labelled with *,
where the groups may be substituted at each of the free positions by radicals $R^F$;
where Y is selected on each occurrence, identically or differently, from O and $NR^F$; and
where $R^F$ is defined as above.

The group $A^F$ is preferably selected on each occurrence, identically or differently, from

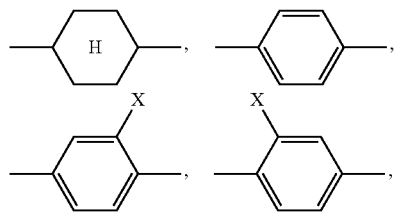

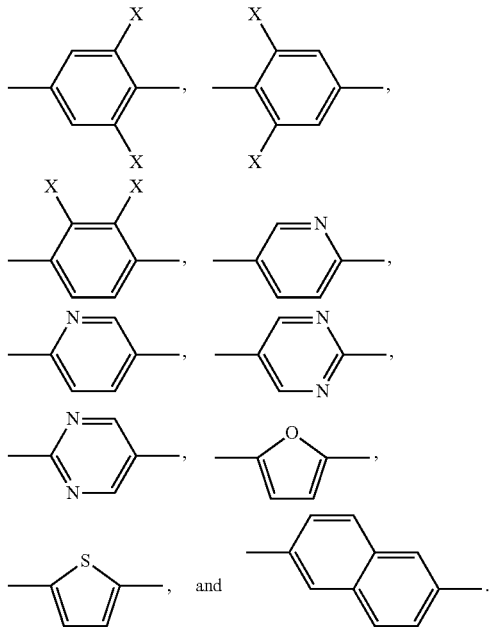

The group $Z^F$ is preferably a single bond.

The index i is on each occurrence, identically or differently, 1 or 2.

The following compounds are examples of dye compounds F:

1

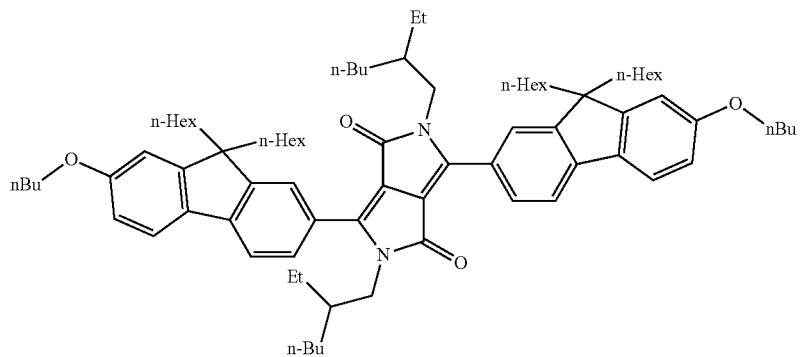

2

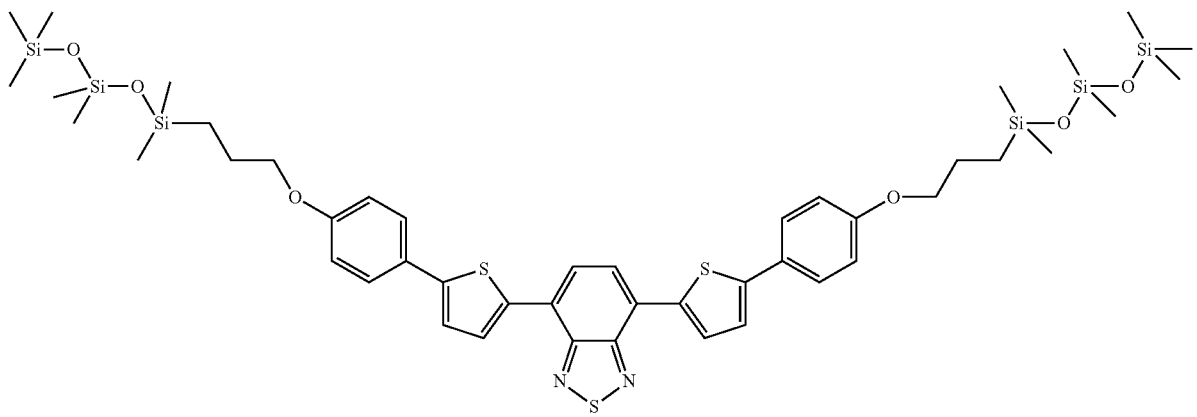

3
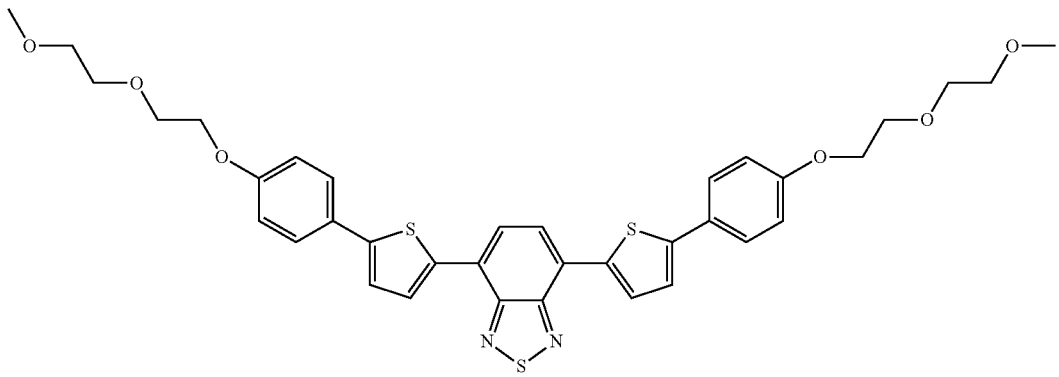
4
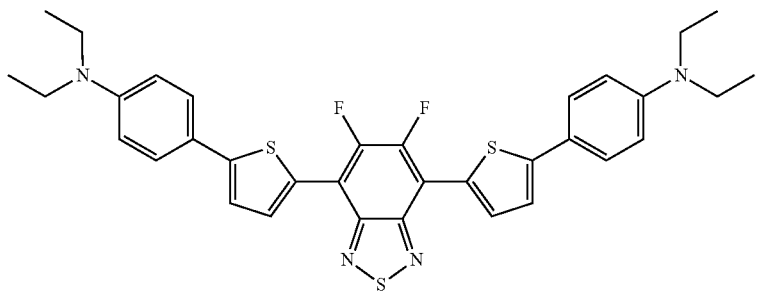
5
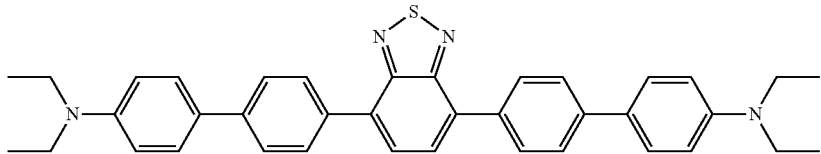
6
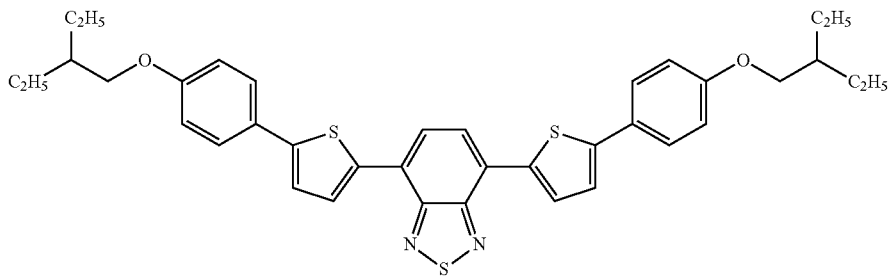
7
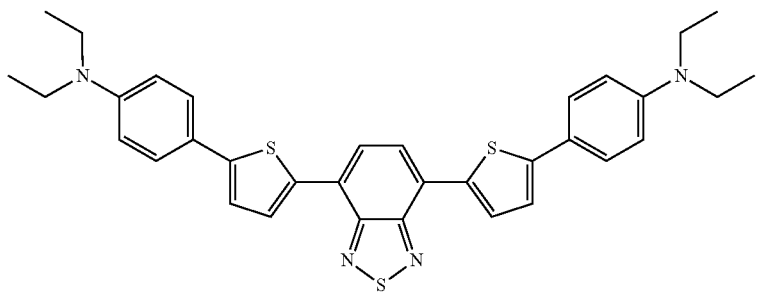

-continued
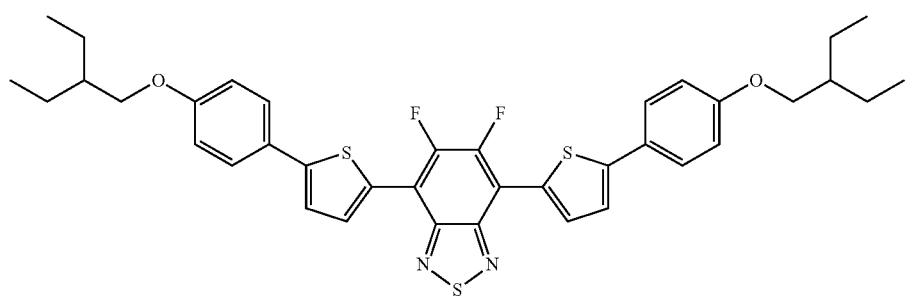
8
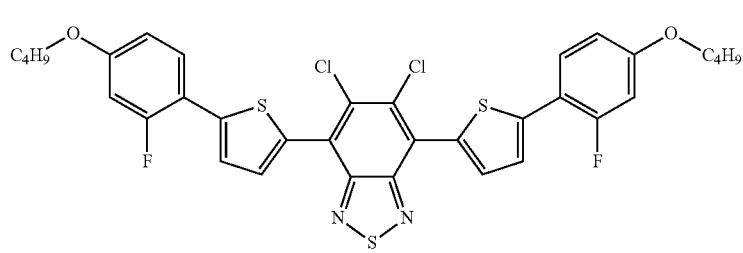
9
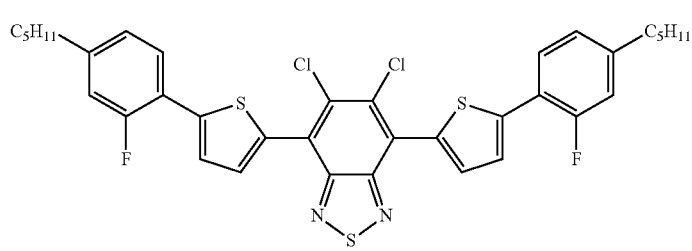
10
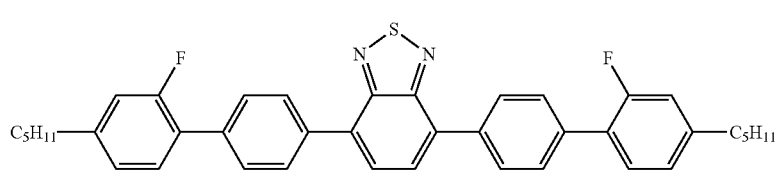
11
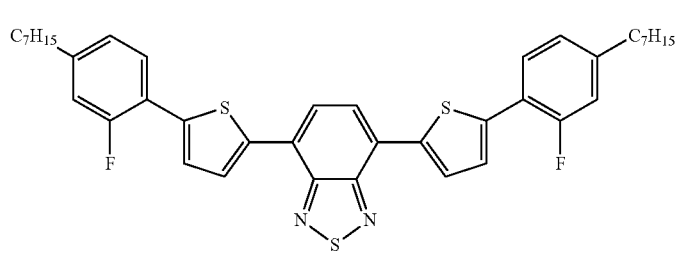
12
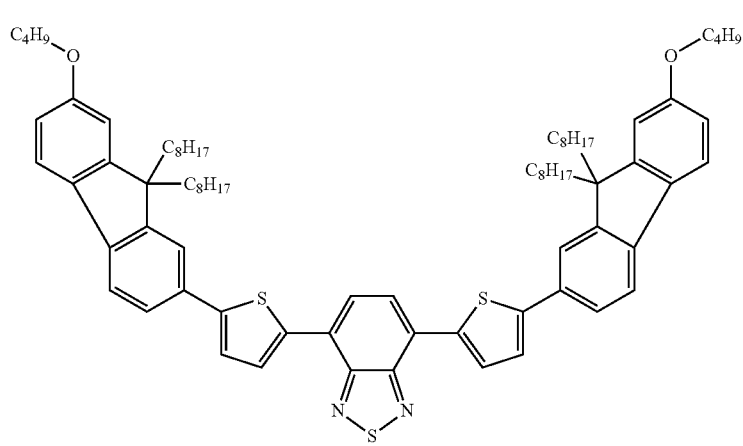
13

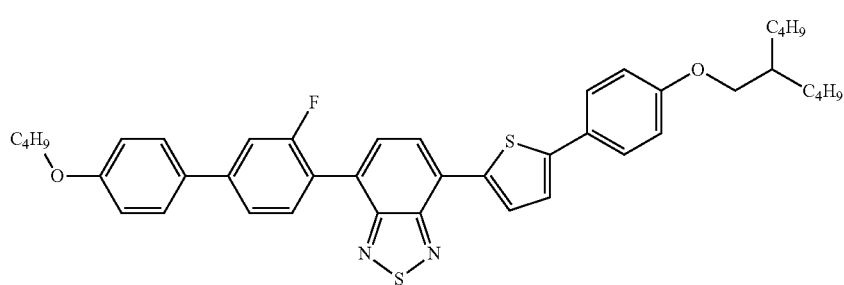
14
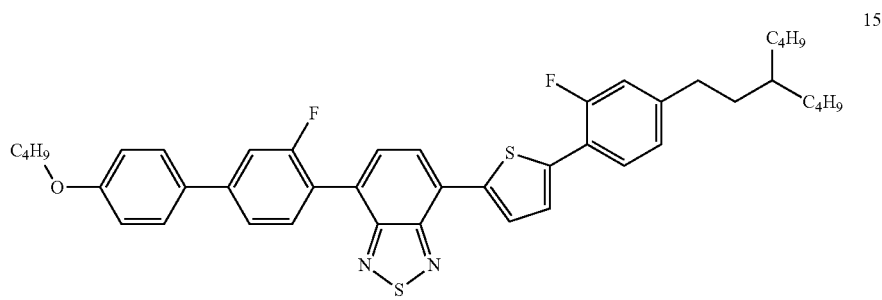
15
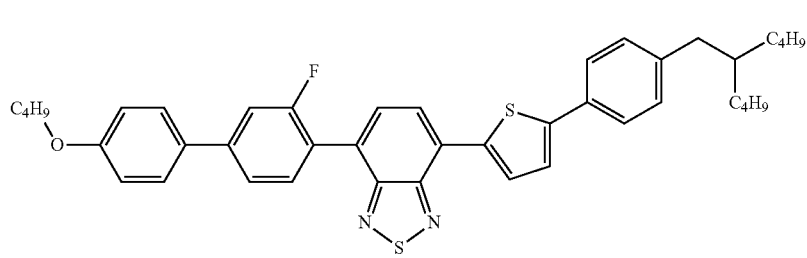
16
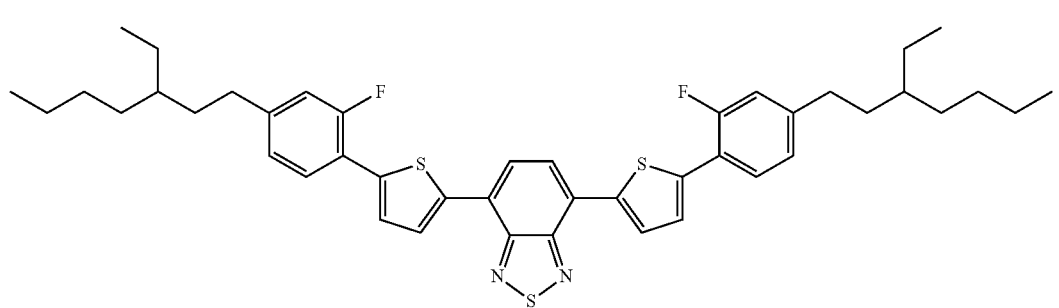
17
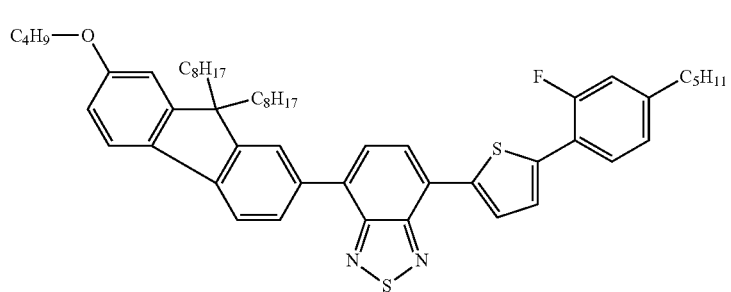
18

-continued
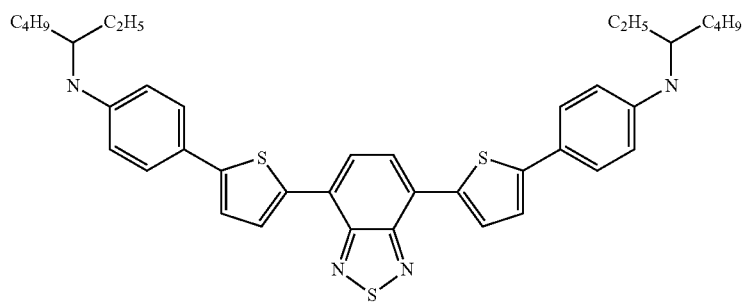
19
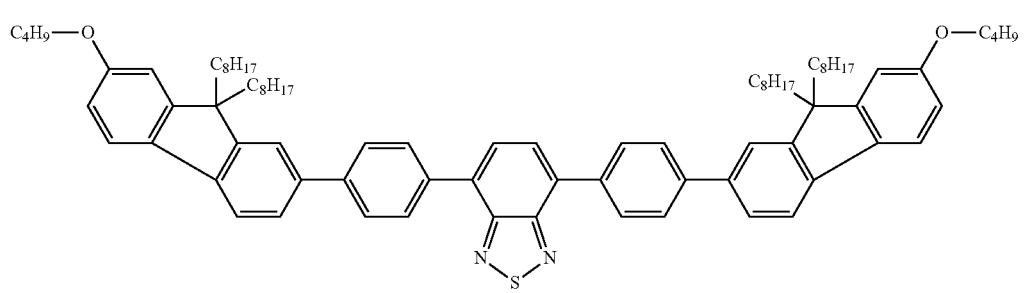
20
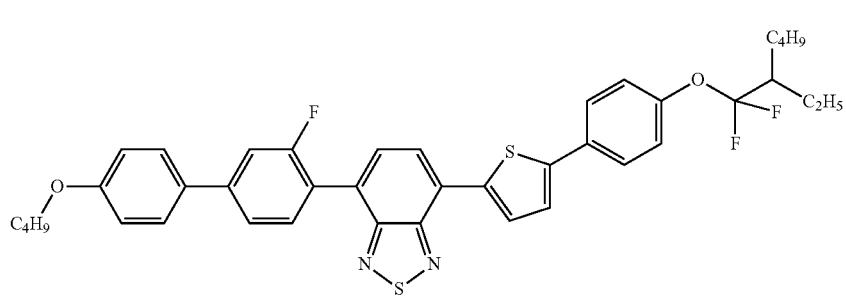
21
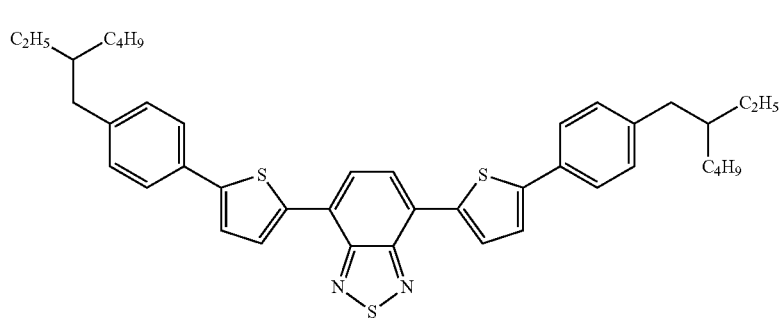
22
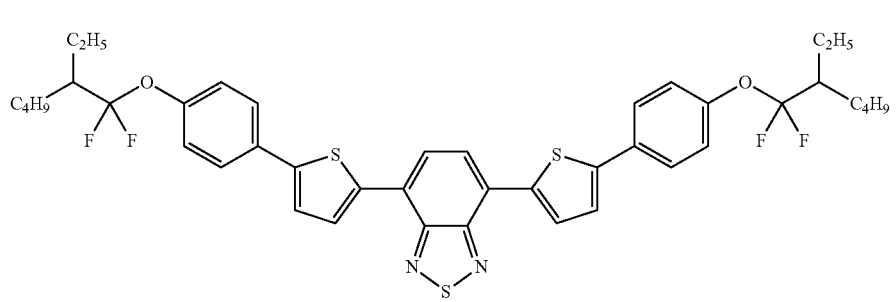
23
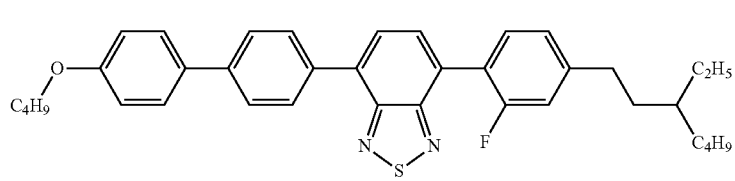
24

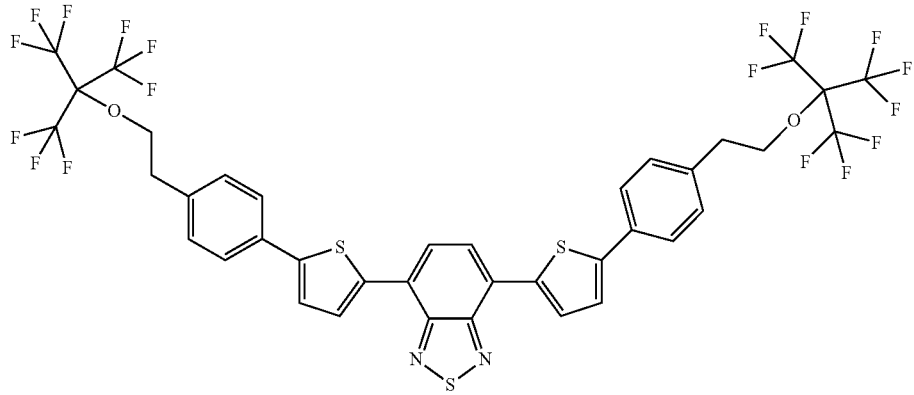
25
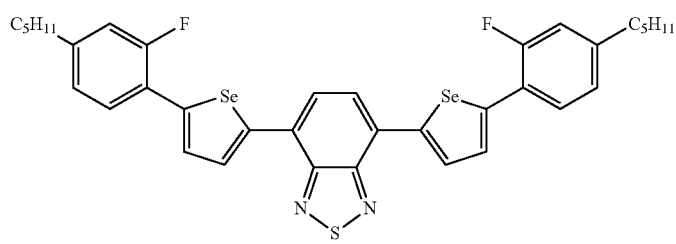
26
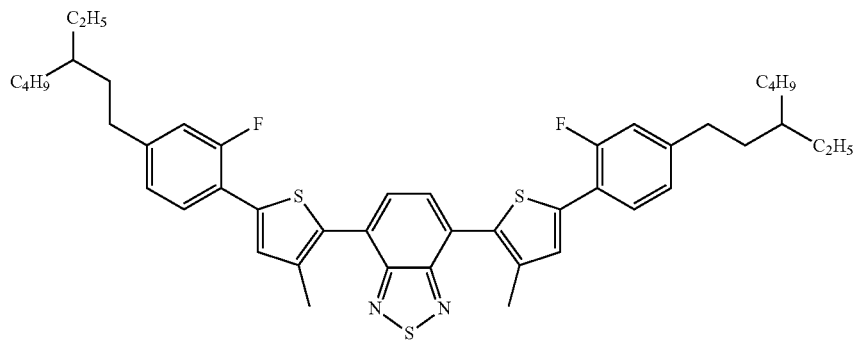
27
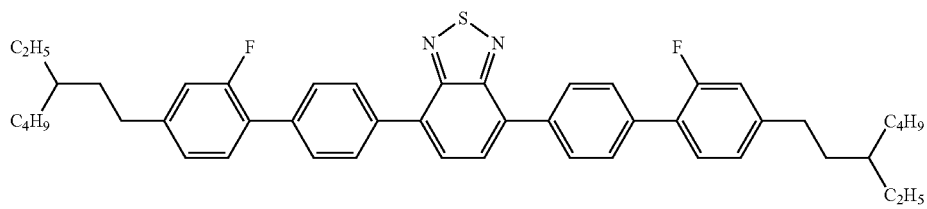
28
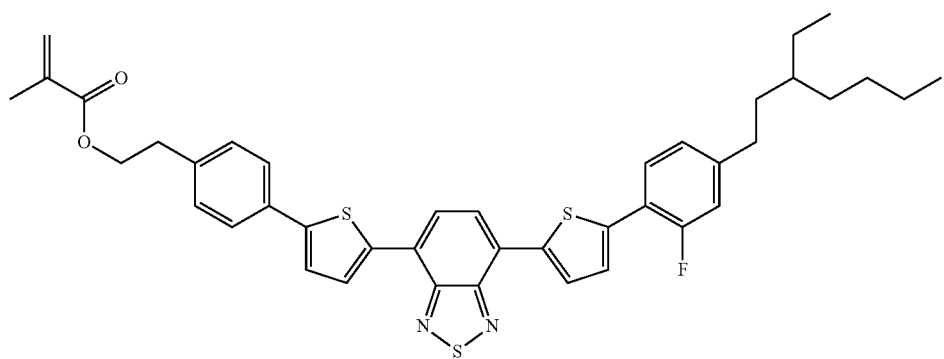
29

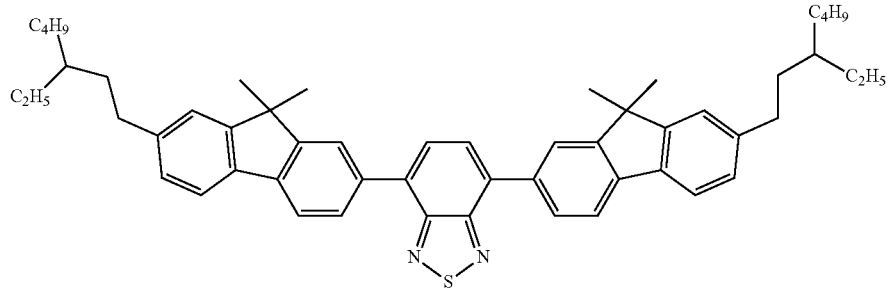
30
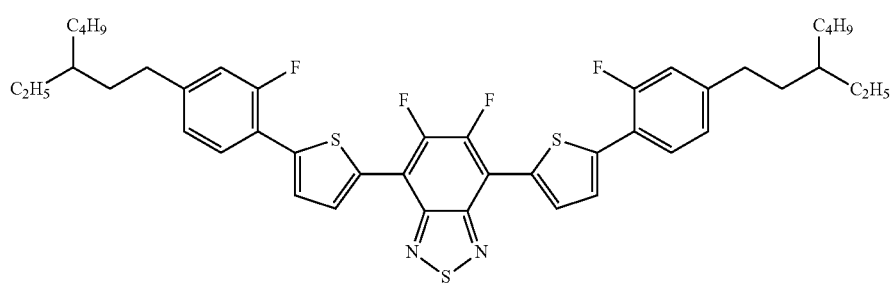
31
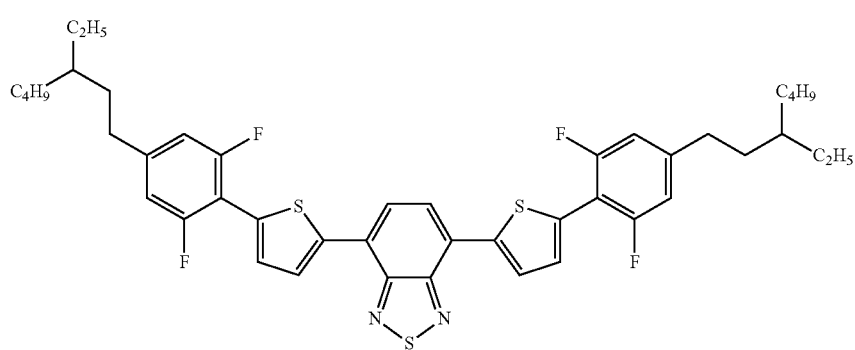
32
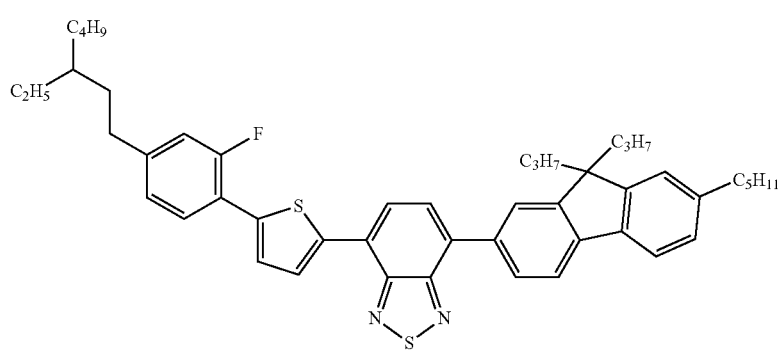
33
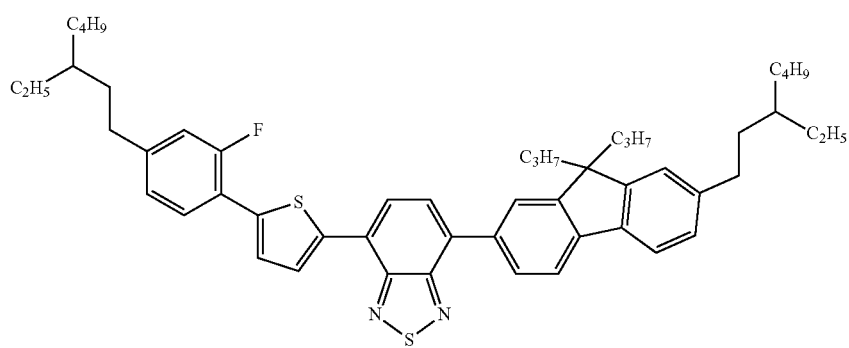
34

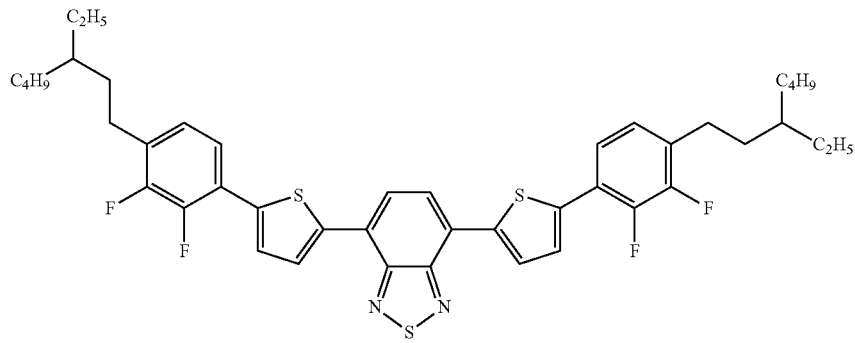
35
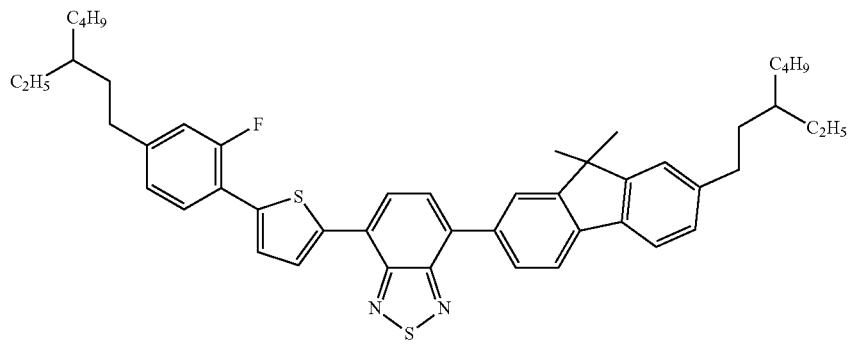
36
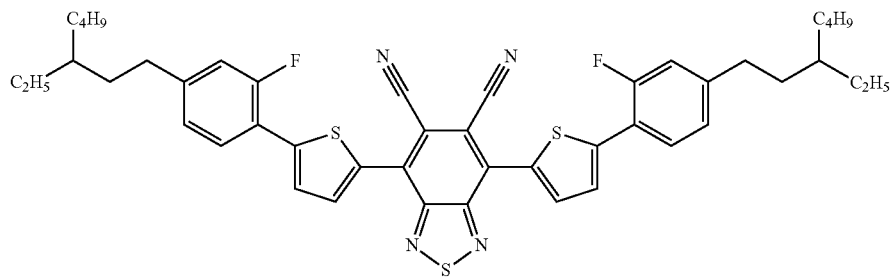
37
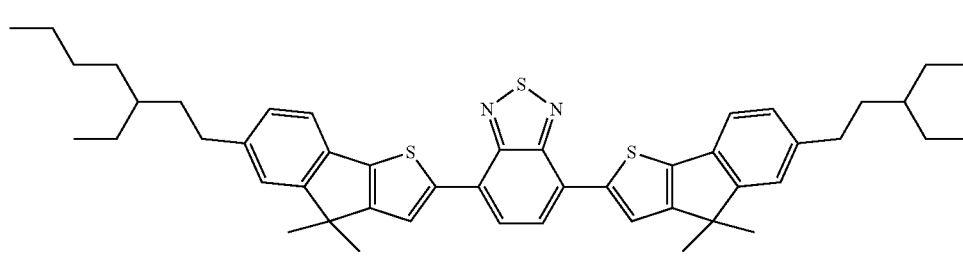
38
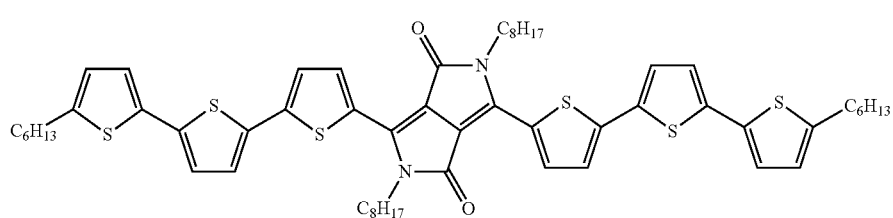
39

-continued
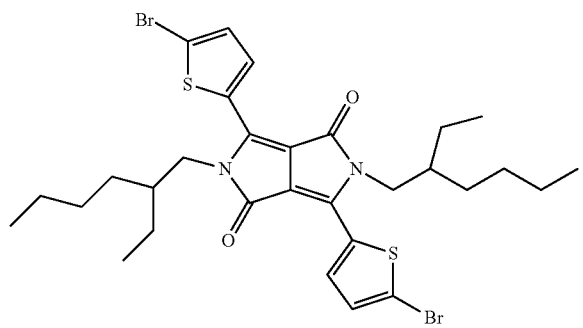
40
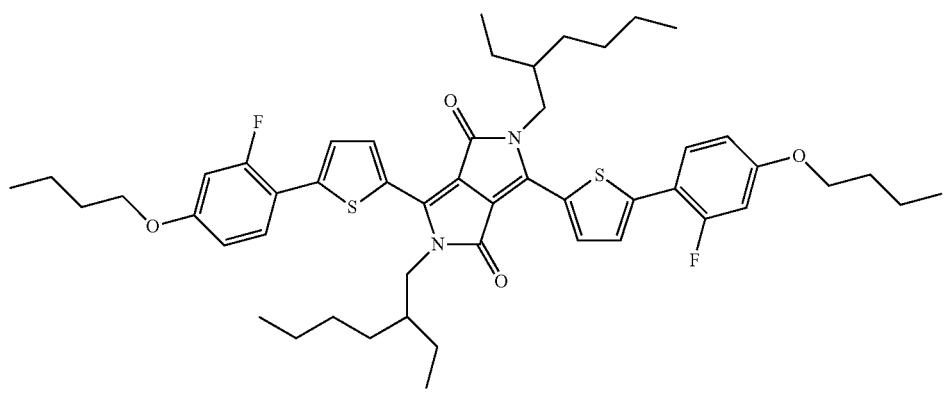
41
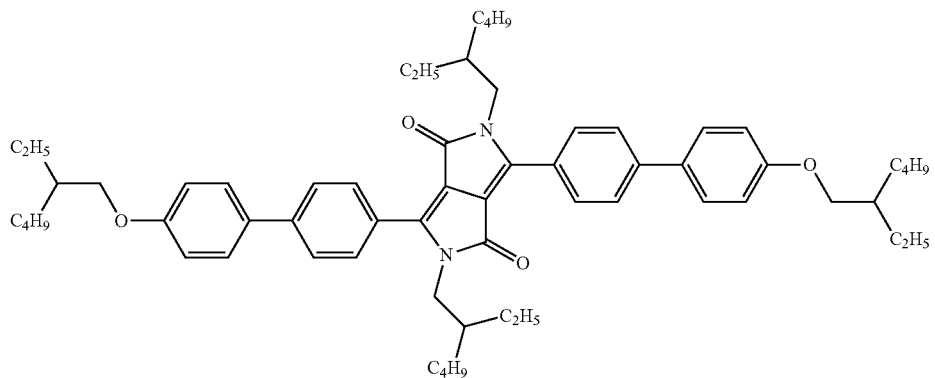
42
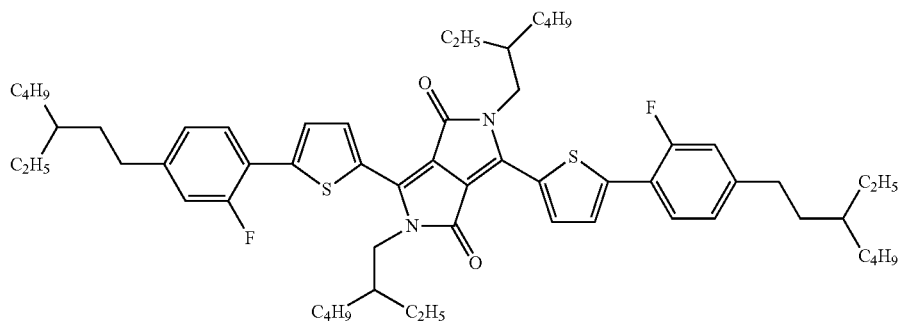
43

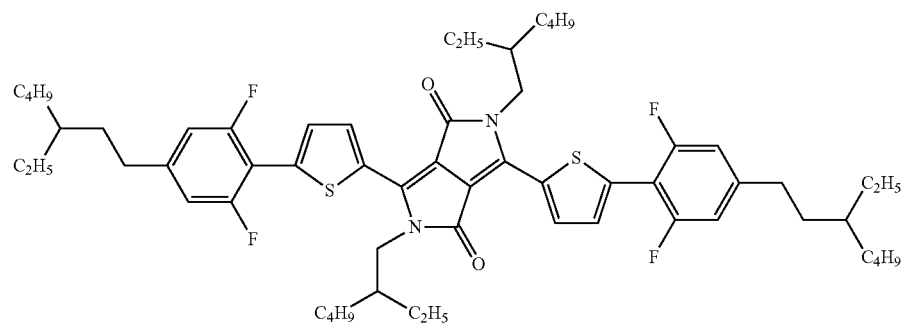
44
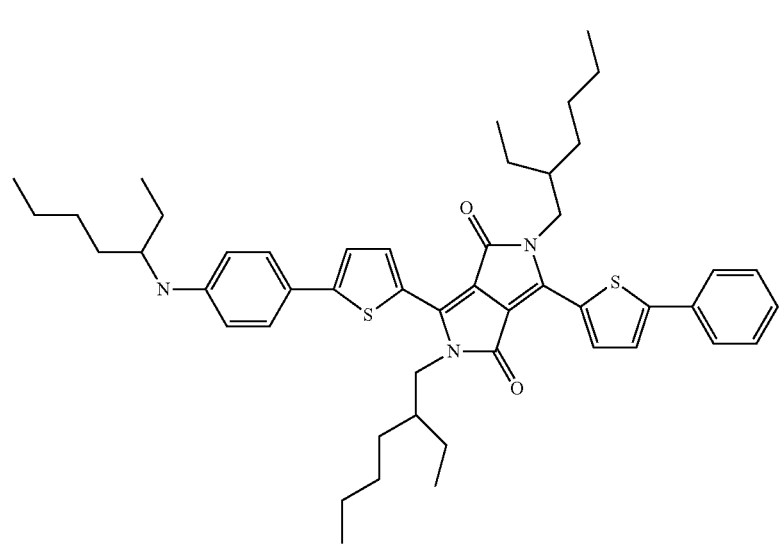
45
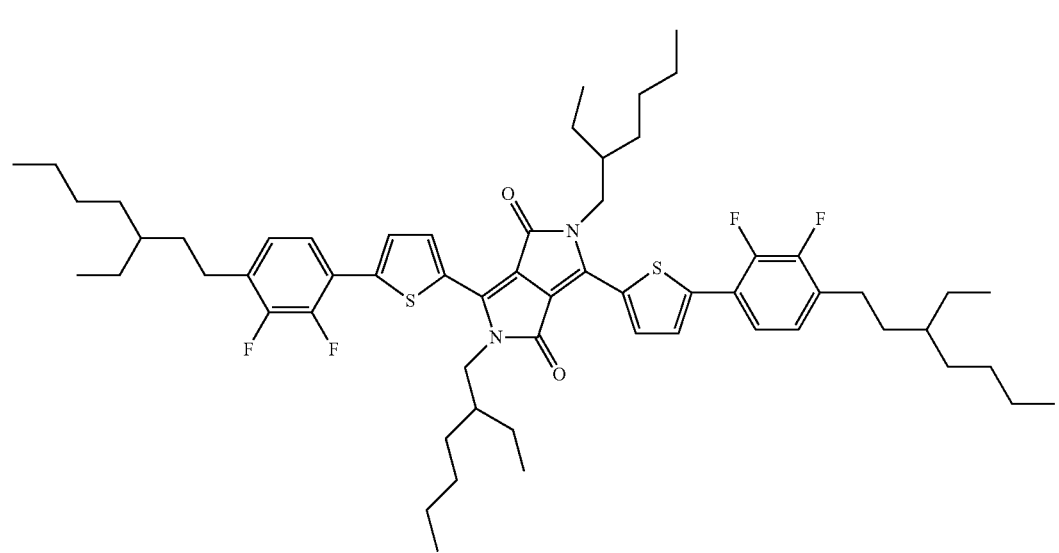
46

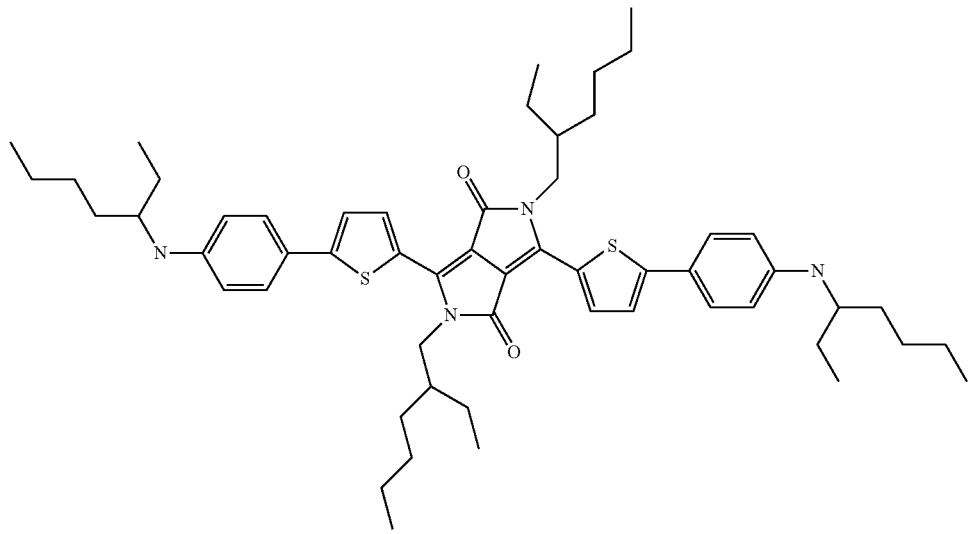
47
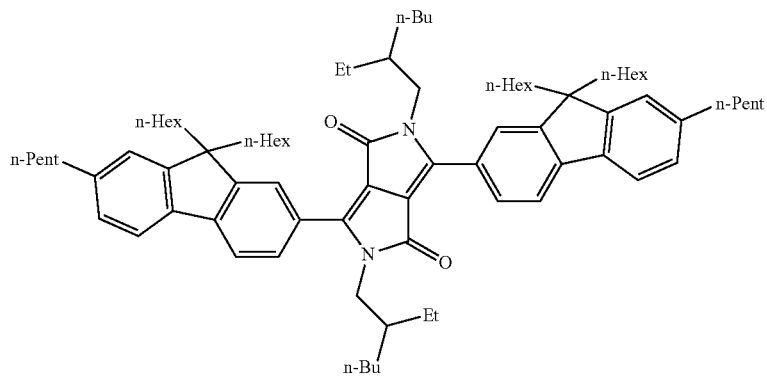
48
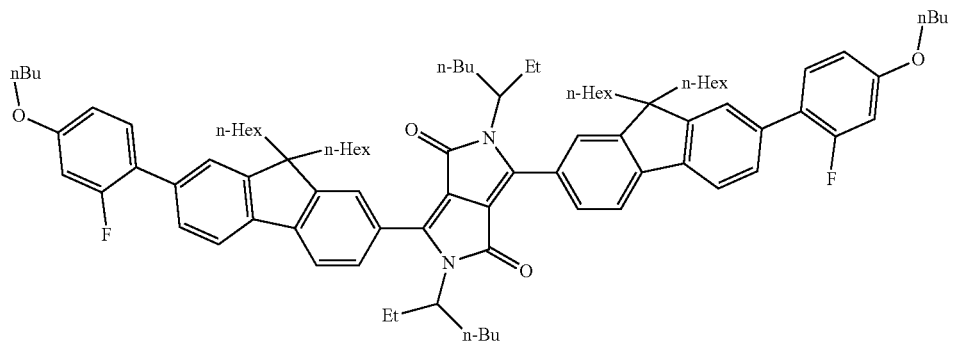
49
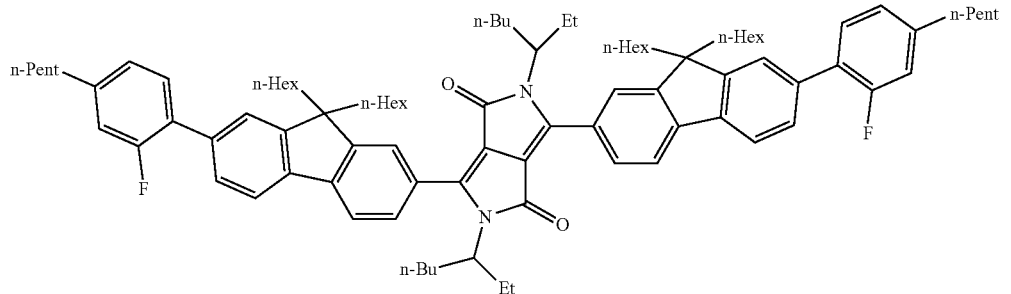
50

-continued
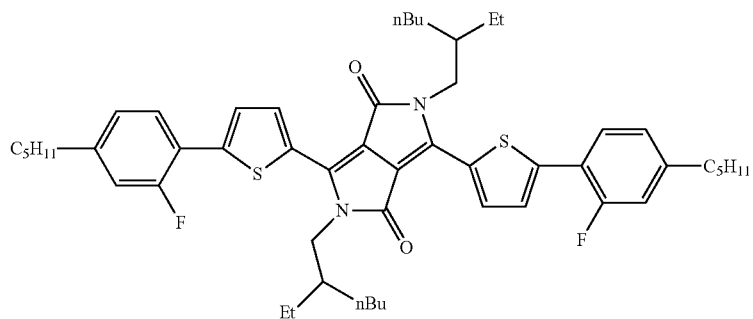
51
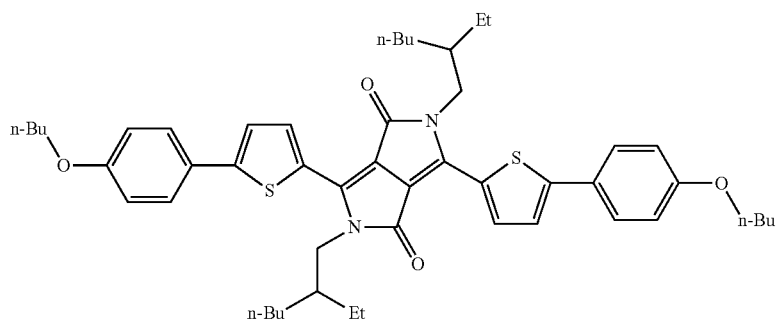
52
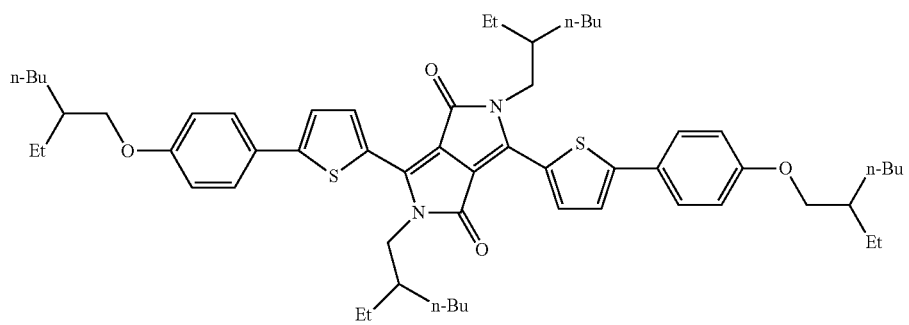
53
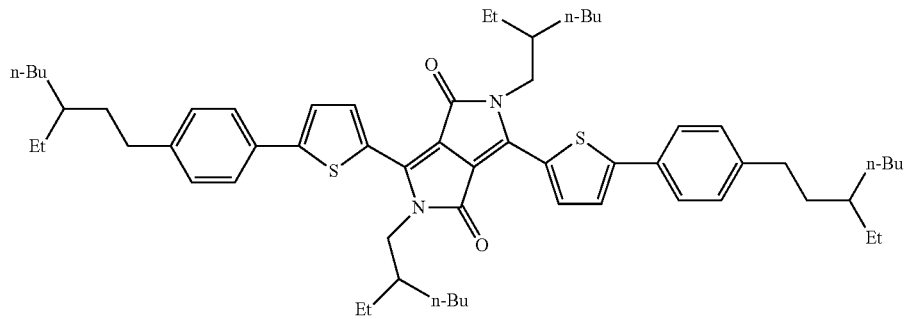
54
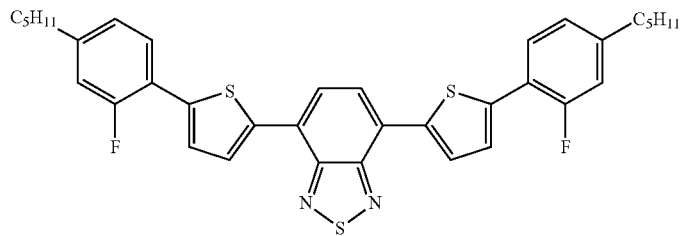
55

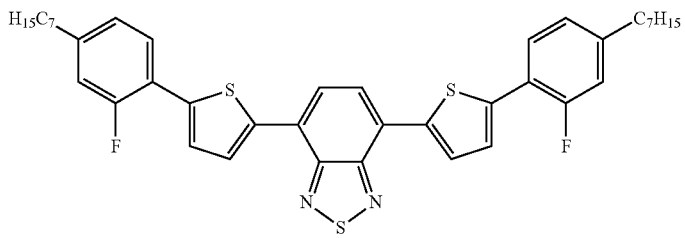
56
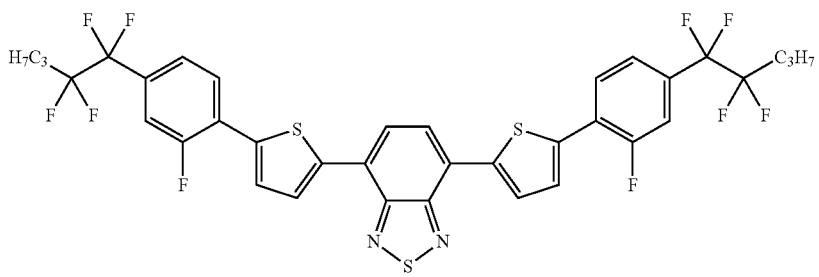
57
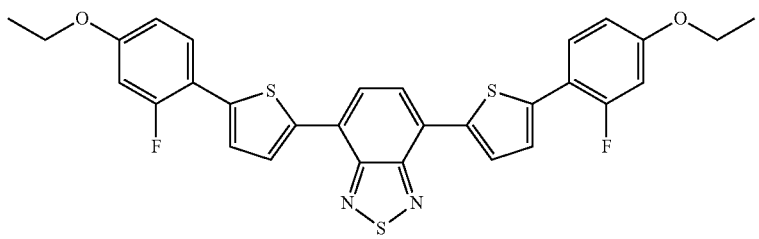
58
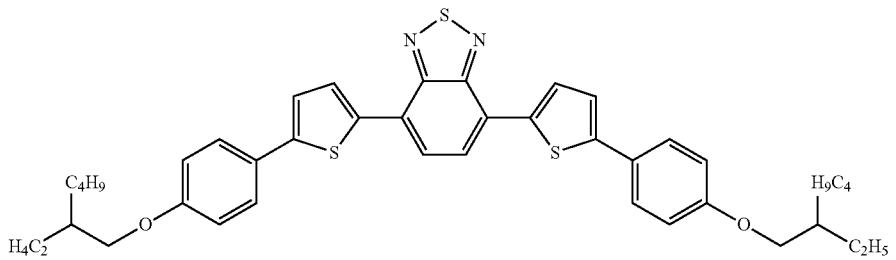
59
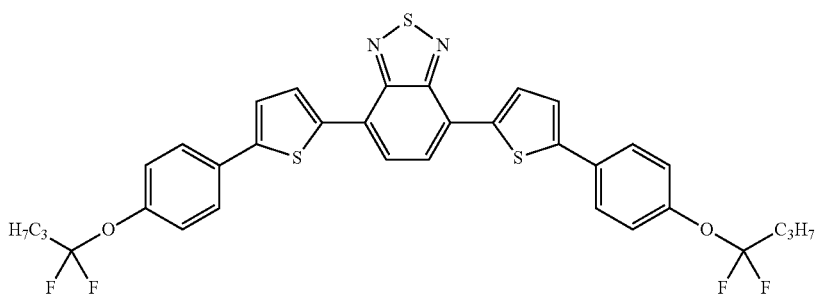
60
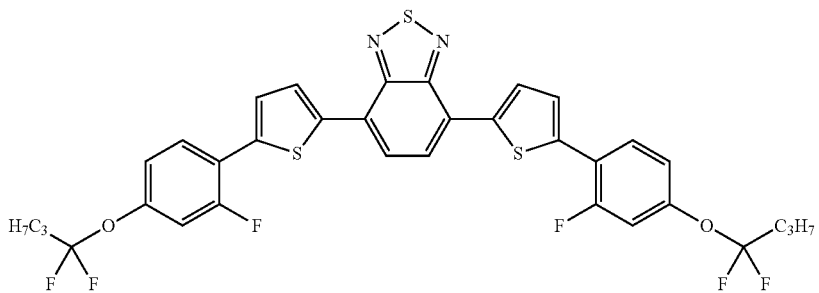
61

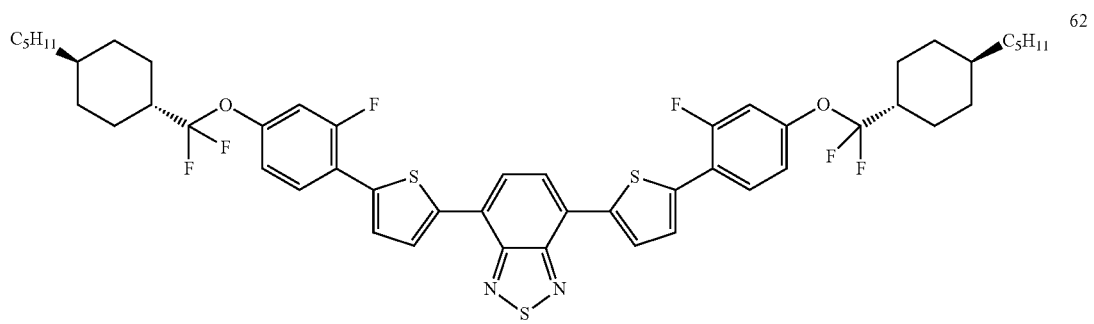
62
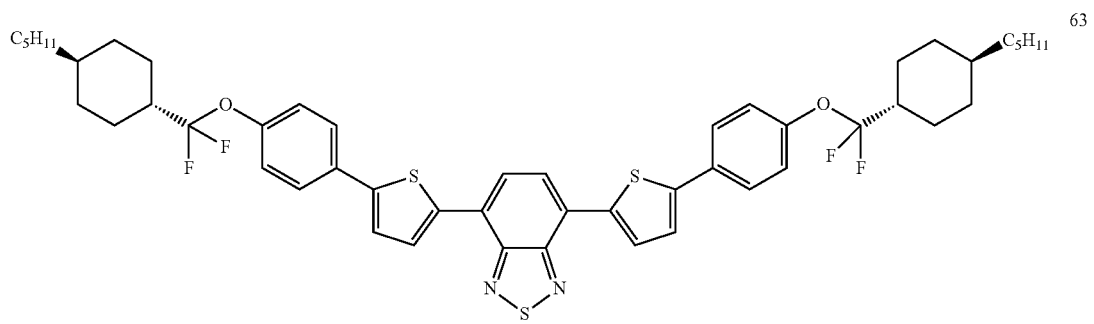
63
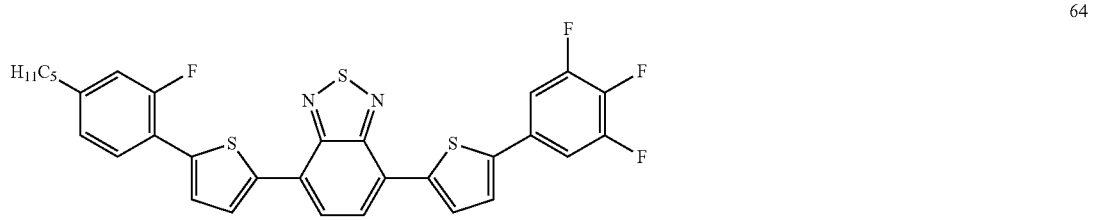
64
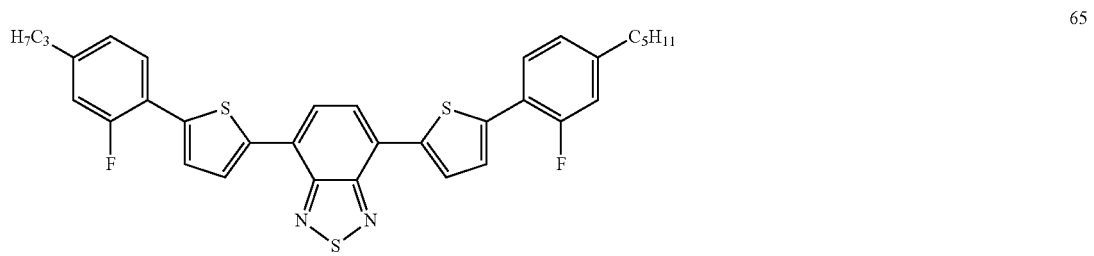
65
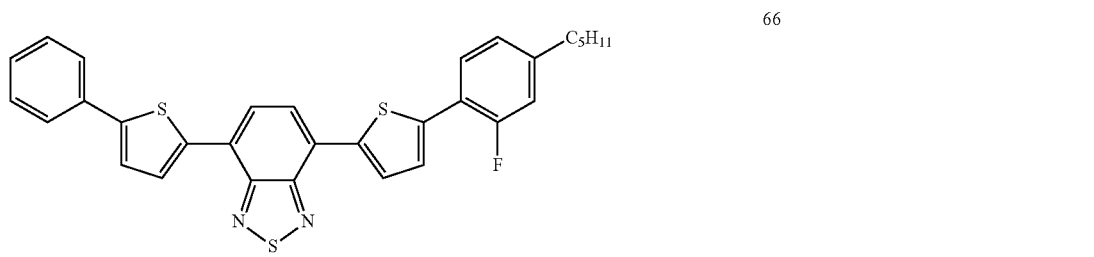
66
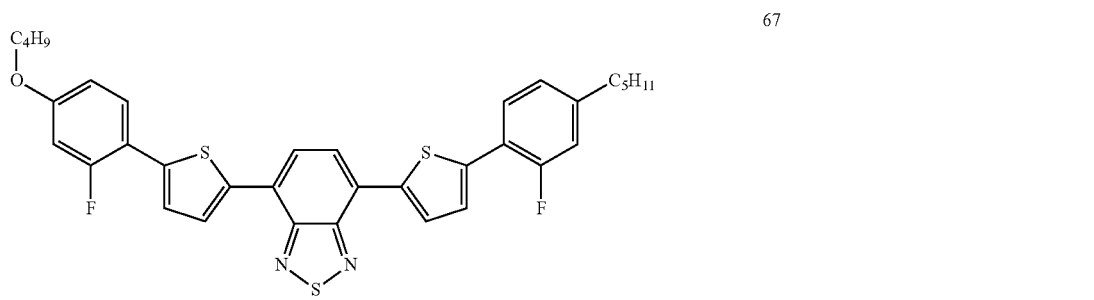
67

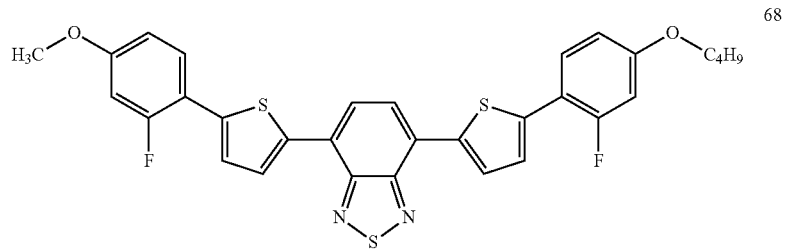
68
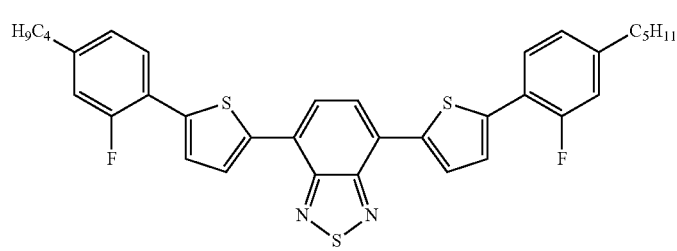
69
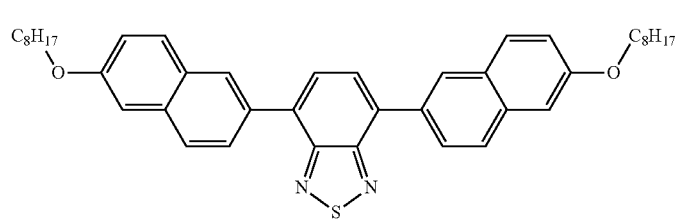
70
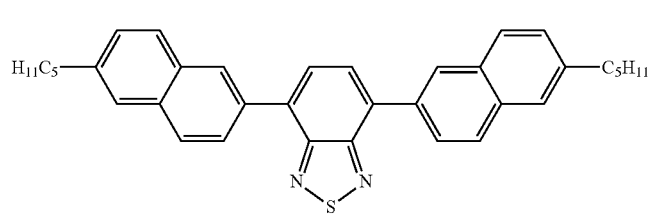
71
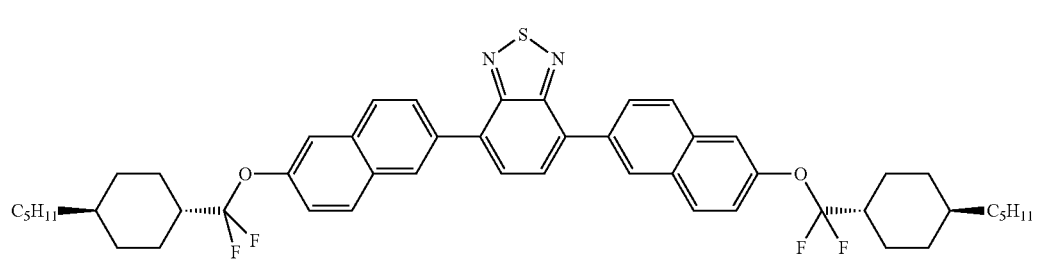
72
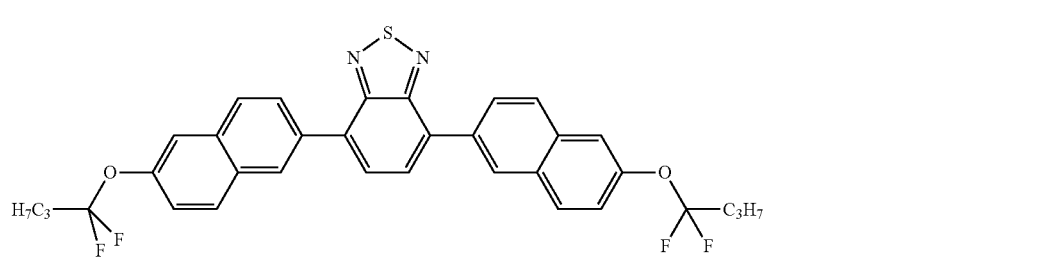
73
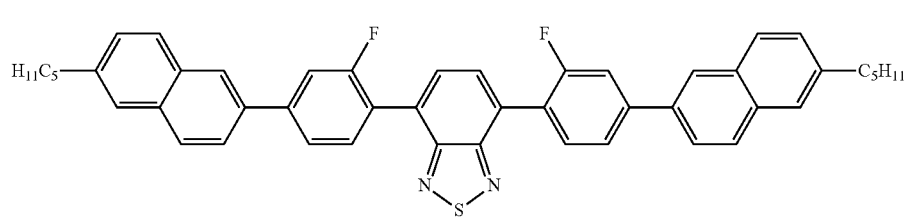
74

75
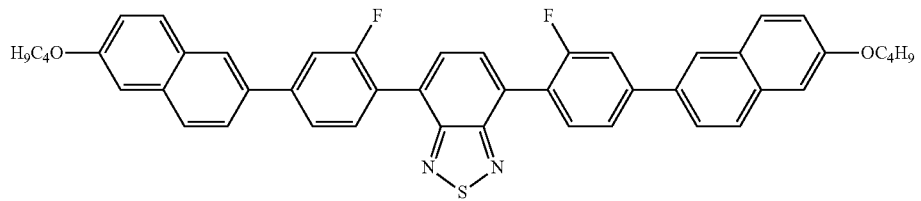
76
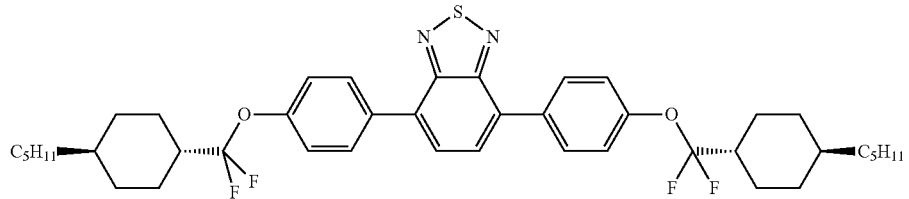
77
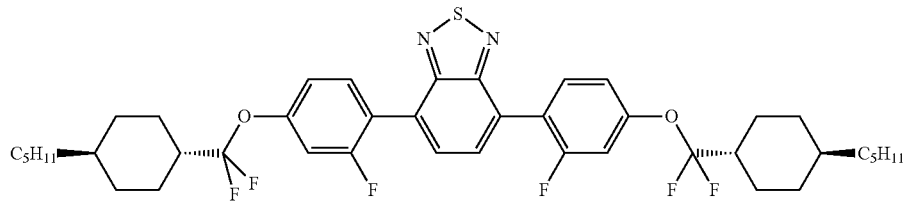
78
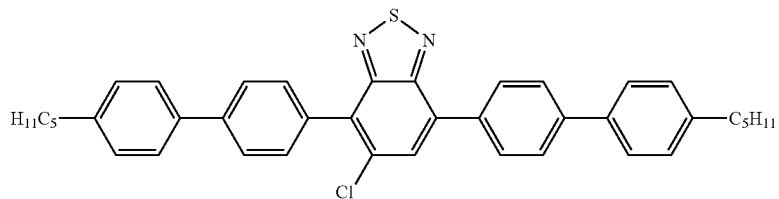
79
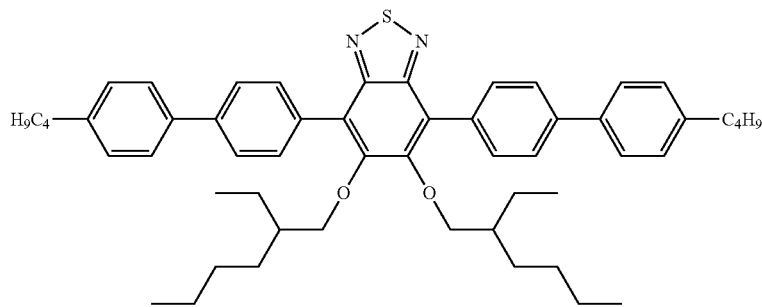
80
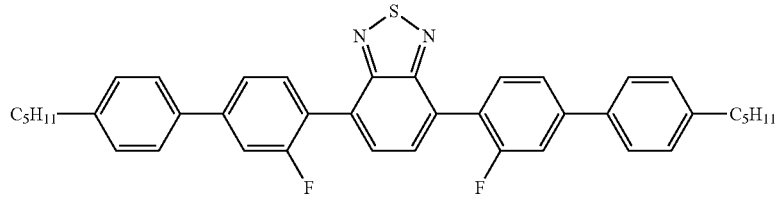
81
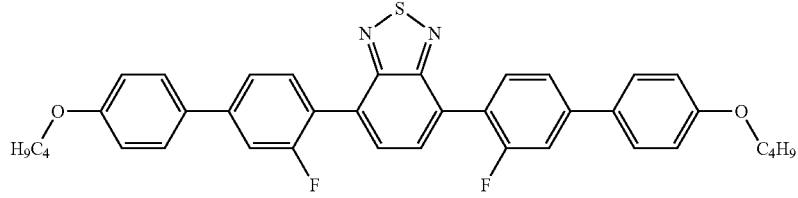

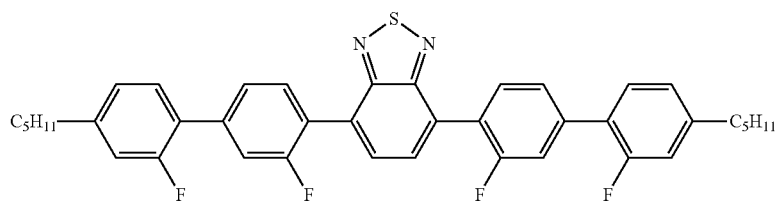
82
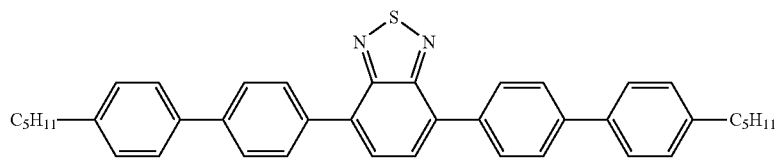
83
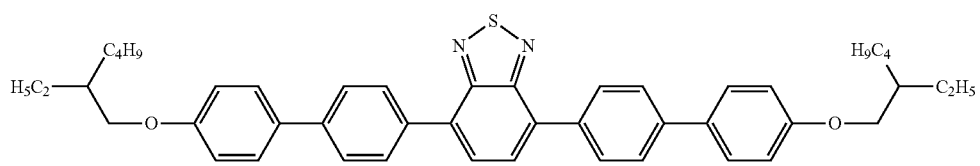
84
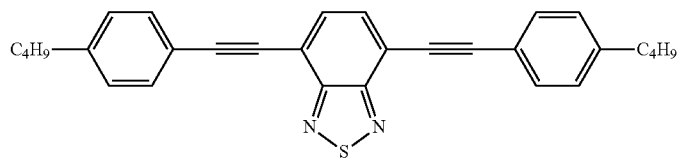
85
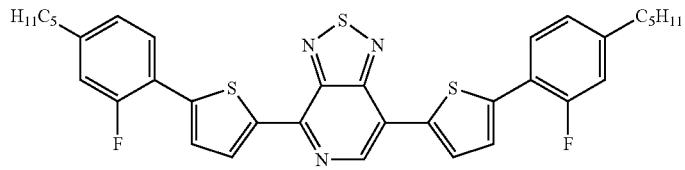
86
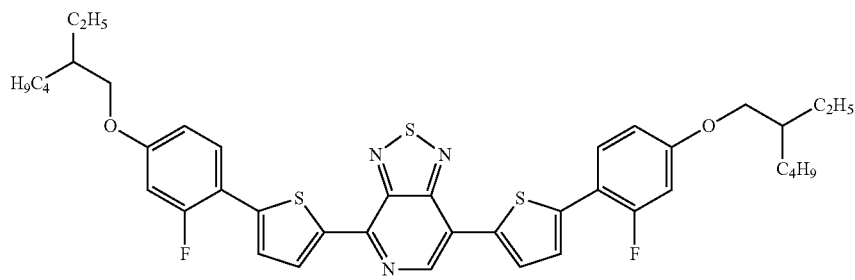
87
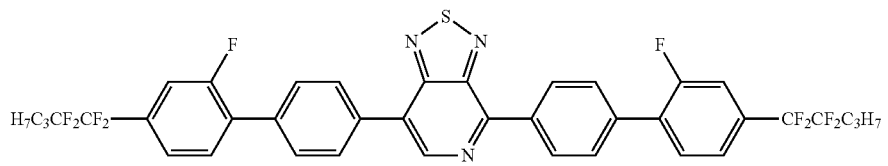
88
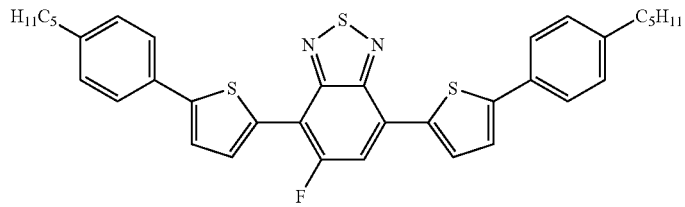
89

90
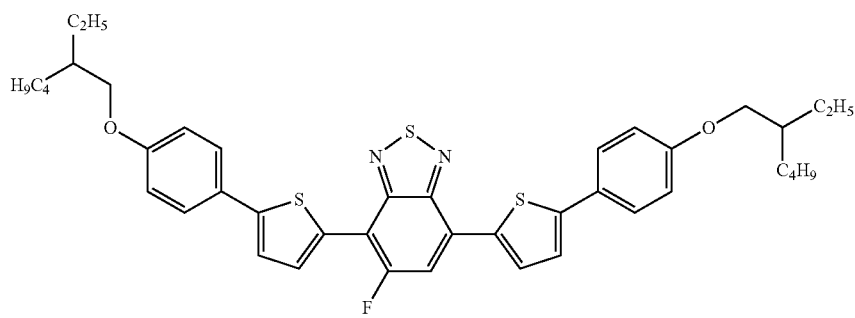
91
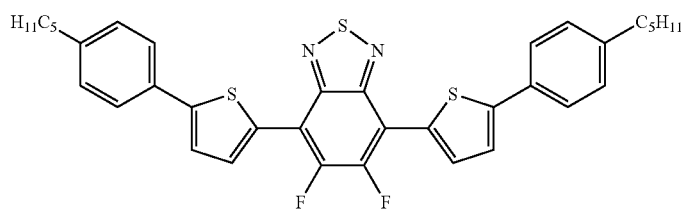
92
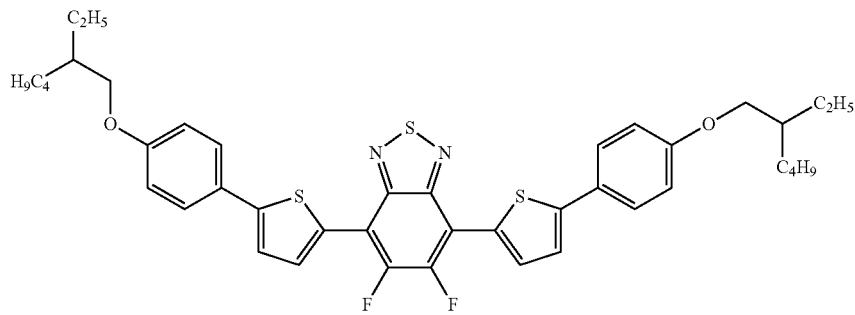
93
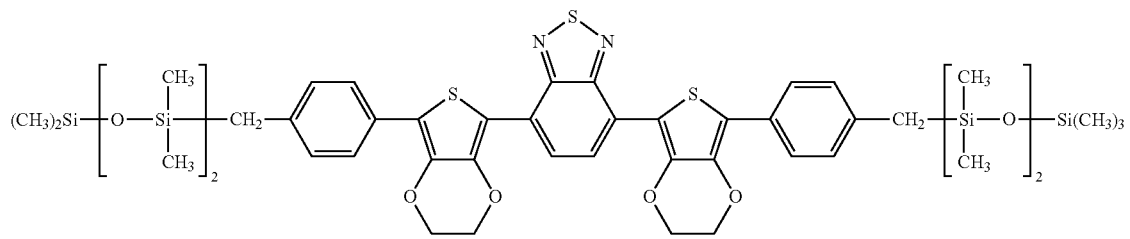
94
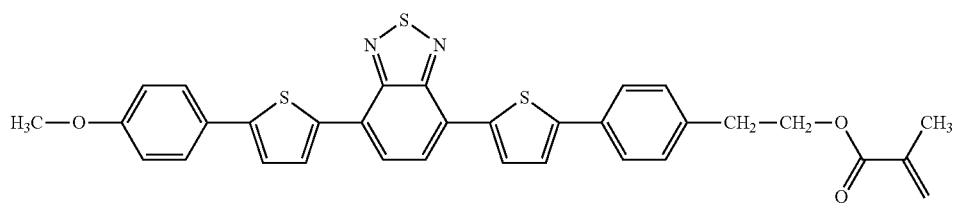
95
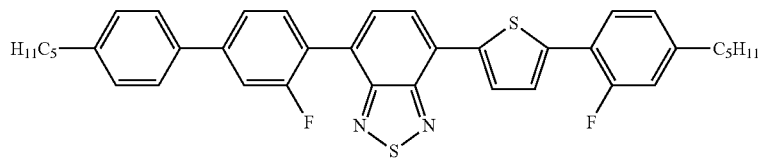
96
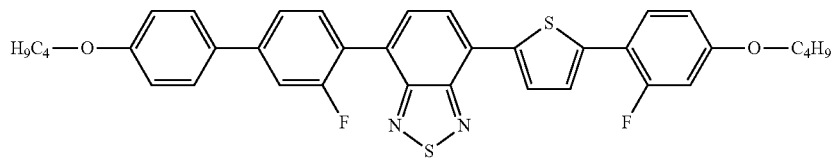

-continued
97
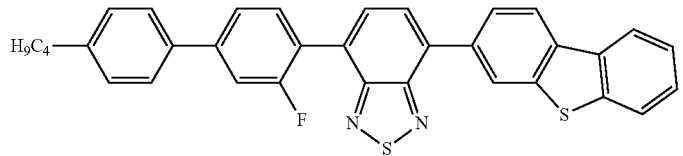
98
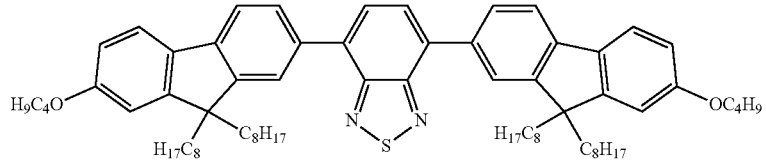
99
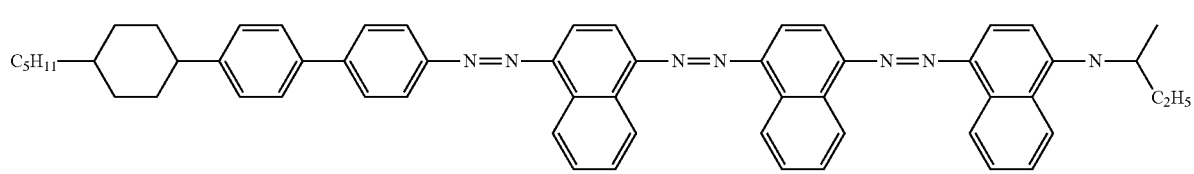
100
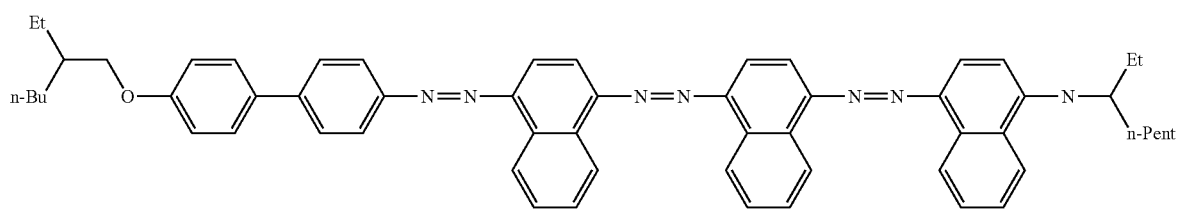
101
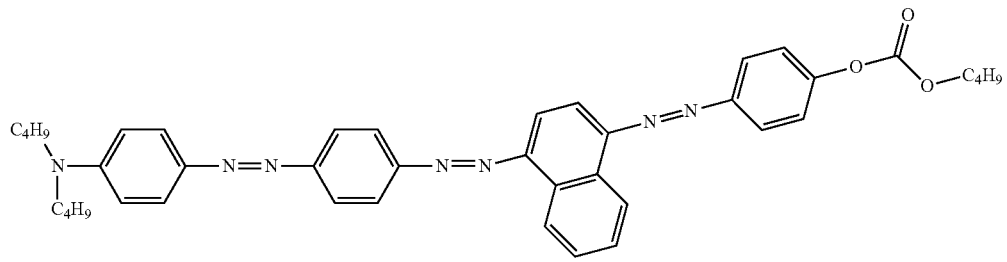
102
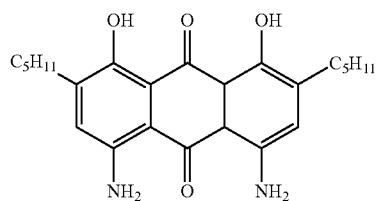
103
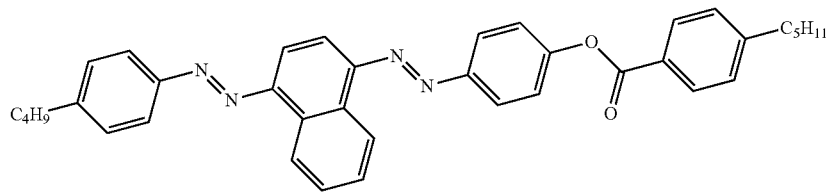

The liquid-crystalline material may, in a certain preferred embodiment, comprise one or more chiral dopants. In this case, the molecules of the liquid-crystalline material are preferably in twisted form with respect to one another in the layer of a device comprising the liquid-crystalline material, particularly preferably as known from the TN mode of display devices.

Chiral dopants are preferably used in a total concentration of 0.01% by weight to 3% by weight, particularly preferably 0.05% by weight to 1% by weight. In order to obtain high values for the twist, the total concentration of the chiral dopants may also be selected higher than 3% by weight, preferably up to a maximum of 10% by weight.

The proportions of these compounds and other components present in minor amounts are neglected when specifying the proportions of the compounds and the dye F in the liquid-crystalline material.

Preferred dopants are the compounds depicted in the following table:

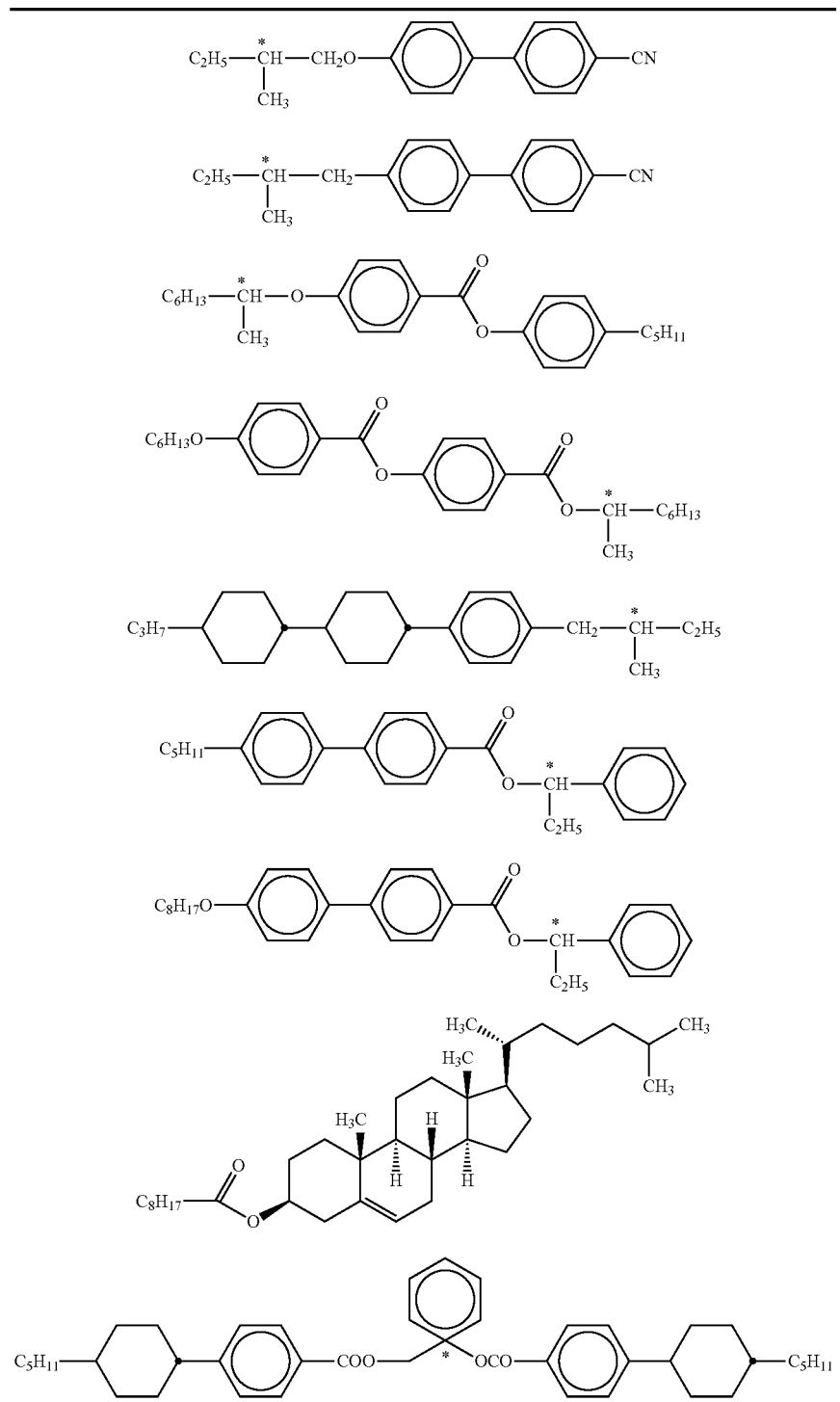

-continued
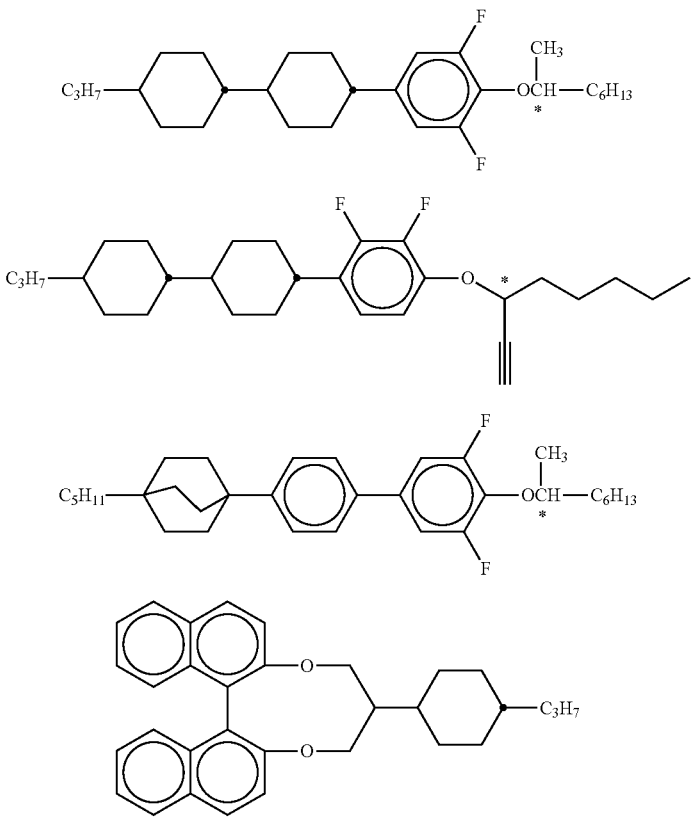
The liquid-crystalline material furthermore preferably comprises one or more stabilisers. The total concentration of the stabilisers is preferably between 0.00001% by weight and 10% by weight, particularly preferably between 0.0001% by weight and 1% by weight of the mixture as a whole.
Preferred stabilisers are shown in the following table:
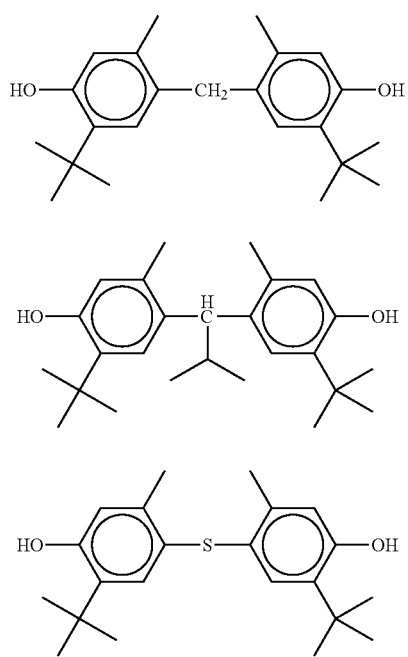

-continued
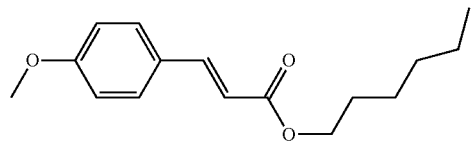 [SMILES: CCCCCCOC(=O)/C=C/c1ccc(OC)cc1]
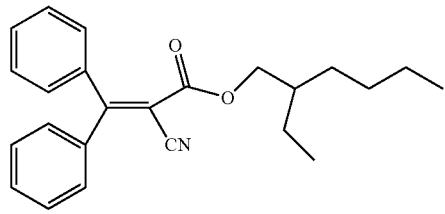 [SMILES: CCCCC(CC)COC(=O)C(C#N)=C(c1ccccc1)c1ccccc1]
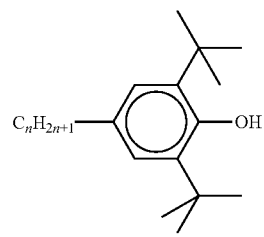
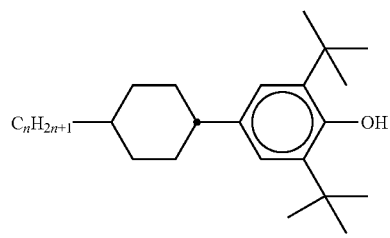
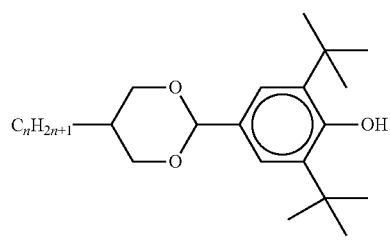
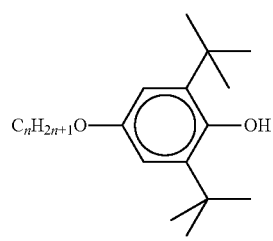
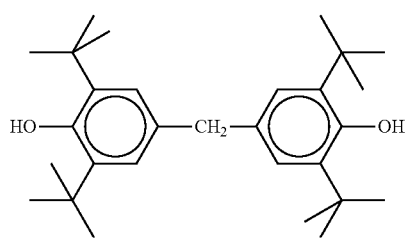

-continued
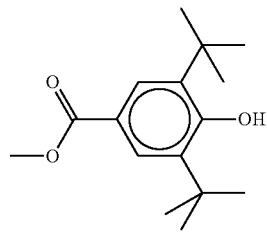
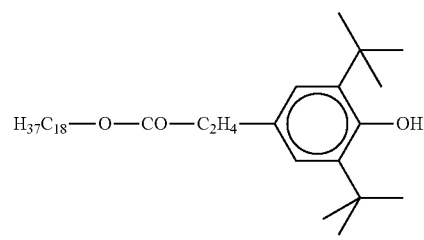
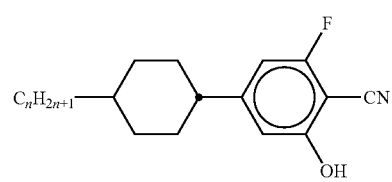
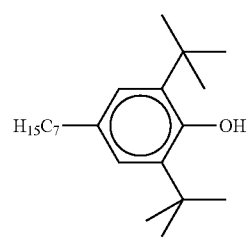
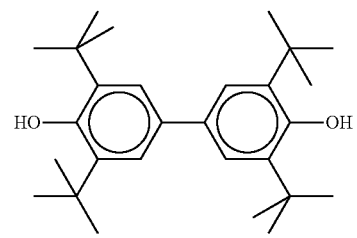

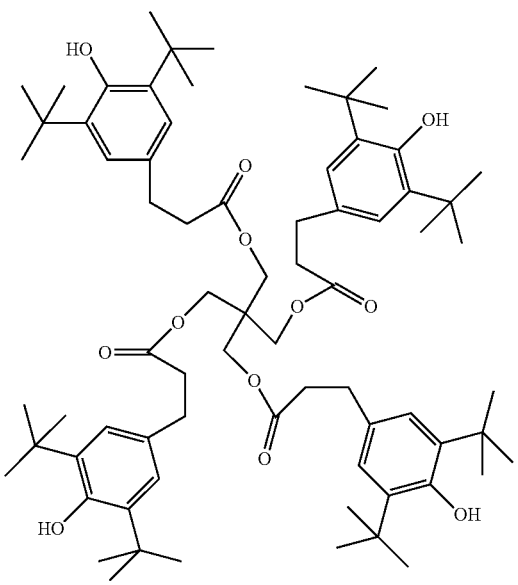 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
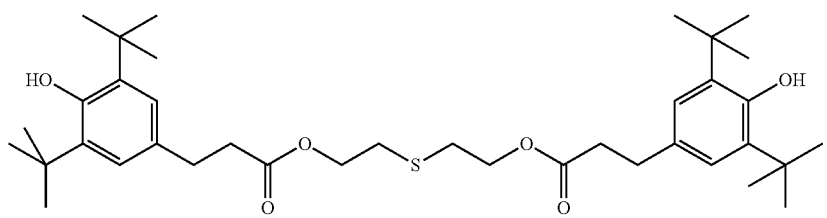 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
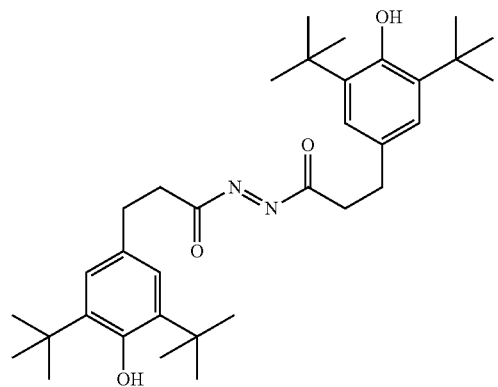 [SMILES: CC(C)(C)c1cc(CCC(=O)/N=N/C(=O)CCc2cc(C(C)(C)C)c(O)c(C(C)(C)C)c2)cc(C(C)(C)C)c1O]
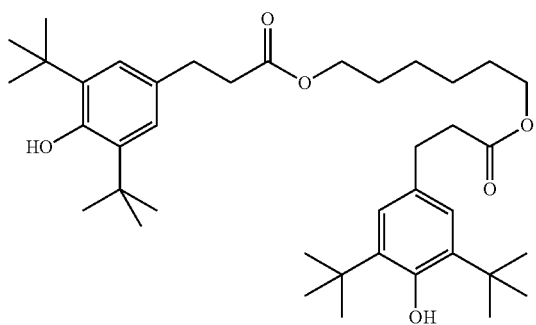 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

-continued
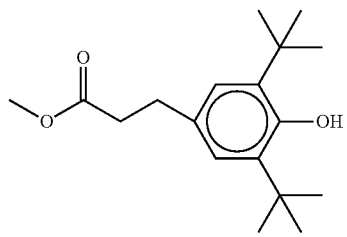
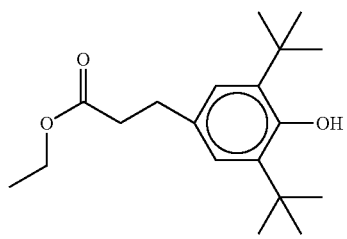
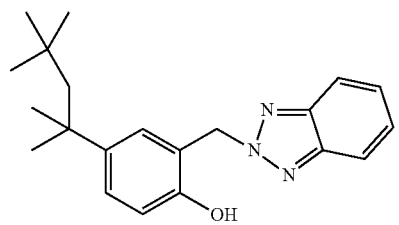 [SMILES: CC(C)(C)CC(C)(C)c1ccc(O)c(Cn2nc3ccccc3n2)c1]
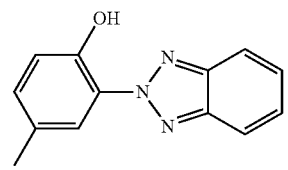 [SMILES: Cc1ccc(O)c(-n2nc3ccccc3n2)c1]
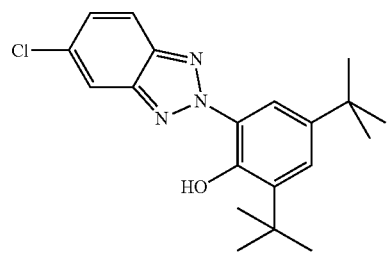 [SMILES: CC(C)(C)c1cc(-n2nc3ccc(Cl)cc3n2)c(O)c(C(C)(C)C)c1]
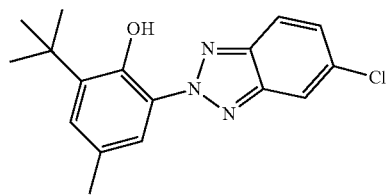 [SMILES: Cc1cc(-n2nc3ccc(Cl)cc3n2)c(O)c(C(C)(C)C)c1]

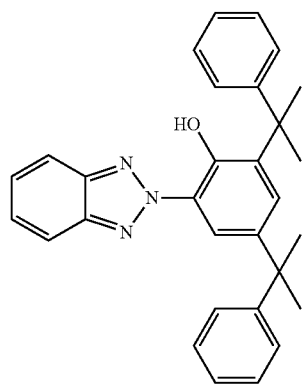 [SMILES: CC(C)(c1ccccc1)c1cc(-n2nc3ccccc3n2)c(O)c(C(C)(C)c2ccccc2)c1]
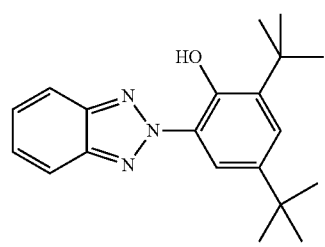 [SMILES: CC(C)(C)c1cc(-n2nc3ccccc3n2)c(O)c(C(C)(C)C)c1]
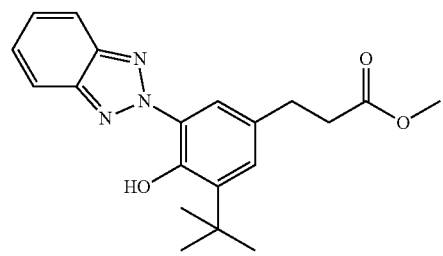 [SMILES: COC(=O)CCc1cc(-n2nc3ccccc3n2)c(O)c(C(C)(C)C)c1]
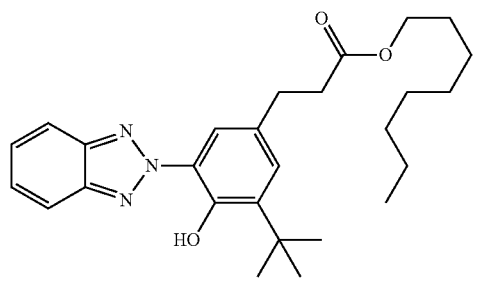 [SMILES: CCCCCCCCOC(=O)CCc1cc(-n2nc3ccccc3n2)c(O)c(C(C)(C)C)c1]
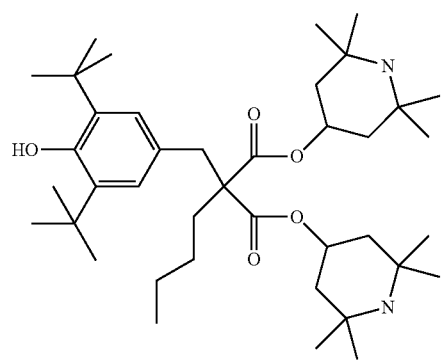 [SMILES: CCCCC(Cc1cc(C(C)(C)C)c(O)c(C(C)(C)C)c1)(C(=O)OC1CC(C)(C)NC(C)(C)C1)C(=O)OC1CC(C)(C)NC(C)(C)C1]

-continued
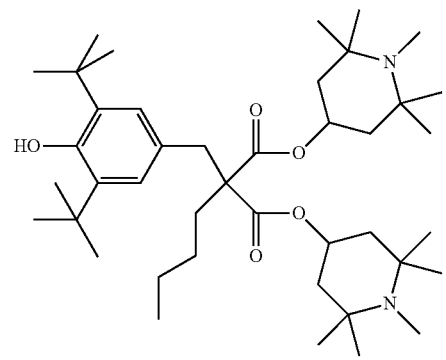 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]
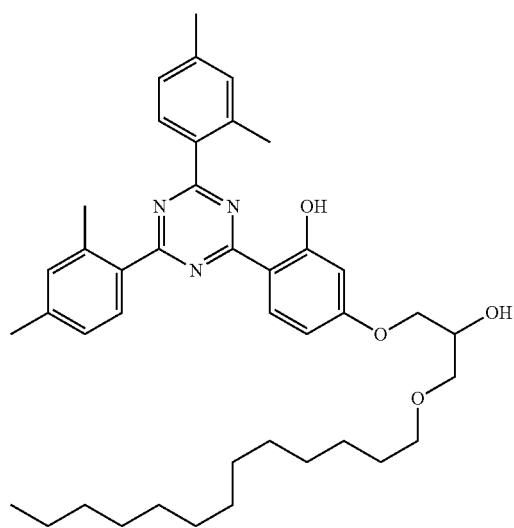 [SMILES: CCCCCCCCCCCCCOCC(O)COc1ccc(-c2nc(-c3ccc(C)cc3C)nc(-c3ccc(C)cc3C)n2)c(O)c1]
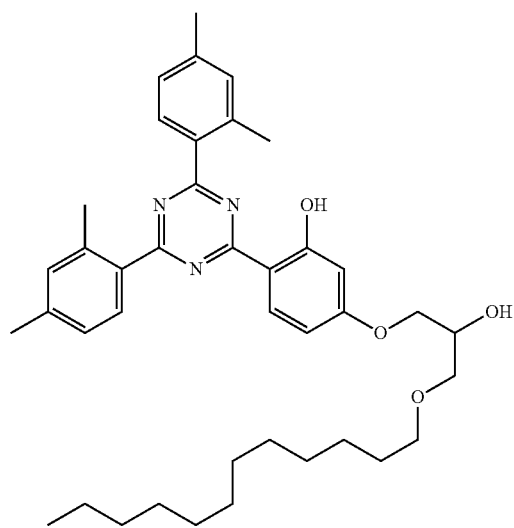 [SMILES: CCCCCCCCCCCCOCC(O)COc1ccc(-c2nc(-c3ccc(C)cc3C)nc(-c3ccc(C)cc3C)n2)c(O)c1]

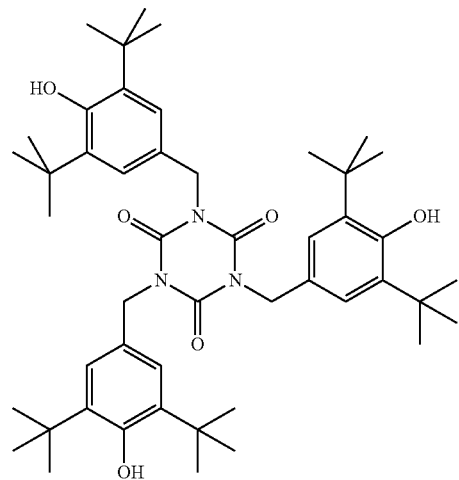 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
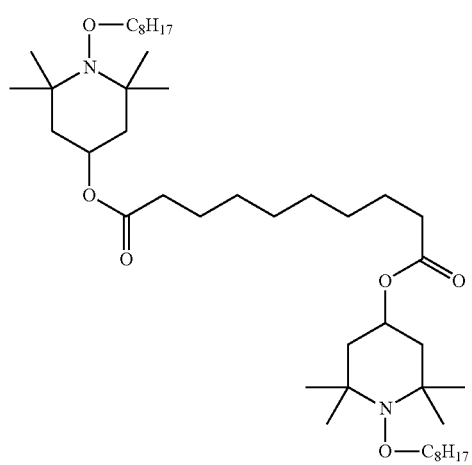
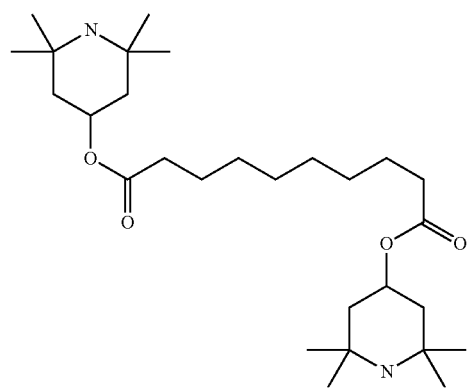

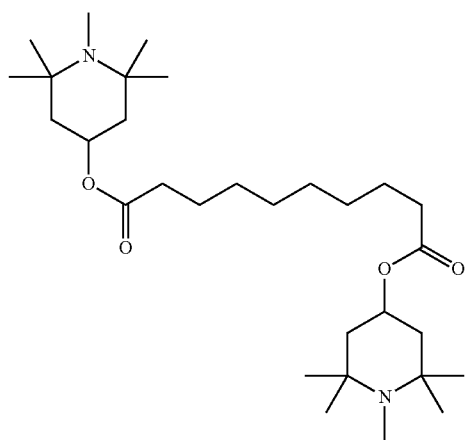
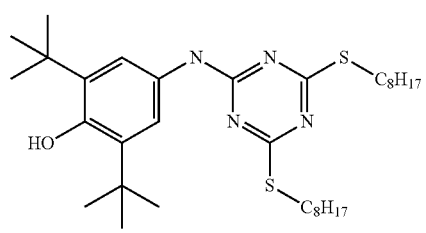
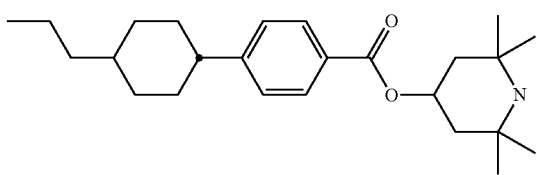
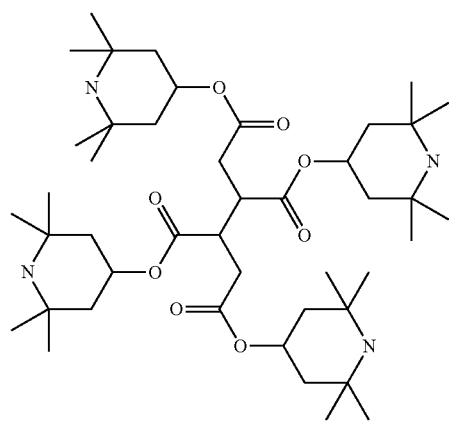

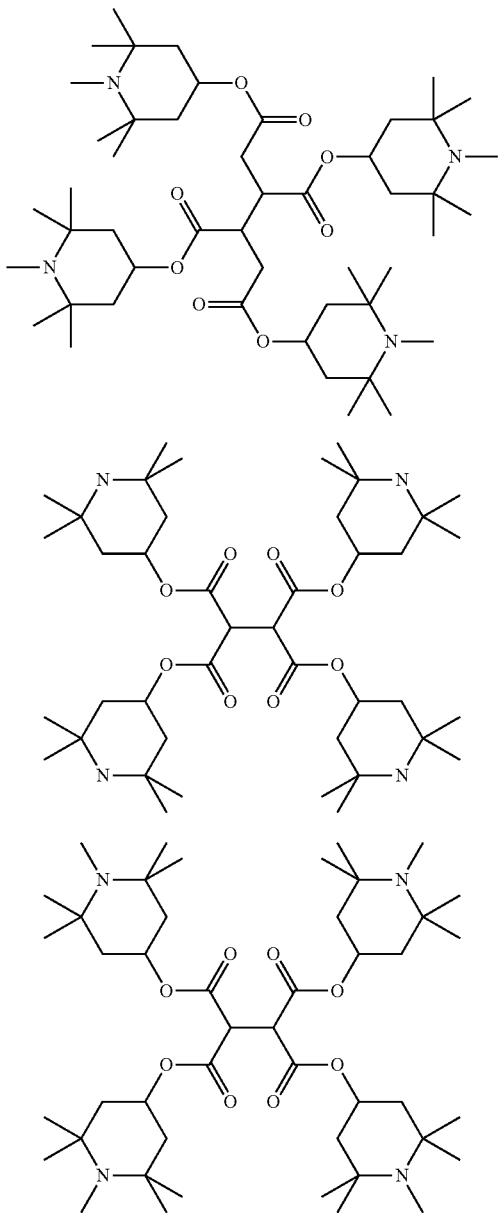

The liquid-crystalline material preferably has a clearing point of higher than 100° C., particularly preferably a clearing point of higher than 105° C., and very particularly preferably a clearing point of higher than 110° C. The clearing point preferably represents the transition between a nematic state and an isotropic state. The way in which the clearing point is determined is indicated in the working examples.

The dielectric anisotropy Δε of the liquid-crystalline material is preferably greater than 3, particularly preferably greater than 5 and very particularly preferably greater than 8.

The liquid-crystalline material, as defined above, can in principle be used in any desired optical switching device. The optical switching device can be used in display devices or in switchable windows.

Preference is given here to the use of the liquid-crystalline material according to the invention in a device for the homogeneous regulation of the passage of light through an area. The device for the homogeneous regulation of the passage of light through an area is preferably employed in a switchable window.

The invention thus relates to a device for the homogeneous regulation of the passage of light through an area, comprising the liquid-crystalline material according to the invention.

The preferred embodiments indicated above in connection with the liquid-crystalline material according to the invention are likewise regarded as preferred here.

The liquid-crystalline material is present in a layer in the device for the homogeneous regulation of the passage of light through an area. This layer is preferably switchable, i.e. is a switching layer.

The device according to the invention is preferably suitable for regulating the passage of light in the form of daylight from the environment into a space. The passage of light to be regulated takes place here from the environment (the outside space) into a space. The space here can be any desired space that is substantially sealed off from the environment, for example a building, a vehicle or a container. The device can generally be used for any desired spaces, particularly if the latter have only limited exchange of air with the environment and have light-transmitting boundary surfaces through which the entry of energy from the outside in the form of light energy can take place. Particularly relevant is the use of the device for spaces which are subjected to strong insolation through light-transmitting areas, for example through window areas.

The device according to the invention is preferably arranged in an opening of a relatively large two-dimensional structure, where the two-dimensional structure itself only allows slight passage of light or none at all, and where the opening transmits light to a greater extent in relative terms. The two-dimensional structure is preferably a wall or another delimitation of a space from the outside. The device according to the invention is preferably characterised in that it has an area of at least 0.05 m$^2$, preferably at least 0.1 m$^2$, particularly preferably at least 0.5 m$^2$ and very particularly preferably at least 0.8 m$^2$.

The device according to the invention is switchable. Switching here is taken to mean a change in the passage of light through the device. The device according to the invention is preferably electrically switchable.

If the device is electrically switchable, it preferably comprises two or more electrodes, which are installed on both sides of the layer comprising the liquid-crystalline material. The electrodes preferably consist of ITO or a thin, preferably transparent metal and/or metal-oxide layer, for example silver or FTO (fluorine-doped tin oxide), or an alternative material known to the person skilled in the art for this use. The ITO electrodes may be provided with a passivation layer, for example comprising SiO$_2$. The electrodes are preferably provided with electrical connections. The voltage is preferably provided by a battery, a rechargeable battery or an external power supply.

The switching operation in the case of electrical switching takes place through alignment of the molecules of the liquid-crystalline material by application of voltage.

In a preferred embodiment, the device is converted from a state having high absorption, i.e. low light transmissivity, which is present without voltage, into a state having lower absorption, i.e. higher light transmissivity, by application of a voltage. The liquid-crystalline material in the layer in the device is preferably nematic in both states. The voltage-free state is preferably characterised in that the molecules of the liquid-crystalline material, and thus the molecules of the dye compound F, are aligned parallel to the plane of the switching layer. This is preferably achieved by a correspondingly selected alignment layer. The state under voltage is preferably characterised in that the molecules of the liquid-crystalline material, and thus the molecules of the dye compound F, are perpendicular to the plane of the switching layer.

According to a preferred embodiment of the invention, the device can be operated without an external power supply by providing the energy required by means of a solar cell or another device for the conversion of light and/or heat energy into electrical energy which is connected to the device. The provision of the energy by means of the solar cell can take place directly or indirectly, i.e. via a battery or rechargeable battery or other unit for the storage of energy connected in-between. The solar cell is preferably mounted on the outside of the device or is an internal component of the device, as disclosed, for example, in WO 2009/141295.

The device according to the invention preferably has the following layer sequence, where further layers may additionally be present. The layers indicated below are preferably directly adjacent to one another in the device:
  substrate layer, preferably comprising glass or polymer
  electrically conductive transparent layer, preferably comprising ITO
  alignment layer
  switching layer comprising the liquid-crystalline material
  alignment layer
  electrically conductive transparent layer, preferably comprising ITO
  substrate layer, preferably comprising glass or polymer The preferred embodiments of the individual layers are described below.

The device according to the invention preferably comprises one or more, particularly preferably two, alignment layers. The alignment layers are preferably directly adjacent to the two sides of the layer comprising the liquid-crystalline material.

The alignment layers used in the device according to the invention can be any desired layers known to the person skilled in the art for this purpose. Preference is given to polyimide layers, particularly preferably layers comprising rubbed polyimide. Polyimide rubbed in a certain manner known to the person skilled in the art results in alignment of the molecules of the liquid-crystalline material in the rubbing direction if the molecules are parallel to the alignment layer (planar alignment). It is preferred here for the molecules of the liquid-crystalline material not to be completely planar on the alignment layer, but instead to have a slight pretilt angle. In order to achieve vertical alignment of the compounds of the liquid-crystalline material to the surface of the alignment layer (homeotropic alignment), polyimide treated in a certain manner is preferably employed as material for the alignment layer (polyimide for very high pretilt angles). Furthermore, polymers obtained by an exposure process to polarised light can be used as alignment layer in order to achieve alignment of the compounds of the liquid-crystalline material in accordance with an alignment axis (photo-alignment).

The layer comprising the liquid-crystalline material in the device according to the invention is furthermore preferably arranged between two substrate layers or enclosed thereby. The substrate layers can consist, for example, of glass or a polymer, preferably a light-transmitting polymer.

The device is preferably characterised in that it does not comprise a polymer-based polariser, particularly preferably does not comprise a polariser in the solid material phase and very particularly preferably comprises no polariser at all.

However, according to an alternative embodiment, the device may also comprise one or more polarisers. The polarisers in this case are preferably linear polarisers.

In the device according to the invention, both absorptive and also reflective polarisers can be employed. Preference is given to the use of polarisers which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU-1220DUN polariser film.

The device according to the invention furthermore preferably comprises an optical waveguide system which transports light to a solar cell or another device for the conversion of light and/or heat energy into electrical energy, preferably as described in WO 2009/141295.

In a preferred embodiment, the device according to the invention is a component of a window which can be switched in its light transmission, particularly preferably a window comprising at least one glass surface, very particularly preferably a window which comprises multipane insulating glass.

Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass surface of a window, particularly preferably in the interspace between two glass panes of multipane insulating glass.

The invention furthermore relates to a window which can be switched in its light transmission, containing a device according to the invention, preferably having the preferred features indicated above.

WORKING EXAMPLES

A) General Process

The degree of anisotropy R is determined from the value for the extinction coefficient E(p) (extinction coefficient of the mixture on parallel alignment of the molecules to the direction of polarisation of the light) and the value for the extinction coefficient of the mixture E(s) (extinction coefficient of the mixture on perpendicular alignment of the molecules to the direction of polarisation of the light), in each case at the wavelength of the maximum of the absorption band of the dye in question. If the dye has a plurality of absorption bands, the strongest absorption band in the VIS or NIR region is selected. The alignment of the molecules of the mixture is achieved by means of an alignment layer, as is known to the person skilled in the art in the area of LC display technology. In order to eliminate the influences caused by liquid-crystalline medium, other absorptions and/or reflections, a measurement is in each case carried out against an identical mixture comprising no dye and the value obtained is subtracted.

The measurement is carried out using linear-polarised light, whose direction of vibration is either parallel to the alignment direction (determination of E(p)) or perpendicular to the alignment direction (determination of E(s)). This can be achieved by means of a linear polariser, where the polariser is rotated against the device in order to achieve the two different directions of vibration. The measurement of E(p) and E(s) is thus carried out via the rotation of the direction of vibration of the incident polarised light.

The degree of anisotropy R is calculated from the values obtained for E(s) and E(p) in accordance with the formula $$R=[E(p)-E(s)]/[E(p)+2*E(s)],$$

as indicated, inter alia, in "Polarized Light in Optics and Spectroscopy", D. S. Kliger et al., Academic Press, 1990.

The chemical structures of the individual constituents of the mixtures are reproduced by means of abbreviations (acronyms). These abbreviations are explicitly presented and explained in WO 2012/052100 (pp. 63-89), and reference is therefore made to the said application for an explanation.

The clearing point in ° C., the optical anisotropy Δn and the dielectric anisotropy Δε are indicated for the mixtures. The physical properties are determined in accordance with "Merck Liquid Crystals, Physical Properties of Liquid Crystals", Status November 1997, Merck KGaA, Germany, and apply for a temperature of 20° C. The value of Δn is determined at 589 nm and the value of Δε is determined at 1 kHz.

B) Composition of the Host Mixtures (Liquid-crystalline Material without Dye)

|  | H-1 | | H-2 | |
|---|---|---|---|---|
| Clearing point | 109.5° C. | | 124° C. | |
| Dielectric anisotropy Δε | 9.0 | | 12.4 | |
| Optical anisotropy Δn | 0.0986 | | 0.1695 | |
| Composition | Compound | % | Compound | % |
|  | CCGU-3-F | 6 | CPU-3-F | 11 |
|  | CCQU-3-F | 12 | CPU-5-F | 11 |
|  | CCQU-5-F | 10 | CGU-2-F | 7 |
|  | CCU-3-F | 10 | CGU-3-F | 8 |
|  | CGPC-3-3 | 6 | PGU-2-F | 9 |
|  | CP-3-O1 | 10 | PGU-3-F | 9 |
|  | CCZU-3-F | 15 | PGU-5-F | 7 |
|  | CCZU-5-F | 1.5 | CCGU-3-F | 8 |
|  | PGUQU-3-F | 2.5 | CCP-V-1 | 6 |
|  | CPGU-3-OT | 4 | CPPC-3-3 | 3 |
|  | CPG-3-F | 4 | CGPC-3-3 | 5 |
|  | CPP-3-2 | 5 | CGPC-5-3 | 5 |
|  | CC-3-4 | 4 | CGPC-5-5 | 5 |
|  | CC-3-5 | 5 | PGIGI-3-F | 6 |
|  | CC-3-O1 | 5 | | |

|  | H-3 | | H-4 | |
|---|---|---|---|---|
| Clearing point | 108.5° C. | | 114.3° C. | |
| Dielectric anisotropy Δε | 13.4 | | 11.2 | |
| Optical anisotropy Δn | 0.1082 | | 0.0861 | |
| Composition | Compound | % | Compound | % |
|  | CC-3-O1 | 8 | CC-3-V1 | 10 |
|  | CCP-3-1 | 4 | PGUQU-3-F | 4 |
|  | CCP-3-3 | 7 | CCGU-3-F | 5.5 |
|  | CP-3-O1 | 8 | CCG-3-OT | 9 |
|  | CCP-3-OT | 9 | CPU-3-F | 11 |
|  | CCP-5-OT | 5 | CPU-5-F | 4 |
|  | CPU-3-F | 10 | CCQU-3-F | 10 |
|  | CCQU-3-F | 20 | CCQU-5-F | 7.5 |
|  | CCGU-3-F | 2.5 | CCZU-2-F | 4 |
|  | PUQU-3-F | 3 | CCZU-3-F | 12 |
|  | APUQU-2-F | 5 | CCZU-5-F | 4 |
|  | APUQU-3-F | 8 | CCEU-3-F | 12 |
|  | PGUQU-3-F | 5 | CCEU-5-F | 7 |
|  | CPGU-3-OT | 3.5 | | |
|  | CPGP-4-3 | 2 | | |

|  | H-5 (comp.) | |
|---|---|---|
| Clearing point | 114.5° C. | |
| Optical anisotropy Δn | 0.1342 | |
| Composition | Compound | % |
|  | CPG-3-F | 5 |
|  | CPG-5-F | 5 |
|  | CPU-3-F | 15 |
|  | CPU-5-F | 15 |
|  | CP-3-N | 16 |

-continued

| | |
|---|---|
| CP-5-N | 16 |
| CCGU-3-F | 7 |
| CGPC-3-3 | 4 |
| CGPC-5-3 | 4 |
| CGPC-5-5 | 4 |
| CCZPC-3-3 | 3 |
| CCZPC-3-4 | 3 |
| CCZPC-3-5 | 3 |

C) Determination of the Solubility of Dye Compounds

The solubility is determined from supersaturated solutions with regular taking of samples, filtration and spectroscopic determination of the concentration. The sampling is carried out at regular intervals in order to follow the long-term behaviour. The investigation is carried out over 12 weeks. The samples are stored at +20° C. The maximum dye concentration up to which no crystallisation takes place under the conditions indicated is indicated as "solubility".

The following dyes are used here:

D-1

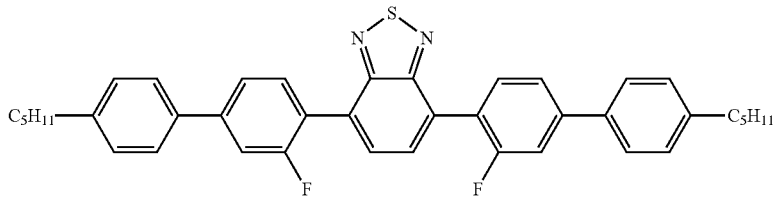

D-2

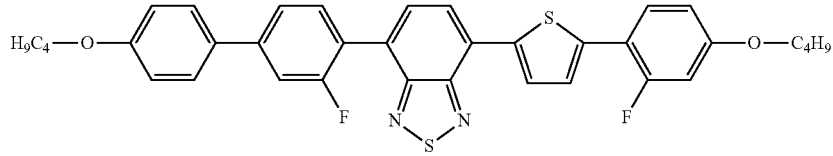

D-3

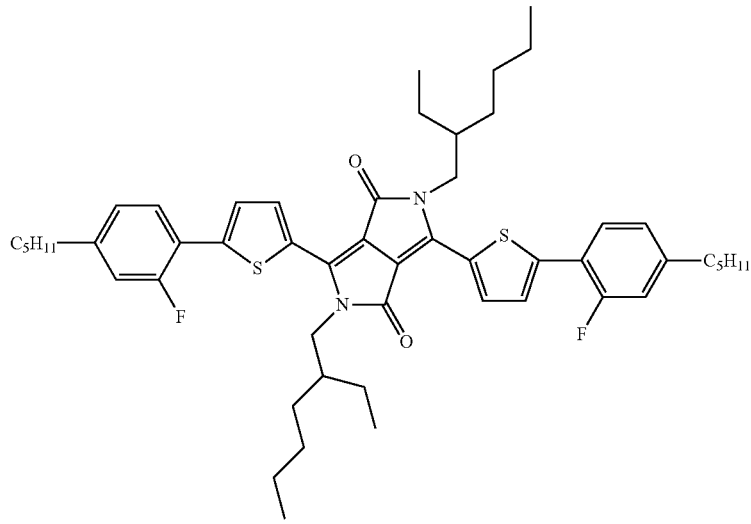

D-4

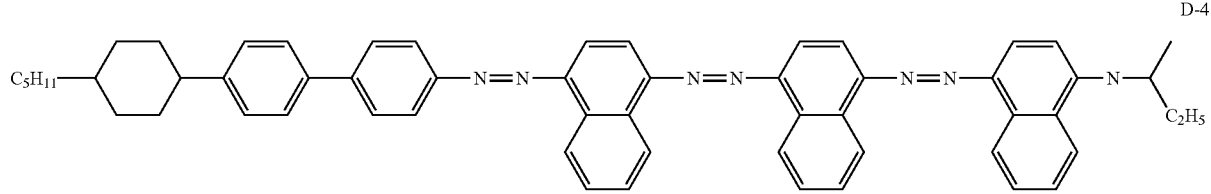

D-5

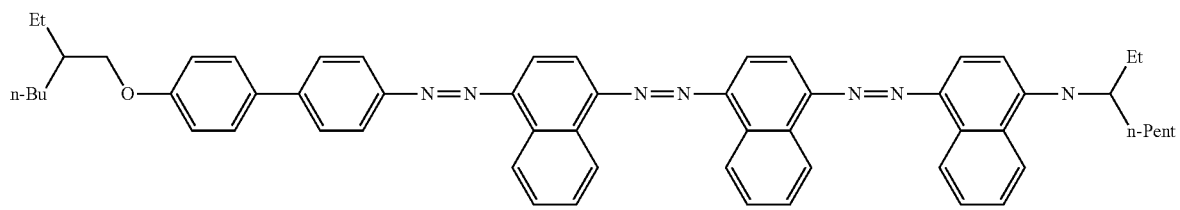

In liquid-crystalline mixture H-1, solubility experiments are carried out with dyes D-1 to D-5.

The following solubilities are obtained here:

| Dye compound | Solubility (% by weight) |
|---|---|
| D-1 | 1.1 |
| D-2 | 1.5 |
| D-3 | 0.6 |
| D-4 | 1.6 |
| D-5 | 2.7 |

In liquid-crystalline mixture H-2, solubility experiments are carried out with dyes D-1 to D-5.

The following solubilities are obtained here:

| Dye compound | Solubility (% by weight) |
|---|---|
| D-2 | 1.5 |
| D-4 | 1.5 |

In liquid-crystalline mixture H-3, solubility experiments are carried out with dyes D-1 to D-5.

The following solubilities are obtained here:

| Dye compound | Solubility (% by weight) |
|---|---|
| D-2 | 1.5 |
| D-4 | 1.5 |

In liquid-crystalline mixture H-4, solubility experiments are carried out with dyes D-1 to D-5.

The following solubilities are obtained here:

| Dye compound | Solubility (% by weight) |
|---|---|
| D-2 | 1.5 |
| D-4 | 1.6 |

The results show that good solubility of the dyes, where the solubility remains stable over a long period, is achieved with the mixtures according to the invention. This applies, in particular, to benzothiadiazole dyes, diketopyrrolopyrrole dyes and azo dyes.

D) Determination of the Voltage Holding Ratio (VHR) of the Dye Mixtures

For mixtures H-1 to H-4 (according to the invention) and comparative mixture H-5, the voltage holding ratio (VHR) is measured in each case for the individual mixture and for the combination with dye D-2. On the one hand the initial value for the VHR and on the other hand the value for the VHR after light exposure are determined here (sun test for 1 week). The light exposure consists in exposing the sample to intense light (exclusion of UV light by 400 nm cut-off filter) in a Suntest CPS+ from MTS-Atlas. The value $\Delta$VHR correspondingly represents the difference between the value for the VHR after light exposure and the initial value for the VHR.

For determination of the VHR, the material is subjected to a voltage pulse, and its electrical properties are determined. The procedure here is as described in "Merck Liquid Crystals, Physical Properties of Liquid Crystals", Section VIII, Status November 1997, Merck KGaA, Germany, and in H. Seiberle et al., SID 1992, 92, pp. 25 ff.

The value $\Delta$VHR represents a measure of the constancy of the electrical resistance of the material over time, and is therefore of importance for the performance of the optical switching device comprising the LC material. The value is, in particular, of importance for the performance and visual impression of smart windows comprising the LC material.

| Mixture | VHR (100° C.) mixture, initial value | VHR(100° C.) mixture, after sun test for 1 week | $\Delta$VHR (100° C.) mixture | VHR(100° C.) mixture + 0.25% of D-2, initial value | VHR(100° C.) mixture + 0.25% of D-2, after sun test for 1 week | $\Delta$VHR (100° C.) mixture + 0.25% of D-2 |
|---|---|---|---|---|---|---|
| H-1 | 98.4 | 98.3 | 0.1 | 98.1 | 76.7 | 21.4 |
| H-2 | 95.8 | 95.7 | 0.1 | 96.7 | 64.9 | 31.8 |
| H-3 | 97.9 | 98.0 | −0.1 | 96.9 | 77.0 | 19.9 |
| H-4 | 98.3 | 97.5 | 0.8 | 98.7 | 66.8 | 31.9 |
| H-5 (comp.) | 92.6 | 91.6 | 1.0 | 89.4 | 36.3 | 53.1 |

The results show that very good results for the value $\Delta$VHR are surprisingly obtained with mixtures H-1 to H-4 according to the invention.

$\Delta$VHR denotes the drop in the VHR after the mixture has been subjected to the light exposure described above for one week (sun test for 1 week).

The very good results are achieved, in particular, in the case of the combination with benzothiadiazole and diketopyrrolopyrrole dyes (D-2 is a benzothiadiazole dye).

Comparative mixture H-5 exhibits significantly worse results for the value $\Delta$VHR, in particular in the case of the combination with dyes.

The invention claimed is:

1. A liquid-crystalline material having a clearing point of higher than 95° C. and having a positive dielectric anisotropy $\Delta\varepsilon$, comprising one or more dye compounds F of

formula (F)

wherein

Ch is a chromophoric group, with the proviso that Ch is not of formula (Ch-2)
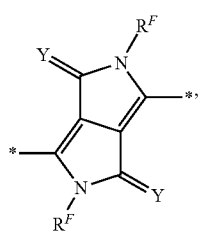
which is bonded to the remainder of the compound of formula (F) via the bonds labelled with *, and which is optionally substituted at each of the free positions independently by a radical $R^F$;
Y is on each occurrence, identically or differently, O or $NR^F$;
$A^F$ is on each occurrence, identically or differently, one of the following groups
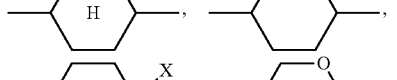
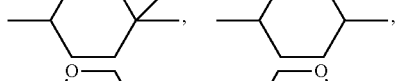
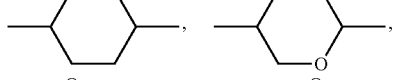
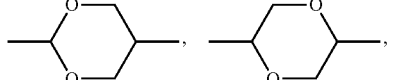
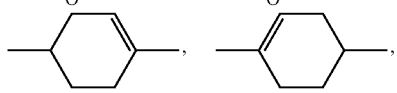
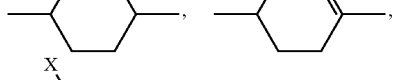
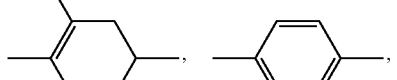
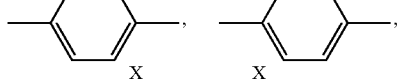
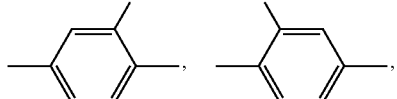
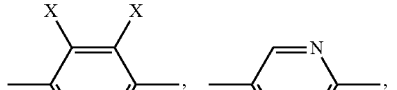
-continued
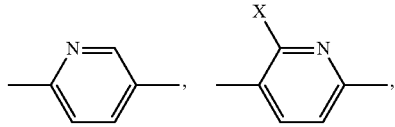
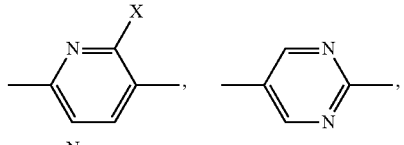
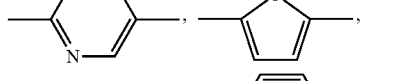
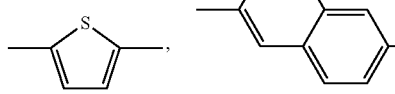
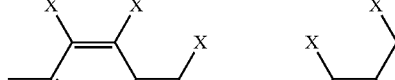
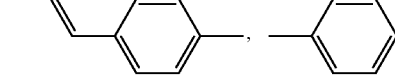
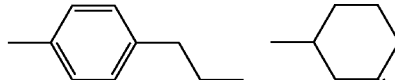
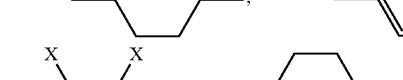
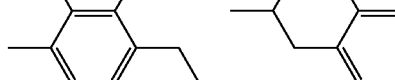
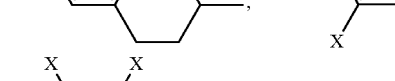
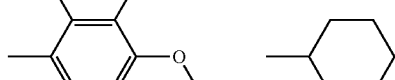
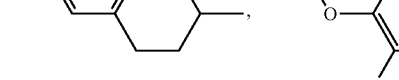
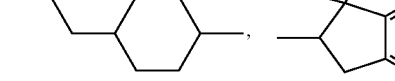
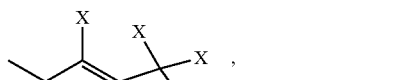
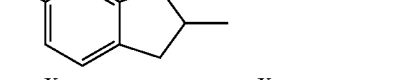
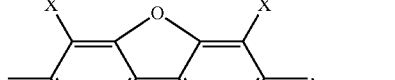
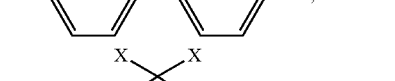
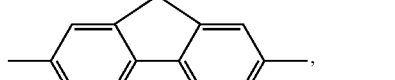

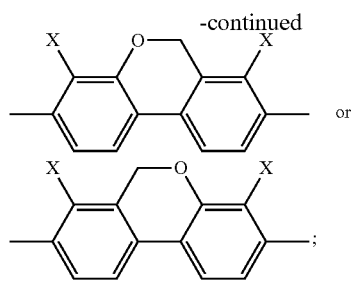

X is on each occurrence, identically or differently, F, Cl, CN, an alkyl group having 1 to 10 C atoms, an alkoxy group having 1 to 10 C atoms or a thioalkoxy groups having 1 to 10 C atoms, where one or more hydrogen atoms in the alkyl, alkoxy and thioalkoxy groups are optionally replaced by F or Cl, and where one or more $CH_2$ groups in the alkyl, alkoxy and thioalkoxy groups are optionally replaced by O or S;

$R^F$ is identical or different on each occurrence and is H, F, Cl, CN, NCS, $R^1$—O—CO—, $R^1$—CO—O—, an alkyl group having 1 to 10 C atoms, an alkoxy group having 1 to 10 C atoms, a thioalkoxy group having 1 to 10 C atoms, an alkenyl group having 2 to 10 C atoms, an alkenyloxy group having 2 to 10 C atoms or a thioalkenyloxy group having 2 to 10 C atoms, where one or more H atoms in the alkyl, alkoxy, thioalkoxy, alkenyl and alkenyloxy groups are optionally replaced by F, Cl or CN, and where one or more $CH_2$ groups in the alkyl, alkoxy, thioalkoxy, alkenyl and alkenyloxy groups are optionally replaced by O, S, —O—CO— or —CO—O—;

$R^1$ is on each occurrence, identically or differently, an alkyl group having 1 to 10 C atoms, in which one or more hydrogen atoms are optionally replaced by F or Cl, and in which one or more $CH_2$ groups are optionally replaced by O or S;

$Z^F$ is on each occurrence, identically or differently, —CO—O—, —O—CO—, —$CF_2$—$CF_2$—, —$CF_2$—O—, —O—$CF_2$—, —$CH_2$—$CH_2$—, —CH=CH—, —CF=CF—, —CF=CH—, —CH=CF—, —C≡C—, —$OCH_2$—, —$CH_2O$— or a single bond; and i is on each occurrence, identically or differently, 1, 2 or 3; and one or more compounds of formula (IA)

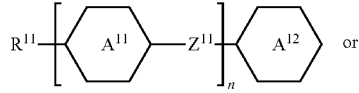

formula (IB)

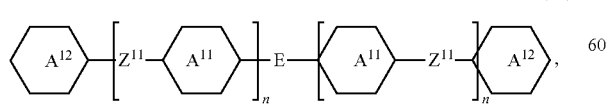

wherein $A^{11}$ is on each occurrence, identically or differently, one of the following groups

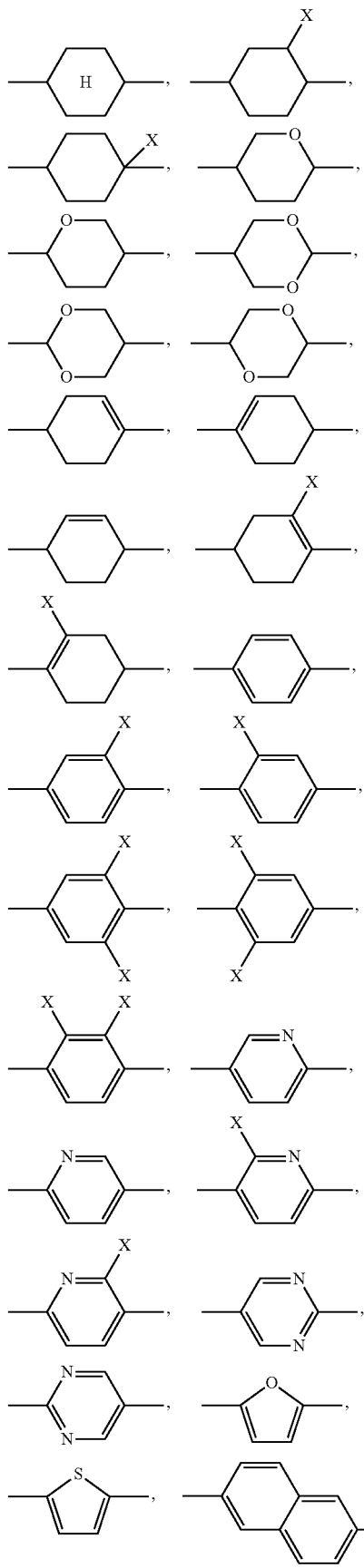

-continued

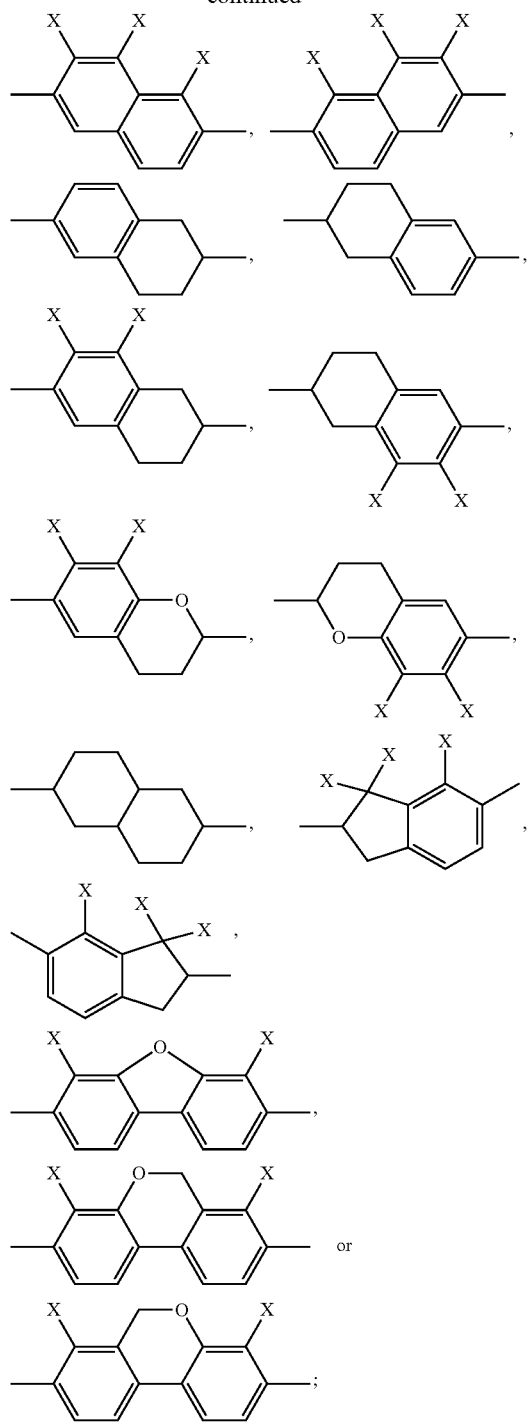

X is on each occurrence, identically or differently, F, Cl, CN, an alkyl group having 1 to 10 C atoms, an alkoxy group having 1 to 10 C atoms, or a thioalkoxy group having 1 to 10 C atoms, where one or more hydrogen atoms in the alkyl, alkoxy and thioalkoxy groups are optionally replaced by F or Cl, and where one or more $CH_2$ groups in the alkyl, alkoxy and thioalkoxy groups are optionally replaced by O or S;

$A^{12}$ is on each occurrence, identically or differently, a group

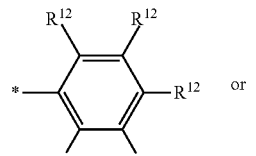

formula (A12A)

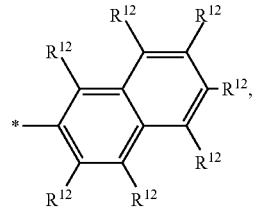

formula (A12B)

where the bond denoted by * denotes the bond to the group $Z^{11}$;

$Z^{11}$ is on each occurrence, identically or differently, —CO—O—, —O—CO—, —$CF_2$—$CF_2$—, —$CF_2$—O—, —O—$CF_2$—, —$CH_2$—$CH_2$—, —CH=CH—, —CF=CF—, —CF=CH—, —CH=CF—, —C≡C—, —$OCH_2$—, —$CH_2$O— or a single bond;

E is an alkylene group having 3 to 12 C atoms, where one or more H atoms in the alkylene group are optionally replaced by F, Cl, —$Si(R^1)_2OSi(R^1)_2OSi(R^1)_3$, $Si(R^1)_3$ or CN, and where one or more $CH_2$ groups in the alkylene group are optionally replaced by $CR^1$=$CR^1$, C≡C, $Si(R^1)_2$, $Si(R^1)_2O$, O, S, —O—CO— or —CO—O—;

$R^{11}$ is H, F, Cl, CN, NCS, $R^1$—O—CO—, $R^1$—CO—O—, an alkyl group having 1 to 10 C atoms, an alkoxy group having 1 to 10 C atoms, a thioalkoxy group having 1 to 10 C atoms, an alkenyl group having 2 to 10 C atoms, an alkenyloxy group having 2 to 10 C atoms, or a thioalkenyloxy group having 2 to 10 C atoms, where one or more H atoms in the alkyl, alkoxy, thioalkoxy, alkenyl and alkenyloxy groups are optionally replaced by F, Cl, —$Si(R^1)_2OSi(R^1)_2OSi(R^1)_3$, $Si(R^1)_3$ or CN, and where one or more $CH_2$ groups in the alkyl, alkoxy, thioalkoxy, alkenyl and alkenyloxy groups are optionally replaced by $Si(R^1)_2$, $Si(R^1)_2O$, O, S, —O—CO—, —CO—O— or a unit $A^{11}$;

$R^1$ is on each occurrence, identically or differently, an alkyl group having 1 to 10 C atoms, in which one or more hydrogen atoms are optionally replaced by F, Cl, —$Si(R^1)_2OSi(R^1)_2OSi(R^1)_3$, $Si(R^1)_3$ or CN, and in which one or more $CH_2$ groups are optionally replaced by $Si(R^1)_2$, $Si(R^1)_2O$, O or S;

$R^{12}$ is on each occurrence, identically or differently, H, F, Cl, CN, NCS, $CF_3$, $CF_2CF_3$, $CHF_2$, $CH_2F$, CH=$CF_2$, CH=CFH, CH=CH(CN), $OCF_3$, $OC(CF_3)_3$, $OCF_2CF_3$, $OCHF_2$, $OCH_2F$, O—CH=$CF_2$, O—CH=CFH, O—$CF_2$—CF=$CF_2$, $OSF_5$, $SF_5$, $SCF_3$, $SCF_2CF_3$, $SCHF_2$, $SCH_2F$, S—CH=$CF_2$, S—CH=CFH, $R^1$—O—CO—, $R^1$—CO—O—, an alkyl group having 1 to 10 C atoms, an alkoxy group having 1 to 10 C atoms, a thioalkoxy group having 1 to 10 C atoms, an alkenyl group having 2 to 10 C atoms, an alkenyloxy group having 2 to 10 C atoms, or a thioalkenyloxy group having 2 to 10 C atoms, where one or more H atoms in the alkyl, alkoxy, thioalkoxy, alkenyl and alkenyloxy groups are optionally replaced by F, Cl or CN, and where one or more $CH_2$ groups in the alkyl, alkoxy, thioalkoxy, alkenyl and alkenyloxy groups are optionally replaced by O, S, —O—CO— or —CO—O—;
where at least one radical $R^{12}$ in the group $A^{l2}$ is F, Cl, CN, NCS, $CF_3$, $CF_2CF_3$, $CHF_2$, $CH_2F$, $CH=CF_2$, $CH=CFH$, $CH=CH(CN)$, $OCF_3$, $OC(CF_3)_3$, $OCF_2CF_3$, $OCHF_2$, $OCH_2F$, $O—CH=CF_2$, $O—CH=CFH$, $O—CF_2—CF=CF_2$, $OSF_5$, $SF_5$, $SCF_3$, $SCF_2CF_3$, $SCHF_2$, $SCH_2F$, $S—CH=CF_2$ or $S—CH=CFH$; and
n is on each occurrence, identically or differently, 1, 2, 3 or 4.

2. The liquid-crystalline material according to claim 1, wherein n is on each occurrence, identically or differently, 2 or 3.

3. The liquid-crystalline material according to claim 1, wherein the compound of formula (IA) is of

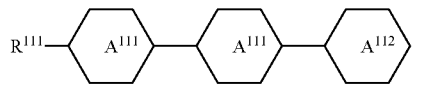

formula (IA-1)

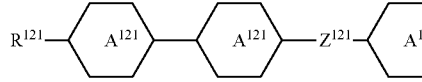

formula (IA-2)

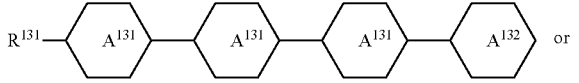

formula (IA-3)

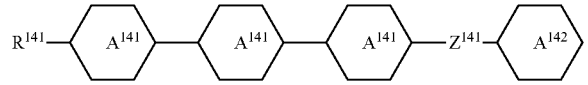

formula (IA-4)

wherein
$R^{111}$, $R^{121}$, $R^{131}$, $R_{141}$ are defined like $R^{11}$ for the compound of formula (IA);
$Z^{121}$, $Z^{141}$ are each independently —CO—O—, O—CO—, —$CF_2$—$CF_2$—, —$CF_2$—O—, —O—$CF_2$—, —$CH_2$—$CH_2$—, —$OCH_2$— or —$CH_2O$—;
$A^{111}$, $A^{121}$, $A^{131}$, $A^{141}$ are identical or different on each occurrence and are defined like $A^{11}$ for the compound of formula (IA);
$A^{112}$, $A^{122}$, $A^{132}$, $A^{142}$ are each independently

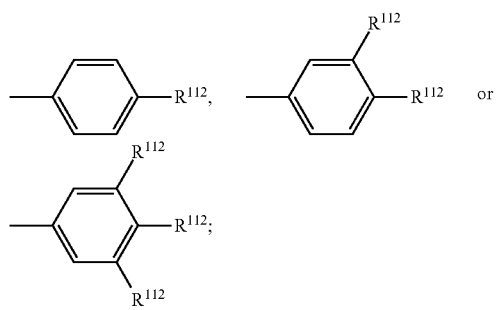

$R^{112}$ is on each occurrence, identically or differently, F, $CF_3$, $CF_2CF_3$, $CHF_2$, $CH_2F$, $OCF_3$, $OCF_2CF_3$, $OCHF_2$, $OCH_2F$, $SF_5$ or $OSF_5$.

4. The liquid-crystalline material according to claim 3, wherein $A^{112}$, $A^{122}$, $A^{132}$, $A^{142}$ are each independently one of the following groups

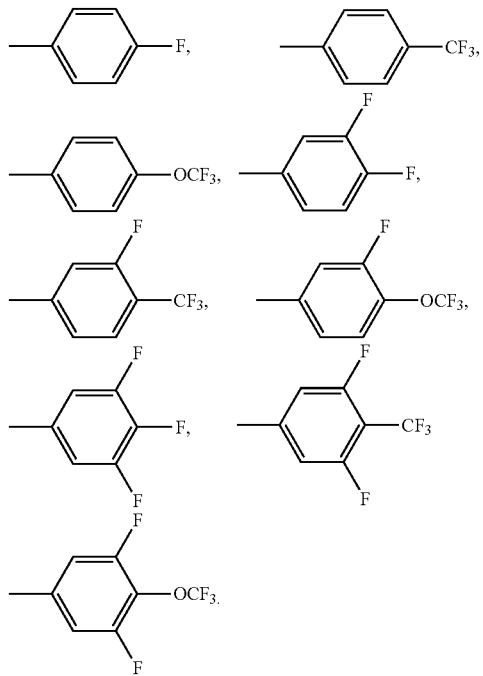

5. The liquid-crystalline material according to claim 1, in which the compound of formula (IA) or (IB) is present in a total proportion of 70% by weight to 90% by weight.

6. The liquid-crystalline material according to claim 1, which comprises one or more tricyclic compounds in which all three rings are aromatic in a total proportion of at least 1% by weight.

7. The liquid-crystalline material according to claim 1, which comprises one or more compounds of

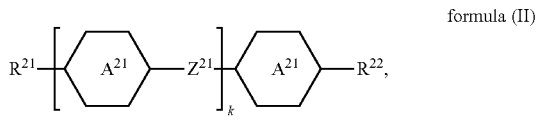

formula (II)

wherein
$A^{21}$ is on each occurrence, identically or differently,

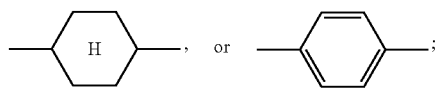

$Z^{21}$ is on each occurrence, identically or differently, —CO—O—, —O—CO—, —$CF_2$—$CF_2$—, —$CF_2$—O—, —O—$CF_2$—, —$CH_2$—$CH_2$—, —CH=CH— or a single bond;
$R^{21}$, $R^{22}$ are on each occurrence, identically or differently, an alkyl group having 1 to 10 C atoms, or an alkenyl group having 1 to 10 C atoms;
k is equal to 1, 2, 3 or 4.

8. The liquid-crystalline material according to claim 1, which comprises one or more compounds containing one or more cyano groups in a proportion of at most 10% by weight.

9. The liquid-crystalline material according to claim 1, which comprises at least two different dye compounds F, which each cover different regions of the light spectrum, giving overall the impression of a black colour of the material.

10. The liquid-crystalline material according to claim 1, which comprises two or more different dye compounds F, which are either all positively dichroic or all negatively dichroic.

11. The liquid-crystalline material according to claim 1, further comprising dye compounds which are selected from the group consisting of azo compounds, anthraquinones, methine compounds, azomethine compounds, merocyanine compounds, naphthoquinones, tetrazines, benzothiadiazoles, pyrromethenes and diketopyrrolopyrroles.

12. The liquid-crystalline material according to claim 1, wherein the group Ch is of

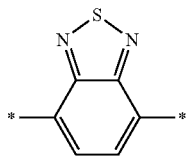

formula (Ch-1)

which is bonded to the remainder of the compound of formula (F) via the bonds labelled with *, and which is optionally substituted at each of the free positions independently by a radical $R^F$;

where Y is on each occurrence, identically or differently, O or $NR^F$; and where $R^F$ is defined as for the compound of formula (F).

13. The liquid-crystalline material according to claim 1, whose dielectric anisotropy $\Delta\varepsilon$ is greater than 3.

14. An optical switching device, comprising a liquid-crystalline material according to claim 1.

15. A device for the homogeneous regulation of passage of light through an area, comprising a liquid-crystalline material according to claim 1.

16. The device according to claim 15, in which the liquid-crystalline material is present in a switching layer.

17. A device according to claim 15, which is suitable for the regulation of passage of light in the form of daylight from the environment into a room.

18. A device according to claim 15, which is electrically switchable.

19. A device according to claim 15, which does not comprise a polariser.

20. A window containing a device according to claim 15.

* * * * *